US008560355B2

(12) United States Patent
Adamson et al.

(10) Patent No.: US 8,560,355 B2
(45) Date of Patent: Oct. 15, 2013

(54) INTERNET DESTINATION SALES SYSTEM WITH ASP-HOSTED MEMBER INTERFACE

(75) Inventors: James L. Adamson, Plymouth, MN (US); Peter A. Hedlund, Minneapolis, MN (US); H. R. Ajith P. U. K. Gunaratne, St. Paul, MN (US)

(73) Assignee: iDSS (Internet Destination Sales System), Minneapolis, MN (US)

( * ) Notice: Subject to any disclaimer, the term of this patent is extended or adjusted under 35 U.S.C. 154(b) by 1370 days.

(21) Appl. No.: 10/784,008

(22) Filed: Feb. 19, 2004

(65) Prior Publication Data

US 2005/0187808 A1 Aug. 25, 2005

(51) Int. Cl.
*G06Q 10/00* (2012.01)

(52) U.S. Cl.
USPC .......... 705/5

(58) Field of Classification Search
USPC .......... 705/5, 37
See application file for complete search history.

(56) References Cited

U.S. PATENT DOCUMENTS

| | | | | |
|---|---|---|---|---|
| 5,309,355 | A | 5/1994 | Lockwood | |
| 5,404,291 | A | 4/1995 | Kerr et al. | |
| 5,422,809 | A | 6/1995 | Griffin et al. | |
| 5,634,016 | A | 5/1997 | Steadham, Jr. et al. | |
| 5,909,668 | A | 6/1999 | Fukuma | |
| 6,199,050 | B1 * | 3/2001 | Alaia et al. | 705/37 |
| 6,208,975 | B1 | 3/2001 | Bull et al. | |
| 6,389,454 | B1 | 5/2002 | Ralston et al. | |
| 6,581,040 | B1 * | 6/2003 | Wright et al. | 705/8 |
| 2001/0014865 | A1 | 8/2001 | Franke | |
| 2001/0032170 | A1 * | 10/2001 | Sheth | 705/37 |
| 2001/0032172 | A1 * | 10/2001 | Moulinet et al. | 705/37 |
| 2002/0046076 | A1 | 4/2002 | Baillargeon et al. | |
| 2002/0072939 | A1 | 6/2002 | Kawaberi | |
| 2002/0091767 | A1 * | 7/2002 | Munson | 709/204 |
| 2002/0120478 | A1 | 8/2002 | Tanaka | |
| 2002/0156787 | A1 | 10/2002 | Jameson et al. | |
| 2003/0004854 | A1 * | 1/2003 | Greene et al. | 705/37 |
| 2003/0005055 | A1 | 1/2003 | Ralston et al. | |
| 2003/0040964 | A1 | 2/2003 | Lacek | |
| 2003/0110063 | A1 | 6/2003 | Among et al. | |
| 2003/0115085 | A1 | 6/2003 | Satoh | |
| 2006/0010023 | A1 * | 1/2006 | Tromczynski et al. | 705/8 |
| 2008/0133307 | A1 * | 6/2008 | Creedle et al. | 705/9 |

OTHER PUBLICATIONS

Eisenstodt, Joan L., "Off-Site Meeting Planning: A to Z Instructions for the Inexperienced Manager", Summer 1992, Human Resources Professional v4n4 pp:56-61.*

(Continued)

*Primary Examiner* — Shannon Campbell
(74) *Attorney, Agent, or Firm* — Patterson Thuente Pedersen, P.A.

(57) ABSTRACT

An integrated computerized sales system for destination events includes a member user interface (MUI) hosted by an application service provider (ASP) and accessible to a plurality of independent service providers that are members of a convention visitor bureau (CVB) organization. Members periodically log into the MUI to review information on a request for proposal (RFP) from a potential destination event organizer. The MUI includes a tentative response booking agreement (TRBA) electronic form to be completed by a member for any services responsive to the RFP that the member is willing to make available. A projected service availability database automatically incorporates information from the TRBA and is accessible only by the CVB. The projected service availability database is reviewed by the CVB in order to prepare a response to the RFP that includes information about services from members of the CVB that is then communicated to the potential destination event organizer.

23 Claims, 68 Drawing Sheets

(56) References Cited

OTHER PUBLICATIONS

"Request for Proposal to Host iCann Meetings", dated Jul. 31, 2002.*
*Integrating the Internet into your Back Office Operations*, K. Ungerboeck, Ungerboeck Systems, Inc., Asia, 29 pgs.; May 2002.
*Benefits of Integrated Software*, Ungerboeck Systems, International, Asia, 14 pgs., undated.
Website print-out: *Ungerboeck Systems International—Event Business Management System*, Ungerboeck Systems International, 6 pgs.; undated.
Website print-out: *Ungerboeck Systems International—Event Business Management Software—Complete Business Management Software for Exhibitions, Venues, Conferences, Destinations, Contractors*, Ungerboeck Systems International, 5 pgs.; undated.
Website print-out: *The Strength of a Virtual Booth*, Software Management, Inc., 1 pg.; Copyright 2001.
Website print-out: *Virtual Exhibit Booth—Style No. 1*, ConventionNet.com, Software Management, Inc., 4 pgs.; Copyright 2000.
Website print-out: *Software Management, Inc.: About SMI*, Software . Management, Inc.; 4 pgs.; Copyright 2003.
Website print-out: *The Strength of ConventionNet*, ConventionNet.com, Software Management, Inc., 2 pgs.; Copyright 2000.
Website print-out: *Meeting Planners—Let us help you Develop your Online Convention!*, ConventionNet.com, Software Management, Inc., 2 pgs.; Copyright 2001.
Website print-out: *EVENT 3000™ The Complete Event Venue Information Management Solution*, Software Management, Inc., 2 pgs.; Copyright 2002.
Website print-out: *DESTINATION 3000™ The Complete Destination Information Management Solution*, Software Management, Inc., 4 pgs.; Copyright 2002.
Website print-out: *Housing 3000™ The Complete Convention Housing Solution*, Software Management, Inc., 2 pgs.; Copyright 2002.
Website print-out: *Solutions, Not Promises—Infotrac for Convention Bureaus*, John Paradiso & Associates, 9 pgs.; Copyright 2003.

* cited by examiner

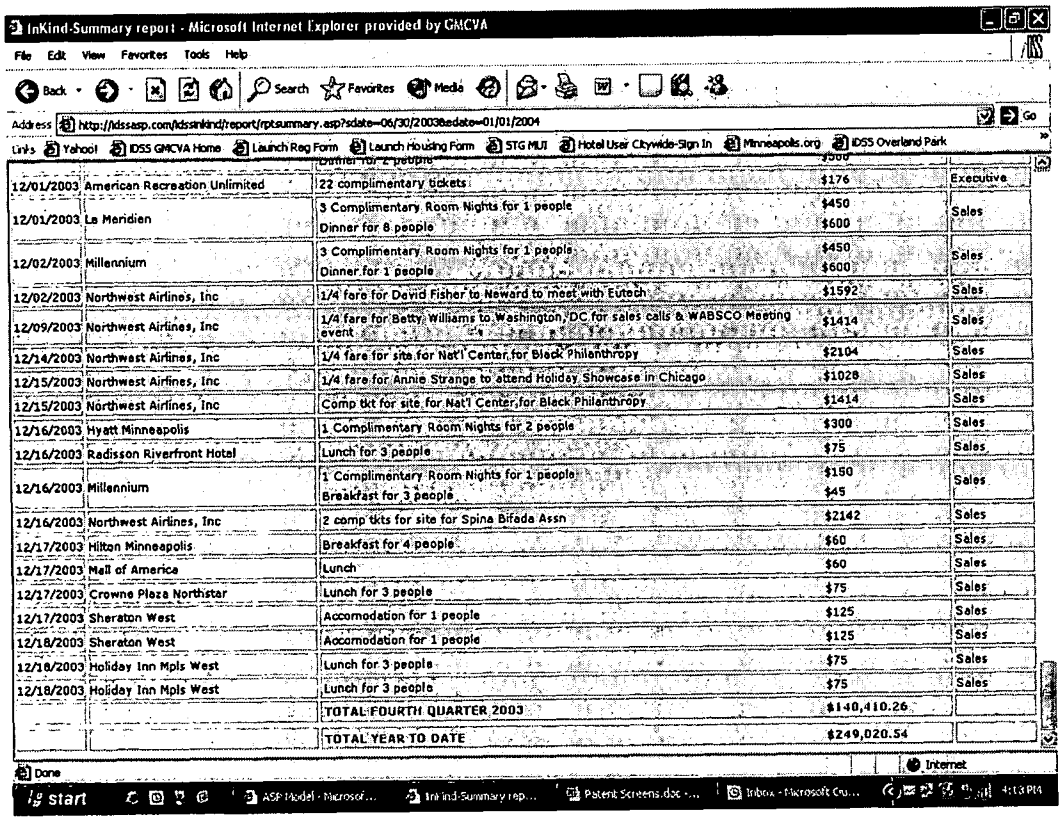

| | | | | |
|---|---|---|---|---|
| 12/01/2003 | American Recreation Unlimited | 22 complimentary tickets | $176 | Executive |
| 12/01/2003 | Le Meridien | 3 Complimentary Room Nights for 1 people<br>Dinner for 8 people | $450<br>$600 | Sales |
| 12/02/2003 | Millennium | 3 Complimentary Room Nights for 1 people<br>Dinner for 1 people | $450<br>$600 | Sales |
| 12/02/2003 | Northwest Airlines, Inc | 1/4 fare for David Fisher to Neward to meet with Eutech | $1592 | Sales |
| 12/09/2003 | Northwest Airlines, Inc | 1/4 fare for Betty Williams to Washington, DC for sales calls & WABSCO Meeting event | $1414 | Sales |
| 12/14/2003 | Northwest Airlines, Inc | 1/4 fare for site for Nat'l Center for Black Philanthropy | $2104 | Sales |
| 12/15/2003 | Northwest Airlines, Inc | 1/4 fare for Annie Strange to attend Holiday Showcase in Chicago | $1028 | Sales |
| 12/15/2003 | Northwest Airlines, Inc | Comp tkt for site for Nat'l Center for Black Philanthropy | $1414 | Sales |
| 12/16/2003 | Hyatt Minneapolis | 1 Complimentary Room Nights for 2 people | $300 | Sales |
| 12/16/2003 | Radisson Riverfront Hotel | Lunch for 3 people | $75 | Sales |
| 12/16/2003 | Millennium | 1 Complimentary Room Nights for 1 people<br>Breakfast for 3 people | $150<br>$45 | Sales |
| 12/16/2003 | Northwest Airlines, Inc | 2 comp tkts for site for Spina Bifada Assn | $2142 | Sales |
| 12/17/2003 | Hilton Minneapolis | Breakfast for 4 people | $60 | Sales |
| 12/17/2003 | Mall of America | Lunch | $60 | Sales |
| 12/17/2003 | Crowne Plaza Northstar | Lunch for 3 people | $75 | Sales |
| 12/17/2003 | Sheraton West | Accomodation for 1 people | $125 | Sales |
| 12/18/2003 | Sheraton West | Accomodation for 1 people | $125 | Sales |
| 12/18/2003 | Holiday Inn Mpls West | Lunch for 3 people | $75 | Sales |
| 12/18/2003 | Holiday Inn Mpls West | Lunch for 3 people | $75 | Sales |
| | | TOTAL FOURTH QUARTER 2003 | $140,410.26 | |
| | | TOTAL YEAR TO DATE | $249,020.54 | |

FIG. 29B

MUI

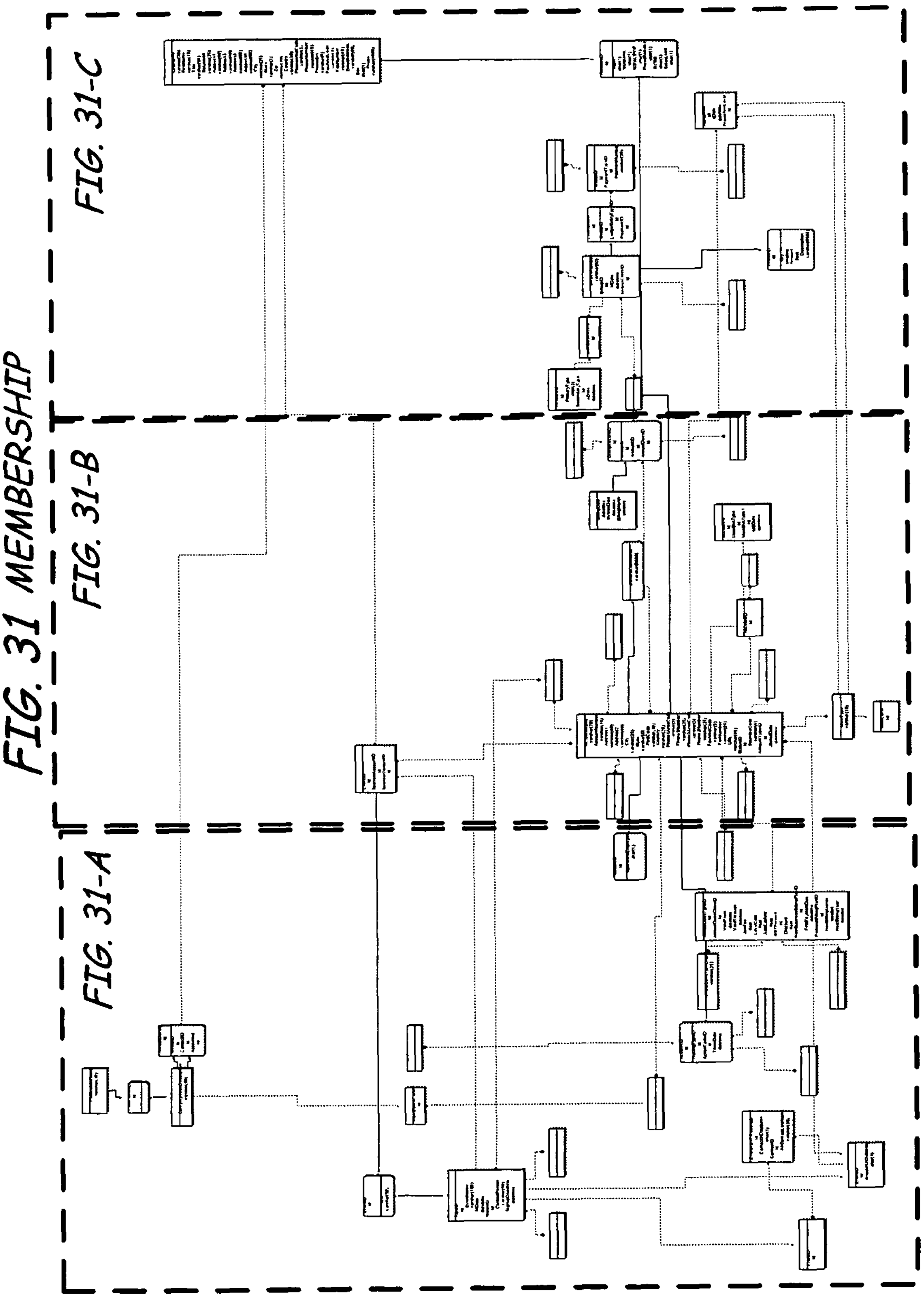
FIG. 31 MEMBERSHIP

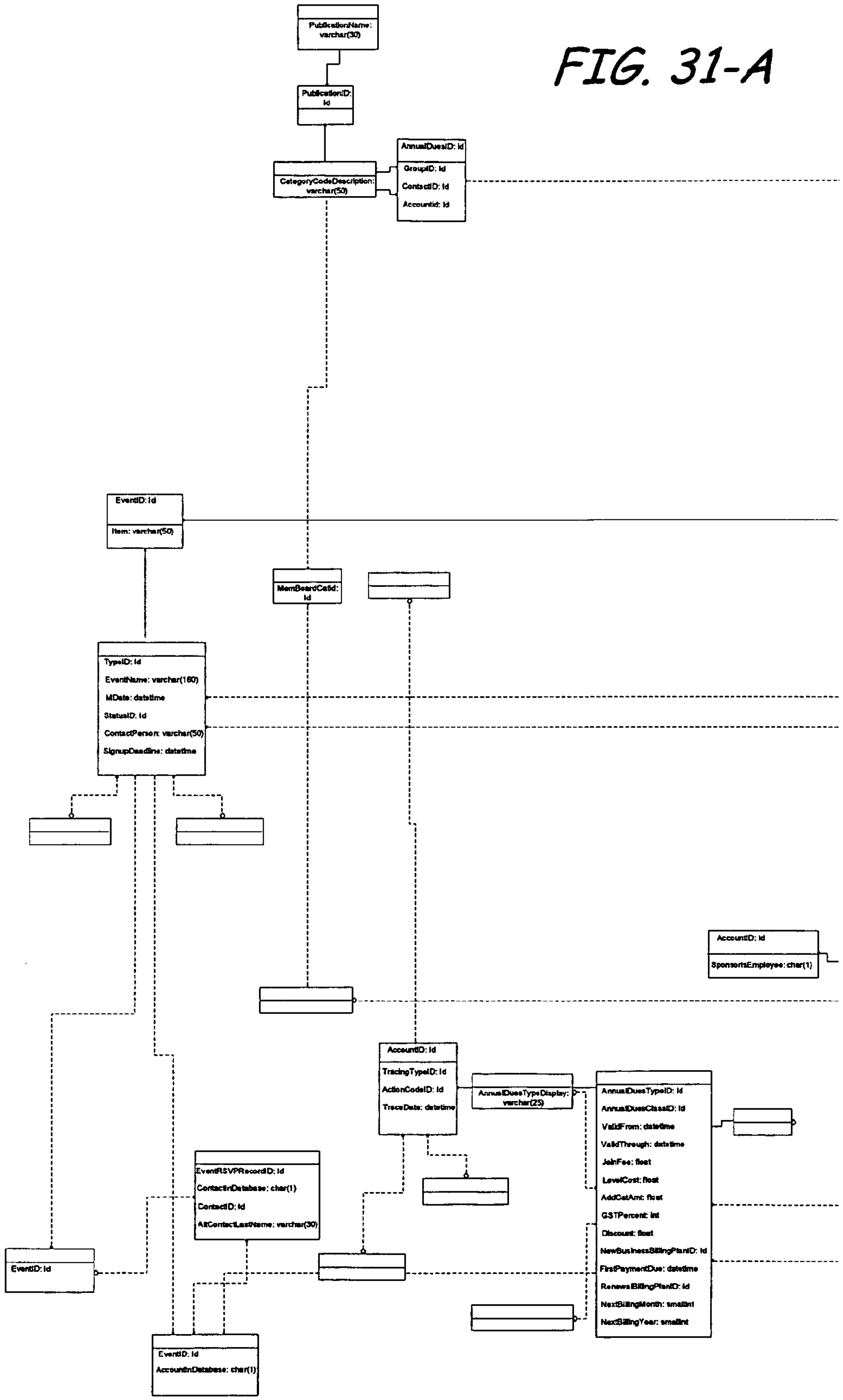
FIG. 31-A

FIG. 31-B
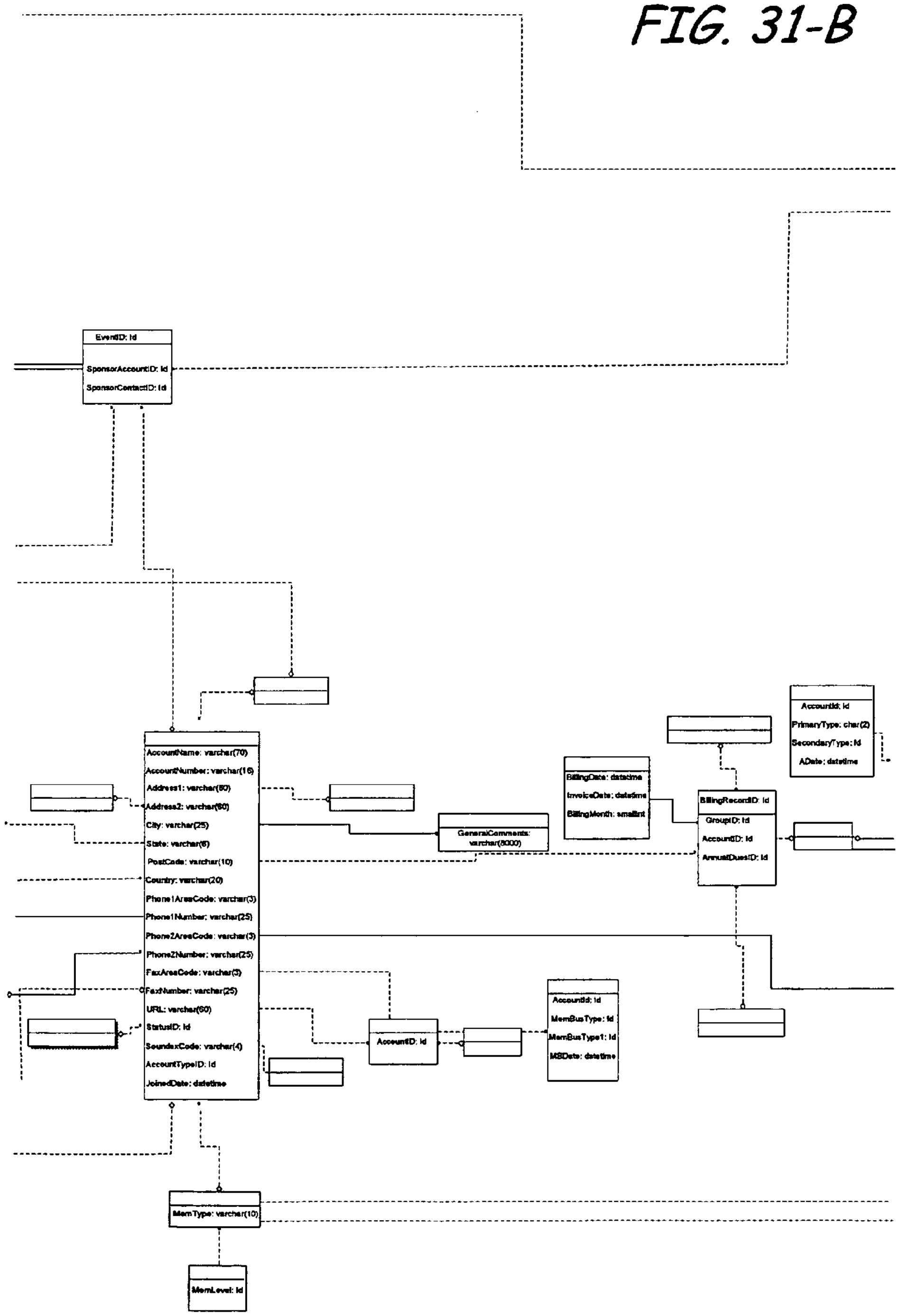

FIG. 31-C
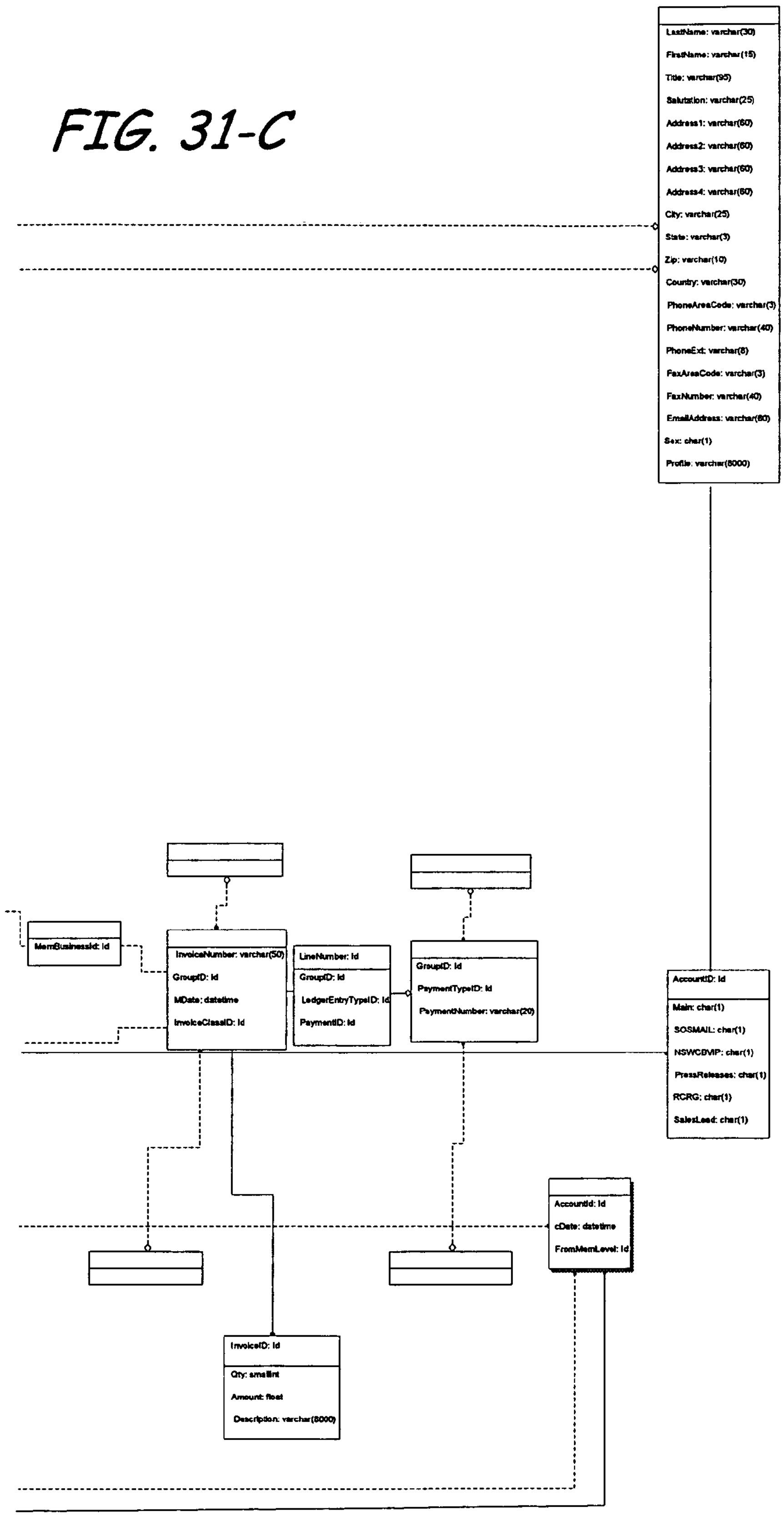

TOUR I

FIG. 32B TOUR II

TOUR III

SALES I

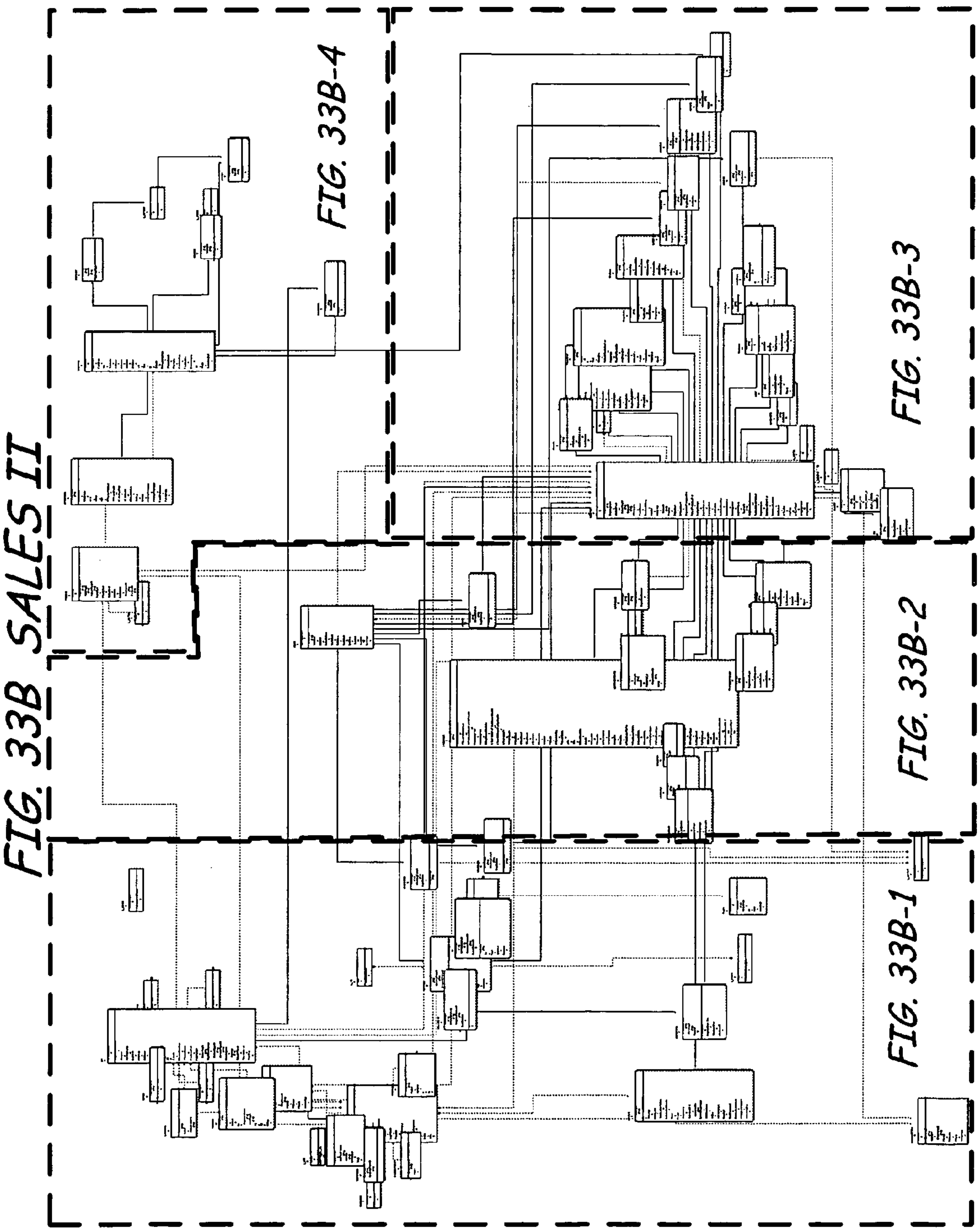
FIG. 33B SALES II

INTERNET DESTINATION SALES SYSTEM WITH ASP-HOSTED MEMBER INTERFACE

FIELD OF THE INVENTION

The present invention relates to the field of computerized business management systems for reservations and for coordination of multiple reservations. More particularly, the present invention is directed to computerized systems and methods for an integrated destination sales system with an application service provider (ASP) hosted member interface that facilitates coordination of information to and from multiple members associated with a destination in order to better respond to requests for proposals for destination events.

BACKGROUND OF THE INVENTION

Internet-based travel reservation systems for making reservations and planning trips for individual users are well-known. Websites, such as expedia.com and travelocity.com, provide individual users with the ability to research prices and availability and make reservations for airlines, hotel rooms, rental cars and even vacation activities. U.S. Pat. Nos. 5,309,355 and 5,422,809, for example, describe early examples of computerized reservation systems that coordinated reservations among multiple travel service providers for individual customers. Travel agents have long used computerized reservation systems, such as the SABRE system, to provide similar services. U.S. Pat. No. 6,208,975 describes an example of how the SABRE system coordinates and manages the databases for multiple travel vendors in response to requests from customers for information.

Computerized systems have also been developed for the providers of services to aid in the scheduling and management of the facilities and services of a given provider. U.S. Pat. Nos. 5,404,291 and 5,909,668 and U.S. Publ. Appl. 2002/0120478A1 describe management systems for managing inventories of hotel rooms and banquet halls, for example, for a single facility or vendor. U.S. Pat. No. 6,389,454 and U.S. Publ. Appls. 2003/0005055A1 and 2003/0115085A1 describe a management system for clinics, for example, with multiple facilities that can automatically make appointments at the various facilities in response to packets of client information or check on the status of facilities in response to patient requests.

Most of these computerized management systems have been designed to assist service providers in managing and responding to requests from individual customers or small groups of customers. The management of requests from customers with large groups, corporations or organizations for large meetings or gatherings, commonly referred to as events, presents a different set of challenges. U.S. Pat. No. 5,634,016, for example, describes an event management system that a single provider, such as a large hotel or retreat center, may use to respond to requests for meeting or event proposals by providing information on pricing and availability of rooms in the facility, and also providing 3-D CAD drawings of the meeting room layouts and other details of the planning and design associate with hosting the event at that facility. U.S. Publ. Appls. 2002/0046076A1 and 2002/0072939A1 also describe event management systems that use the Internet and various databases to coordinate planning and reservations for events hosted and/or organized by a single service provider. Other related computerized event management systems include a management system for hosting multiple virtual conventions online, as described in U.S. Publ. Appl. 2001/0014865A1 and an Internet based event planning and management system that aids the organizers of such events in planning the event and communicating with attendees as described in U.S. Publ. Appl. 2001/0156787A1 which was marketed by Event411 as the PremierPlanner™ planning system.

All of these management systems for events have focused either on event management systems that operate based on a single provider model or that are providing management systems for the customer/organizers of the event, not the providers of services and hospitality for the event. The limitations inherent in these existing single provider or single organizer event management systems restrict them from being effectively used for the next larger class of events, which will be referred to for purposes of the present invention as "destination events." Destination events include conventions, conferences, exhibitions and the like with hundreds or thousands of attendees that are hosted by the destination in a variety of independently managed facilities with services provided by multiple different vendors that often extend over multiple days. The increased size and number of service providers involved with destination events brings an exponential increase in the complexity of the management required to effectively host these destination events.

Most often, the overall coordination and hosting of a destination event is managed by the convention visitor's bureau (CVB) for the destination. CVB's are typically some hybrid of public/private organization tasked with the goal of promoting a given destination to the benefit of both the community at large and the service providers in that area. A typical destination event sales cycle will involve contacts by or with a prospective destination event organizer by a sales representative for the CVB. The overall parameters of a potential destination event are communicated between the destination event organizer and the sales representative for the CVB typically in the form of a request for proposal (RFP), including such things as desired convention hall and meeting spaces, schedules of anticipated quantities and rates for hotel rooms, proposed dates, schedules for related venue events and attractions, and prices and availability for related logistical and support services, such as transportation services, catering, equipment rental and the like. In order to respond to each RFP, the CVB staff will individually communicate with the various service providers, such as hotels, meeting halls, convention centers, etc. about the RFP, collect and organize the responses and prepare a response to the RFP outlining what the CVB is able to offer on behalf of a destination for the proposed destination event. It will be recognized that, unlike the situation of presenting a proposal from a single service provider, the proposal from the CVB in response to an RFP is only a first step in a complicated multi-party process. If a destination event organizer likes a given proposal, then individual hotel and meeting space contracts, for example, need to be negotiated with each of the independently operated service providers.

There are only a limited number of systems that have attempted to address the management and logistical challenges associated with providing a computerized management system for handling destination events. To date, all of these systems have utilized a client-server model that requires the CVB, for example, to purchase, customize and maintain proprietary server-based software running on servers at the CVB. CVB staff will enter the data collected from phone calls, faxes and emails with a multitude of service providers into the CVB databases for the client-server management system. Examples of these systems include: Event 3000™, Housing 3000™, and Destination 3000™, provided by Software Management, Inc.; EBMS® provided by Ungerboeck Systems International, InfoTrac™, Inquiry+™ and Housing+™ provided by John Paradiso & Associates and CVBreeze by NewMarket International.

Recently, some of these systems have begun to promote integration of the Internet into their client-server software in order to allow third party service providers and destination event planners/customers to have limited and controlled access to some of the various databases maintained by these CVB client-server systems. The iEBMS® system provided by Ungerboeck Systems International and the e-CVB™ system provided by Software Management Inc. are good examples of the efforts to integrate the Internet into conventional CVB client-server systems. While these systems offer a standard Internet-based interface for updating contact information and similar publicly available information about the various service provider who are members of a CVB, they can require detailed and extensive customization in order to provide additional functionality that interfaces with the CVB client-server system.

Although computerized management systems for destination events are necessarily quite complicated due to the size and number of parties involved in coordinating and hosting such destination events, the problem with the current approach to integration of the Internet into destination event computerized management systems is that the client-server model requires the CVB either to become an expert in the management software package in order to address issues such as maintenance, upgrades and security or to continue to spend large amounts of money to hire out these services to the providers of such computerized management systems. In addition, the inherent limitations of a client-server model for such computerized management systems creates barriers to the most effective utilization of a computerized management system by both the CVB and the various service providers represented by the CVB in preparing responses to RFPs from destination event organizers/customers.

SUMMARY OF THE INVENTION

The present invention is an integrated computerized sales system for destination events. The system includes a secure member user interface (MUI) hosted by an application service provider (ASP) and accessible over the Internet to a plurality of independent service providers that are members of a convention visitor bureau (CVB) organization. At least two of the members of the CVB organization periodically log into the MUI to review information on a request for proposal (RFP) from a potential destination event organizer requesting information on hosting a given destination event that is published on the MUI by the CVB organization. The MUI includes a tentative response booking agreement (TRBA) electronic form to be completed by a member of the CVB organization for any services responsive to the RFP that the member is willing to make available. A projected service availability database is also maintained by the ASP that automatically incorporates information from the TRBA electronic form and is accessible only by the CVB organization. The projected service availability database is reviewed by the CVB organization for the RFP for the given destination event in order to prepare a response to the RFP that includes information about services from at least two members of the CVB that is then communicated to the potential destination event organizer.

The preferred embodiment of the present invention provides an economical, Web-enabled suite of applications for destination event sales and service, destination marketing and customer management. The present invention gives small- and medium-sized bureaus and associations that promote destination events the technology power of larger organizations, without the expense of adding an information technology department. The ASP hosted software modules are available anytime and anywhere users are-in the office, at home, on the road. Logging on is as easy as connecting to the Internet. Organizations can purchase individual software modules, or the entire suite. Affordable, easy to integrate and simple to use, the present invention is an ideal destination management solution for CVB's, associations and organizations without dedicated technology staff to manage complicated and proprietary client-server systems. Software modules are hosted by the ASP servers and upgraded on a regular basis without the need for additional staff to maintain the technology on the part of CVB organizations. In the present invention, software is distributed directly over the Internet to a user's desktop. CVB organizations only pay a small monthly fee to use state-of-the-art solutions to meet business needs.

The Member User Interface (MUI) of the present invention automates many traditionally time-consuming processes by providing select members direct and confidential access to that member's information on databases maintained by the system that are used by the CVB staff to respond to an RFP. All hotel, attraction and member communications, leads, updates, cancellations and definite bookings are completed automatically, eliminating the need to fax and email documents and make telephone calls to individual members in order to collate the information needed for responding to a given RFP.

BRIEF DESCRIPTION OF THE DRAWINGS

FIG. 29A, 29B are partial screen shots of the accounting interface for reports from the inkind module.

FIG. 31 shows the data diagram for the membership module.

DETAILED DESCRIPTION OF THE PREFERRED EMBODIMENTS

Figure 1:
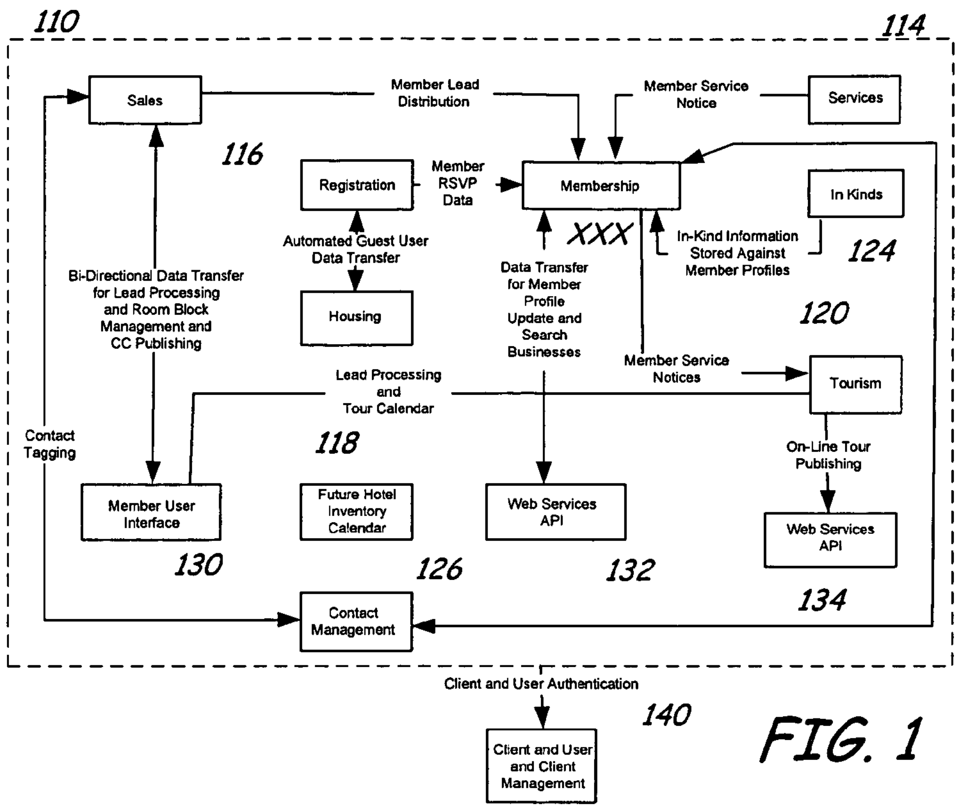
FIG. 1 is an overall block diagram of the software modules and data flow of the ASP hosted destination event software system of the present invention.

Referring now to FIG. 1, a preferred embodiment of the integrated computerized sales system for destination events will be described. It will be understood that the term destination event is used in the present invention to events hosted by a city or regional or metropolitan area that involve services provided by more than one service provider and typically have hundreds or thousands of attendees. Examples of destination events include conventions, conferences, exhibitions, sporting championships and the like with hundreds or thousands of attendees that are hosted by the destination in a variety of independently managed facilities with services provided by multiple different vendors that often extend over multiple days. The increased size and number of service providers involved with destination events brings an exponential increase in the complexity of the management required to effectively host these destination events.

The term service provider is used in the present invention to denote a company, organization or group that is making services and/or facilities available as part of responding to a request for proposal (RFP) made to a given destination for hosting a destination event. Examples of service providers include hotels, motels, convention centers, arenas, meeting facilities, dining and catering services, transportation services, equipment rental services and the like.

In the preferred embodiment as shown in FIG. 1, the integrated decision sales system 100 of the present invention is made up of several "modules" 110, 112, 114, 116, 118, 120, 122, 124 and 126 that work seamlessly together as part of an ASP-hosted system, eliminating the need to re-enter data while ensuring the accuracy of information. The system 100 also provides a built-in workflow engine for interpersonal communication among CVB team members. The system 100 of the present invention is a total destination management system that is software based, but manages information and data related to the coordination and management of meetings and events at any destination. The benefits of the system 100 are the ability to provide a comprehensive, fully integrated data management system to CVB staff and member organizations, and to minimize the need for maintenance and support of that software because the software is hosted by an application service provider (ASP) that is preferably an off-site server managed by a third party from remote location.

While it will be understood by a person of ordinary skill in the art that the present invention can be programmed using any number of programming languages and database packages, the preferred embodiment of the present invention is programmed as Java applets, Active Server Pages development language and/or HTML webpages for the web-based interfaces, with Active Server Pages development language and Microsoft.NET software modules running on the ASP and interfacing with SQL databases. While the preferred embodiment is designed to work in Microsoft® Internet Explorer as the browser application, although it will be recognized that the present invention can be deployed to any web-based browser.

In one embodiment of the system 100, the software modules include the following:

Convention Sales 110

- Gives CVB sales staff full access to data from the office, home or while traveling on business via the Internet.
- Provides members access to leads, updates, definite bookings and cancellations through the Member User Interface (MUI) 130, eliminating faxing and emailing documents.

- Controls all future space availability for a single convention center, or for multiple meeting venues such as additional convention centers, stadiums, arenas, etc.
- Convention bureau and authorized hotel sales staff have access to future convention center space calendar from anywhere with Internet capabilities.
- Can be used to search the database using standard query features, advanced search or "English Query" and merge directly to labels, faxes or email lists.

Future Service Availability Calendar 112

- Can be combined with Convention Sales Module 110 or as an individual stand-alone application.
- The Future Hotel Inventory Calendar, for example, reflects the current, definite, and tentative group room blocks being held for association, corporate, and leisure group business. The program automatically deducts the definite room blocks from a hotel's maximum group commitment, the result showing the total group rooms available for all future dates, by hotel or as a total hotel room availability for the destination. Similar future availability calendars may be separately created for other services, such as transportation services or catering services, or the future service availability calendars may be selectively combined and presented with overlays or differing color schemes to reflect a combination of availabilities of different services for a given destination at the date ranges represented by a given view of the calendar.
- CVB sales staff have access to view all hotels individually or as a destination-wide total, eliminating endless telephone and email communications to the hotel sales staff to determine availability on an ongoing basis.
- Authorized hotel sales staff have access to the available rooms for their own hotel, and the total room availability destination, providing valuable information for scheduling in-house group business, low occupancy periods, and maximizing rates.

Convention Services 114

- Eliminates the traditional paper system nor commonly used for services, such as registration, welcome programs, site visits, and preparation/promotions.
- Interfaces directly with the Convention Sales Module 110, providing access to the most accurate contact information and event history.
- Traces timelines, follow-up and schedules of services.
- Interfaces with the Membership Module 122 keeping a record of all reservations made for member restaurants and tourist attractions during a convention through a reservations desk.
- Gives a complete history of hotel room occupancy, from the original point of sale in the contracted room block to the final pick-up.

Registration 116/Housing 118

- Can be combined with the Convention Services Module 114 or operated as a separate application for convention bureaus, hotels, associations or corporations.
- Provides one-step Internet registration/housing, eliminating any duplication of input data.
- Combines the housing process, accommodating both hotels and campus dormitory housing in the room block.
- Provides meeting professionals with increased management capabilities for controlling delegate housing within and outside the official room block.
- Hotels can arrange for in-house meetings and conventions, increasing in-house control, improving client services, and eliminating need for the traditional reservation cards kept on file.
- Allows a convention bureau to have an alternative housing system for groups, which allows price flexibility and price tiering.

Tourism 120

- Gives authorized hotels, attractions and other member businesses direct access to leads, updates, definite bookings and cancellations, eliminating the need to fax or email these documents.
- Module communicates with the convention bureau's web site providing individual consumers a current list of all domestic and international tours and packages available for sale and link directly to the appropriate tour company.
- Captures and manages all visitor inquiries for future promotions, allowing the destination, and member hotels, to pinpoint and target periods of low occupancy.

Membership 122

- Creates invoices, tracks payments and produces customized reports quickly and easily.
- Quickly organizes and generates information for online and offline publications.
- Makes adjustments to member accounts, combining and tracking billing cycles, payments, event participation and past sponsorships.
- Gives members controlled access to change contact information and company descriptions.
- Creates multiple types of member correspondence, including email blasts, fax distributions and letters to all members or any breakdown of specific categories of membership.

Inkinds 124

- Creates requests for inkind services to be contributed by members for utilization in the sales process (e.g., free hotel rooms, meals, transportation supplied to a potential convention organizer visiting the destination).
- Tracks utilization of inkind services relative to potential leads and definite bookings.

Contact Manager 126

- Has contact database entries that can be tagged by any of a number of modules in the system.
- Can be integrated with off-the-shelf contact management programs.

Member User Interface 130

- Secure website interface with login and password for authorized users of a given member.

Web Service API 132, 134

- Publicly accessible web site application program interface (API).
- Provides publicly published information on members (132).
- Provides publicly published information from tourism module (120) on available tour packages for the destination that have been registered with the system.

Central User and Client Management 140

- Provides management tools to ASP that operate outside of the modules provided to the CVB and its members.
- Is a wrapper/manager program for the ASP that permits the ASP to maintain and upgrade the various software modules.

The ASP hosted system 100 is preferably designed with features that permit collection of post-event data after a destination event occurs so that customers can track past commercial relationships and purchases. The system 100 stores all relevant data in one place so all personnel within the meeting/event organization can access it, and get complete customer profiles. The system 100 fully integrates and automation data and data entry from all sources and integration of data into one accessible application. The resulting usability and usefulness of the data, sorted so that it is easily retrievable, anytime, and from anywhere, enables the CVB sales organization to more effectively respond to RFPs.

One specific feature best distinguishes the functionality of the present invention, providing powerful functionality not offered by other client-server based destination management software packages. The hotel room availability calendar version of the future services availability calendar 112 offers unprecedented visibility and immediate access to citywide hotel room availability. It provides a snapshot of individual hotel room availability, along with an overview of total room availability for the entire city for all future dates. This, all in one easy screen, saving CVB sales staff from making a multitude of phone calls, or waiting for responses from the hotel community to begin selecting the most desirable dates for future businesses. The hotel room availability calendar combines the effects the current definite and tentative rooms being held for association, corporate and leisure group business—deducts the definite room blocks from the hotels maximum group commitment, and shows the group rooms available for all future dates by hotel or as a total. Because only the CVB staff has access to all of the details of price and availability for each hotel member, hotels are encouraged to use real, current data showing future pressure on total occupancy to better place in-house group business in time periods to maximize occupancy and room rates. The ability to efficiently obtain, confidentially access and coordinate this pre-sales availability information with a high degree of confidence enables the CVB staff to respond more effective to an RFP from a destination event organizer and portray a more accurate and confident picture of how the destination would be able to meet the needs of the proposed destination event.

In one embodiment, the system 100 further includes a venue calendar as part of the MUI 130 that combines major venue availability with occupancy room flow information for definite events. In addition, tracking of post event information can be part of the MUI 130 for historical data collection purposes.

In another embodiment, the MUI 130 and even the organizer or tour customer webpages 132, 134 can be provided with a Quick Answer wizard that walks a member, potential customer or even CVB sales staff through a simple series of questions. The answers to the questions are compared against the information maintained in the future availability database to quickly determine whether a locale can even accommodate an event for a given date or for a given price range.

Figure 2:
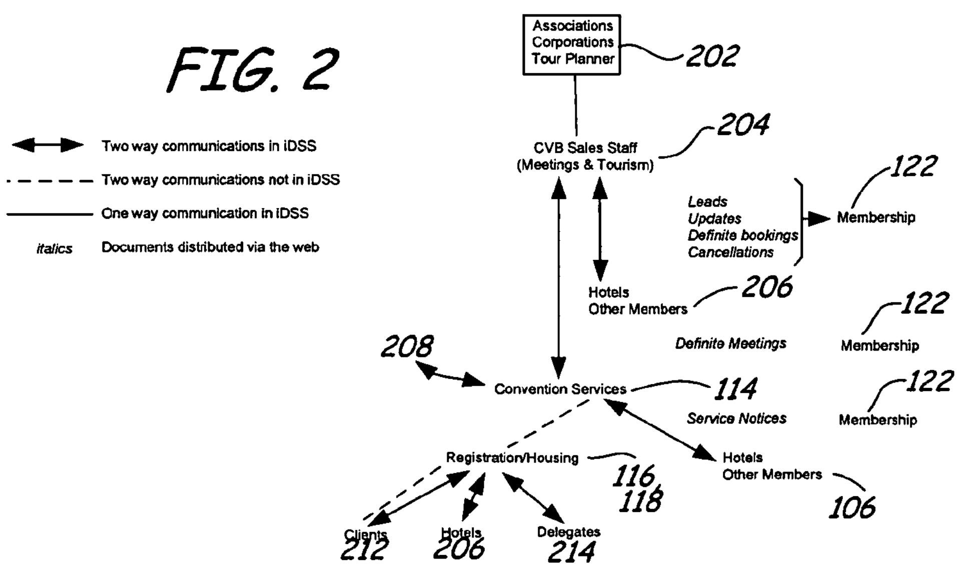
FIG. 2 is an overall process/communication flow diagram of the present invention.

Referring now to FIG. 2, an overall process/communication flow diagram of the present invention is presented. Destination event organizers (shown at 202) communicate with CVB sales staff (shown at 204) about and RFP for potential hosting of a future destination event. These communications may occur by any number of conventional communication channels, including communication avenues that are not within the system 100. In one embodiment of the system 100, the organizer API 132 is provided with an online web form that can be used to assist in the collection of the relevant information for an RFP. CVB sales staff 204 then communicates with Hotels and other Members (shown at 206) and with convention services (shown at 208) on Leads, Updates, Definite Bookings and Cancellations (which will be described). Preferably, these communications occur through the membership module 122 and the MUI 130. The providers of the convention services 208 (convention halls, arenas, sporting venues) can also use the Convention Services Module 114 to communicate with Hotels and other Member 206 about Definite meetings and Service Notices. Both the destination event organizers (shown at 210) and the destination event delegates (shown at 212), as well as the Hotels 206 also coordinate individual registration and housing matters through the Registration module 116 and the Housing module 118.

Figure 30:
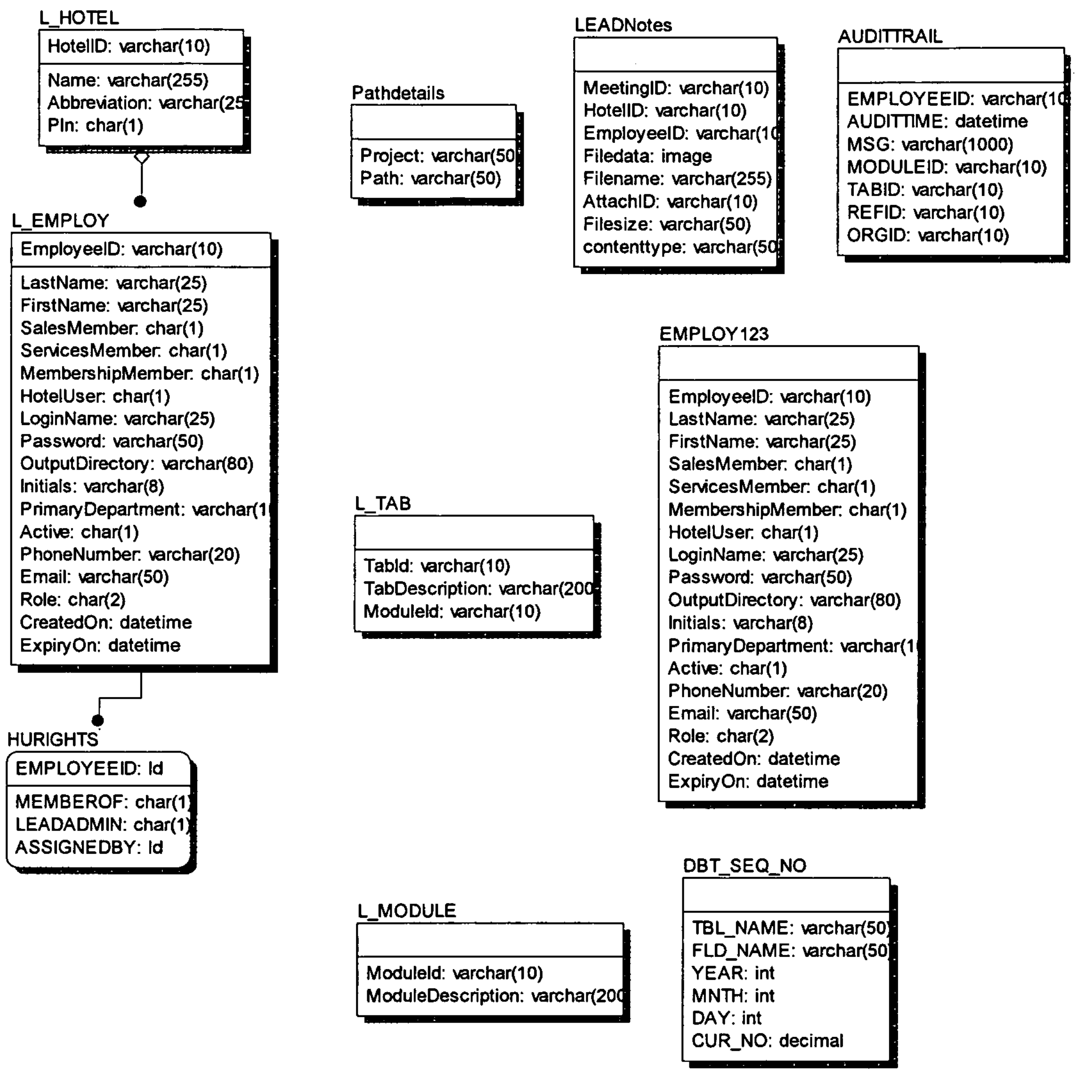
FIG. 30 shows the data diagram for the MUI interface.
Figure 32A:
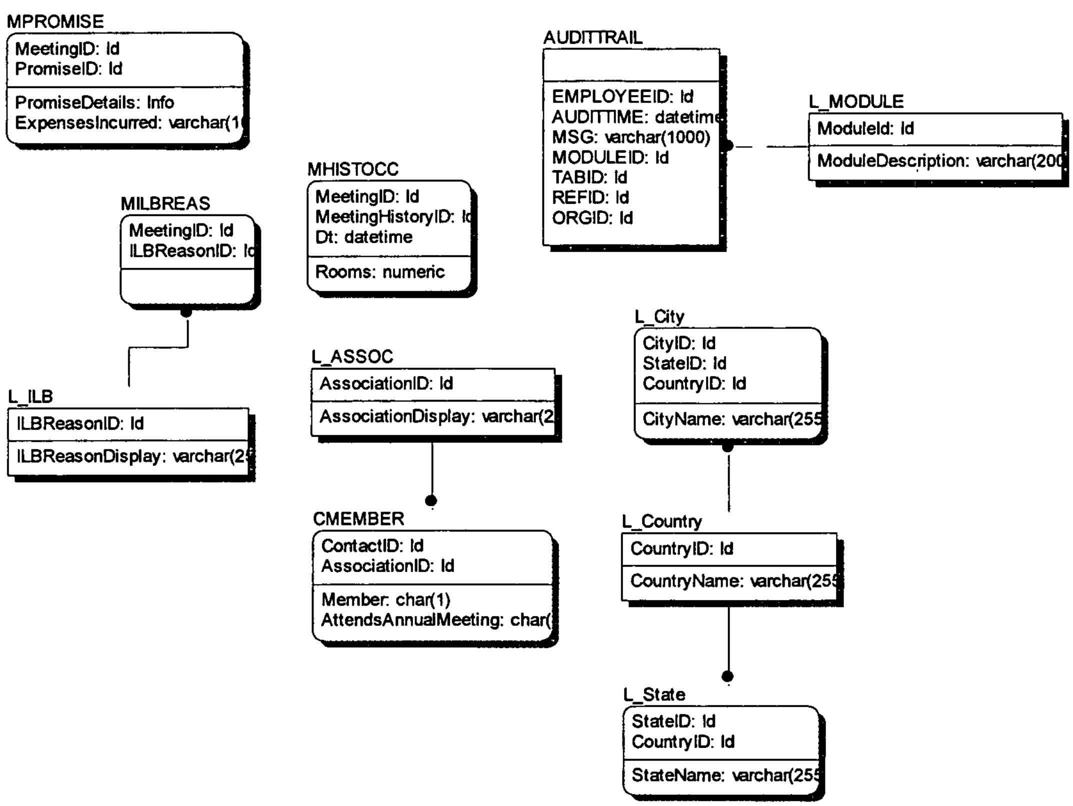
FIGS. 32A-32C show the data diagrams for the tourism module.
Figures 1, 2, 32B:
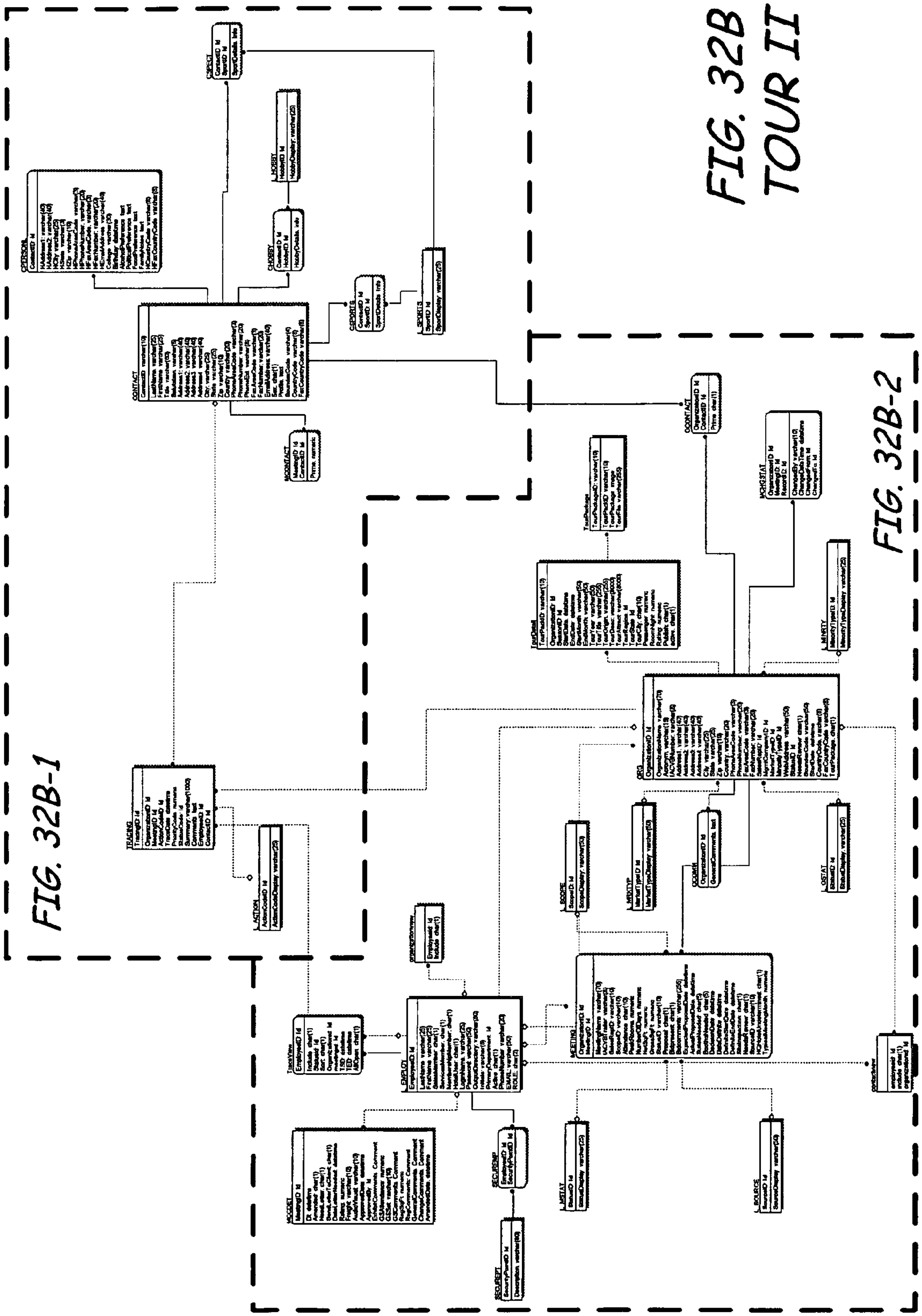
Figures 1, 32B:
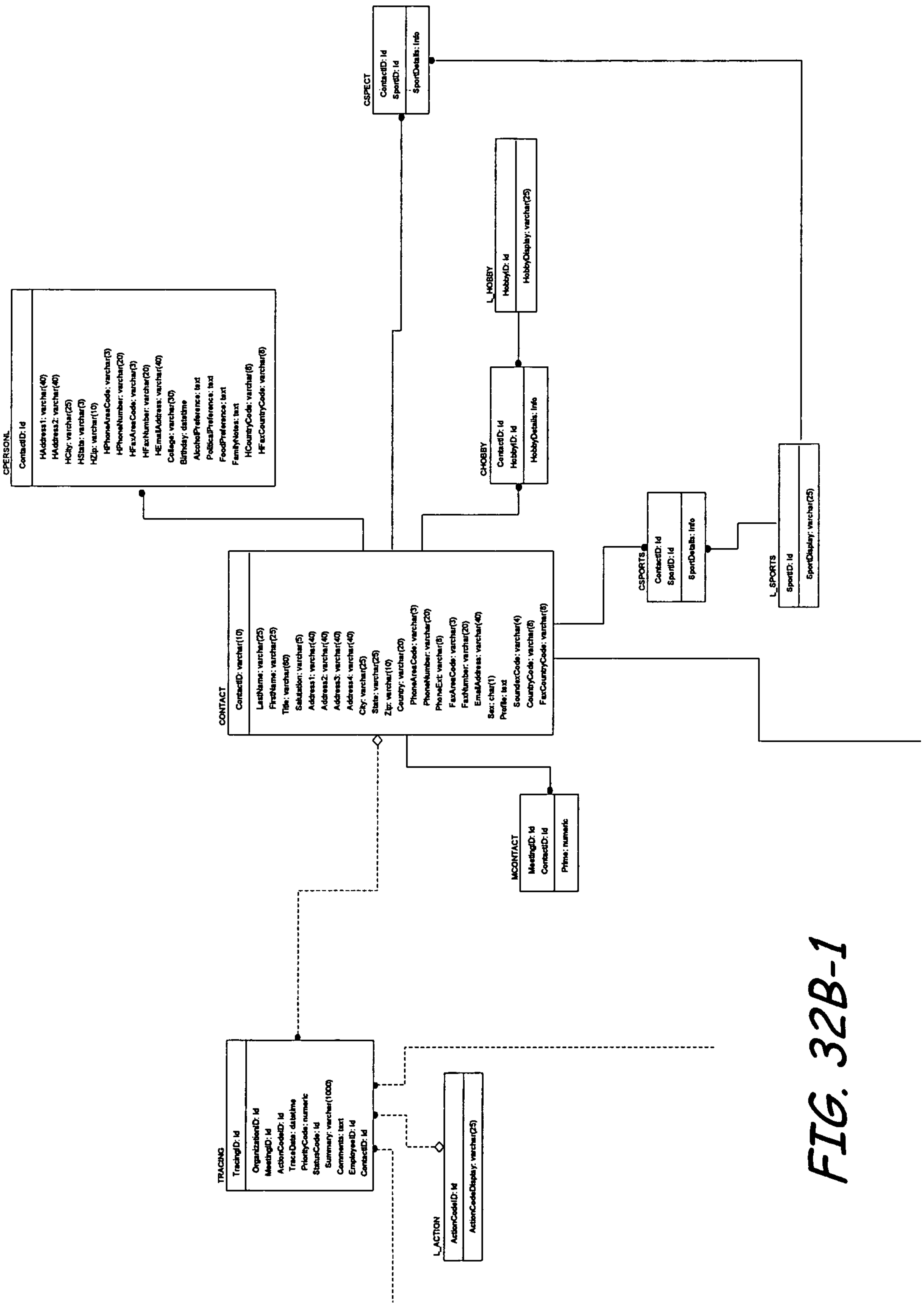
Figures 2, 32B:
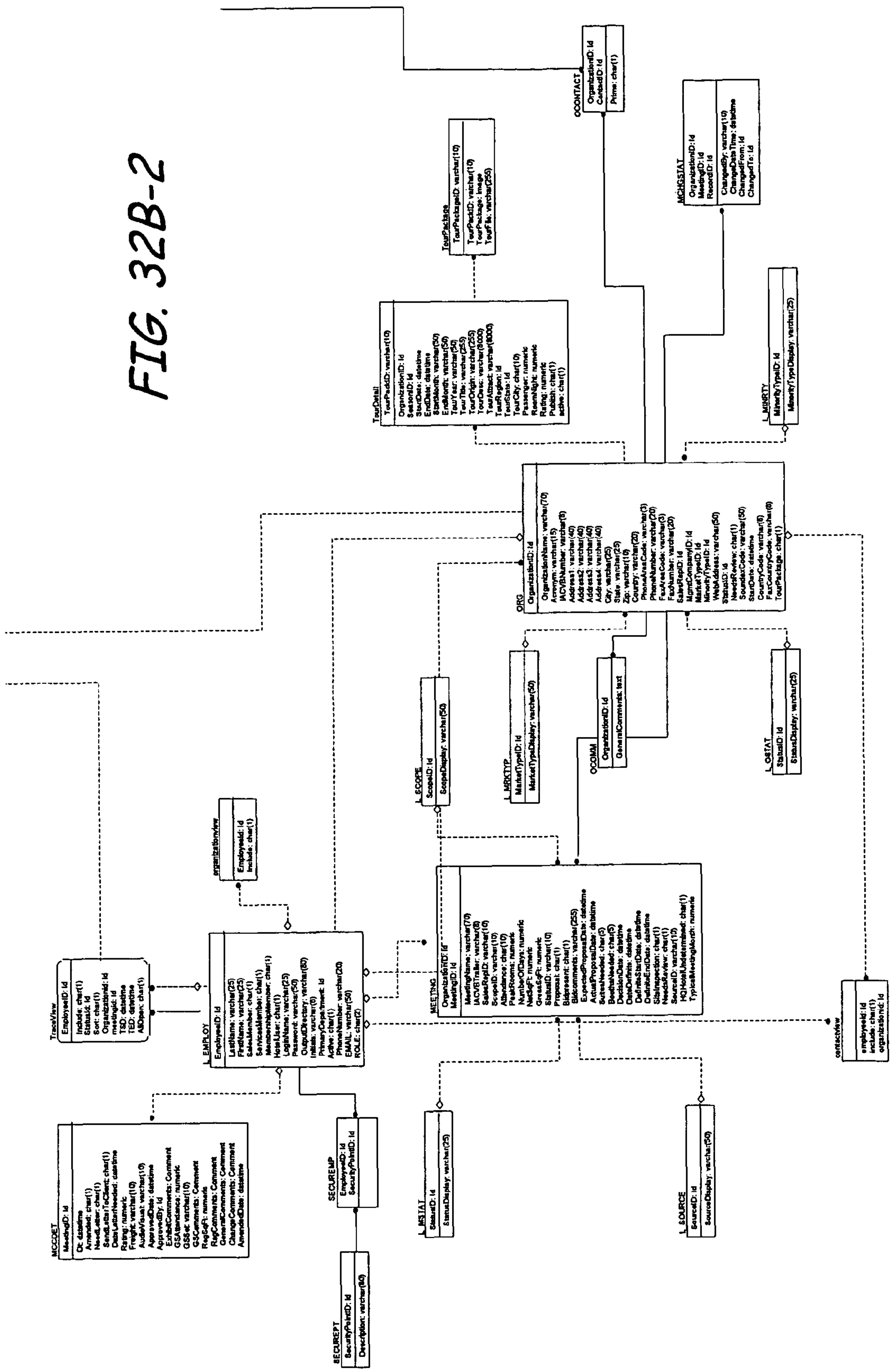
Figure 32C:
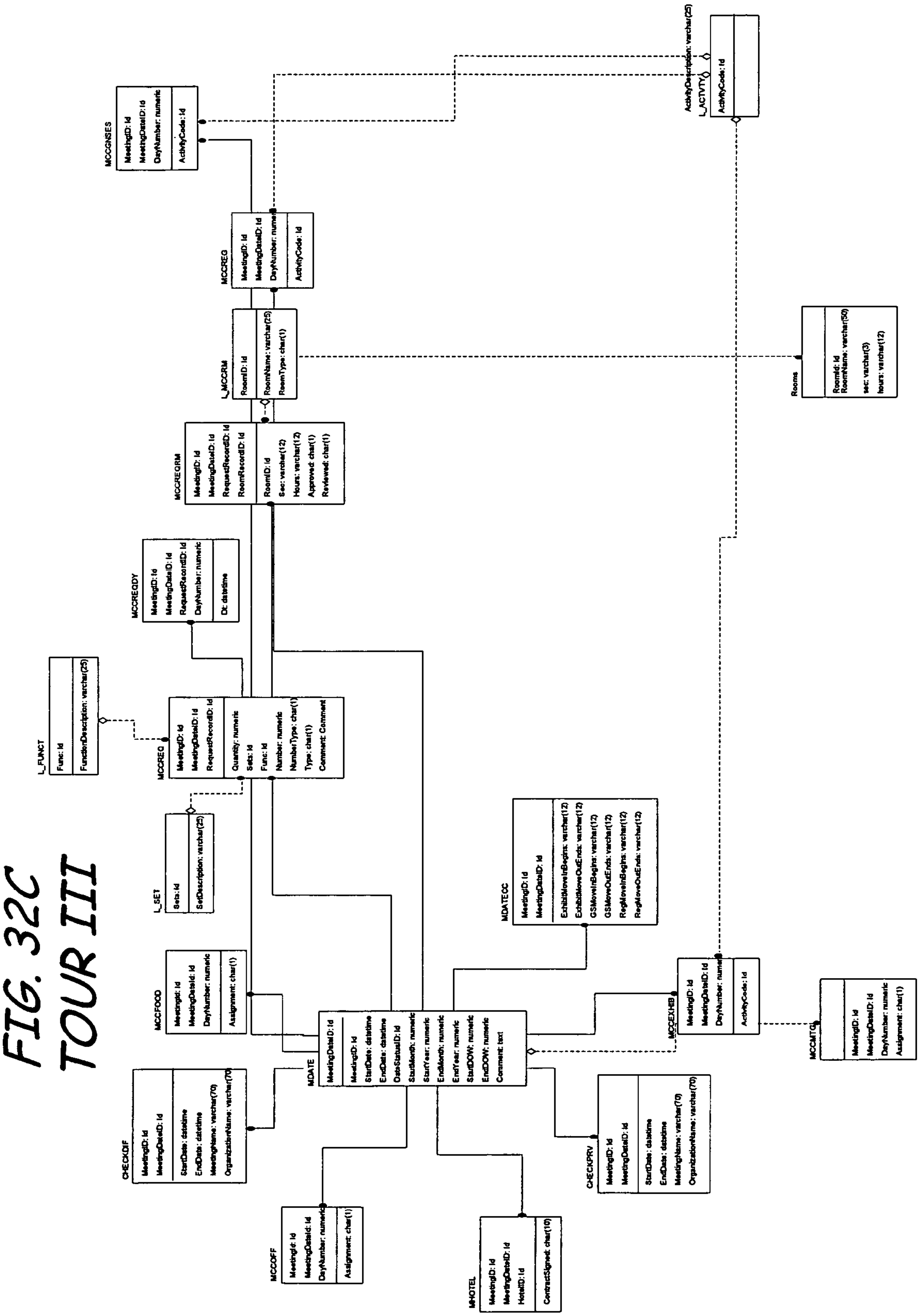
Figure 33A:
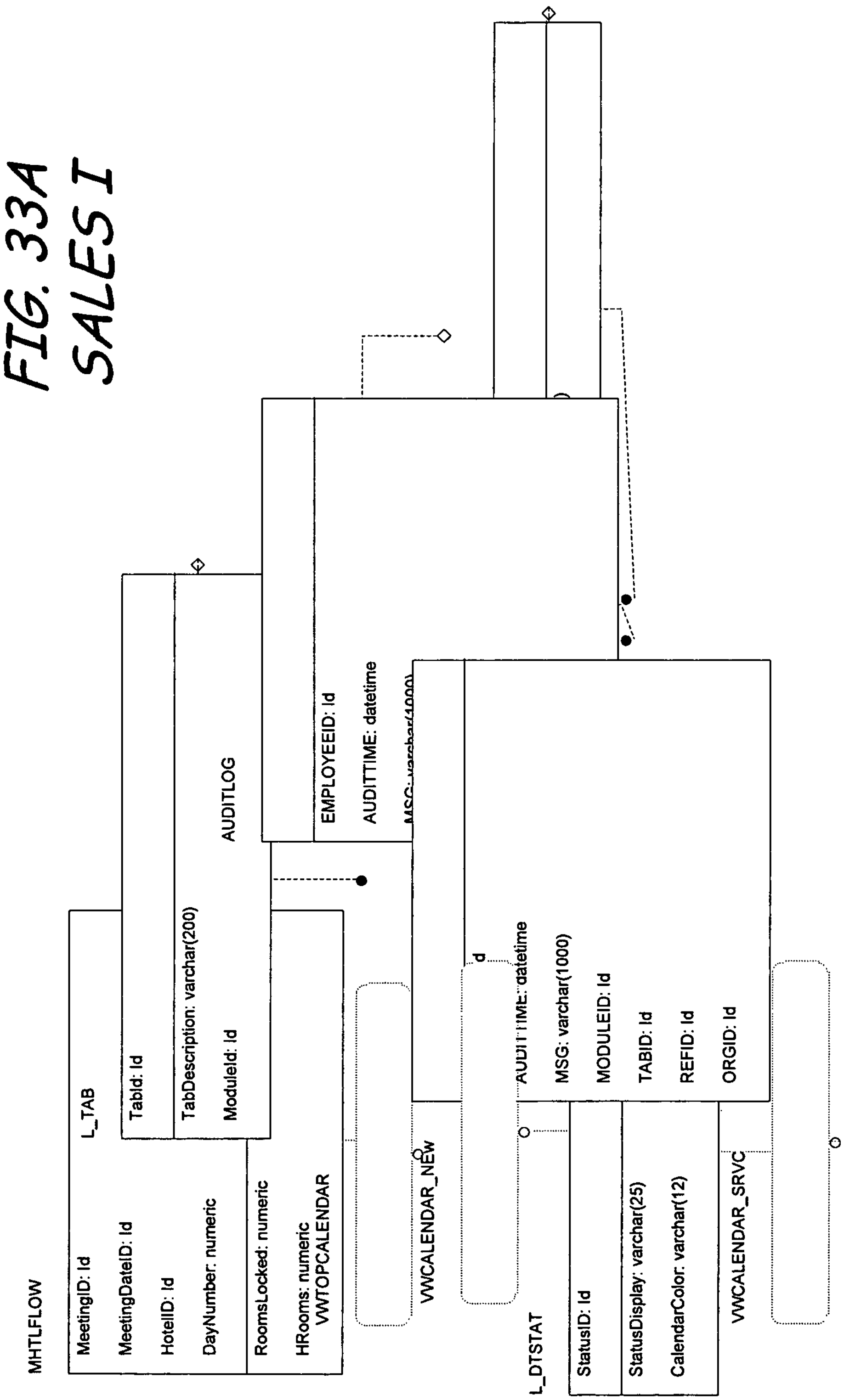
FIGS. 33A-33B show the data diagrams for the sales module.
Figures 1, 33B:
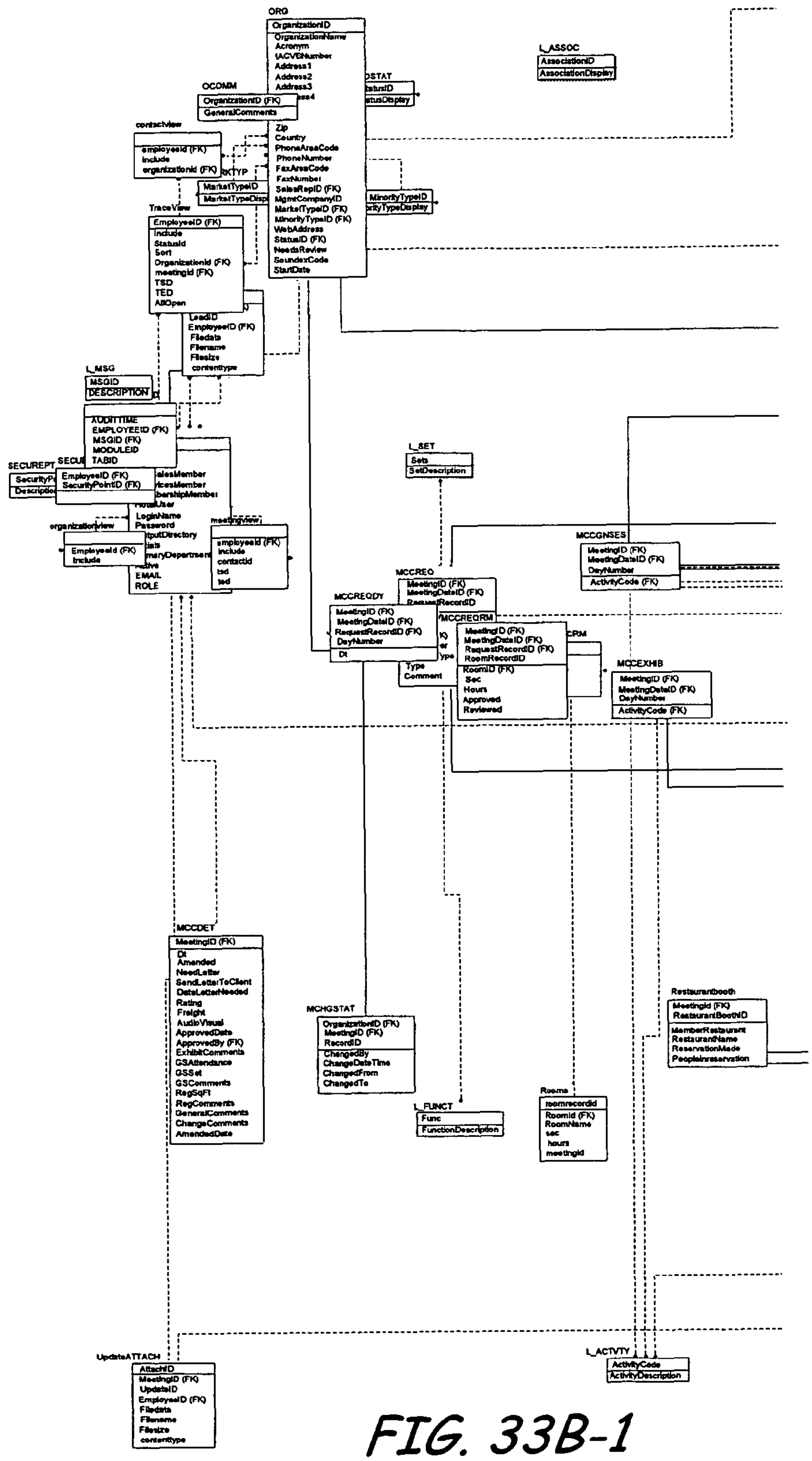
Figures 2, 33B:
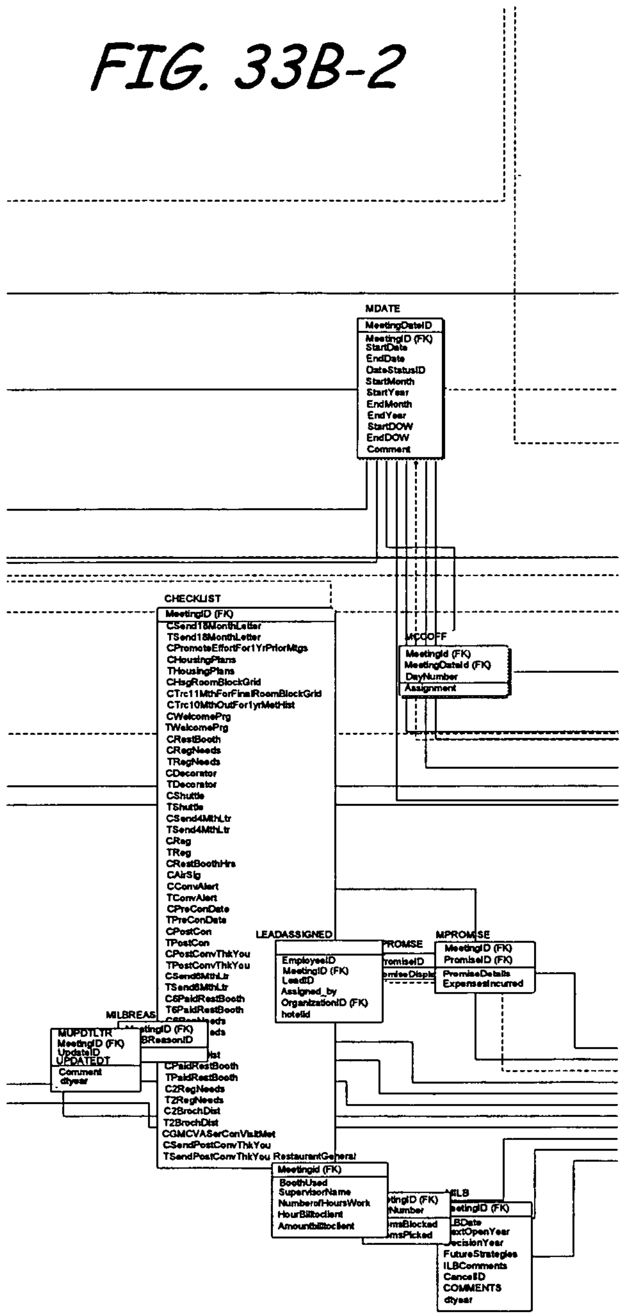
Figures 3, 33B:
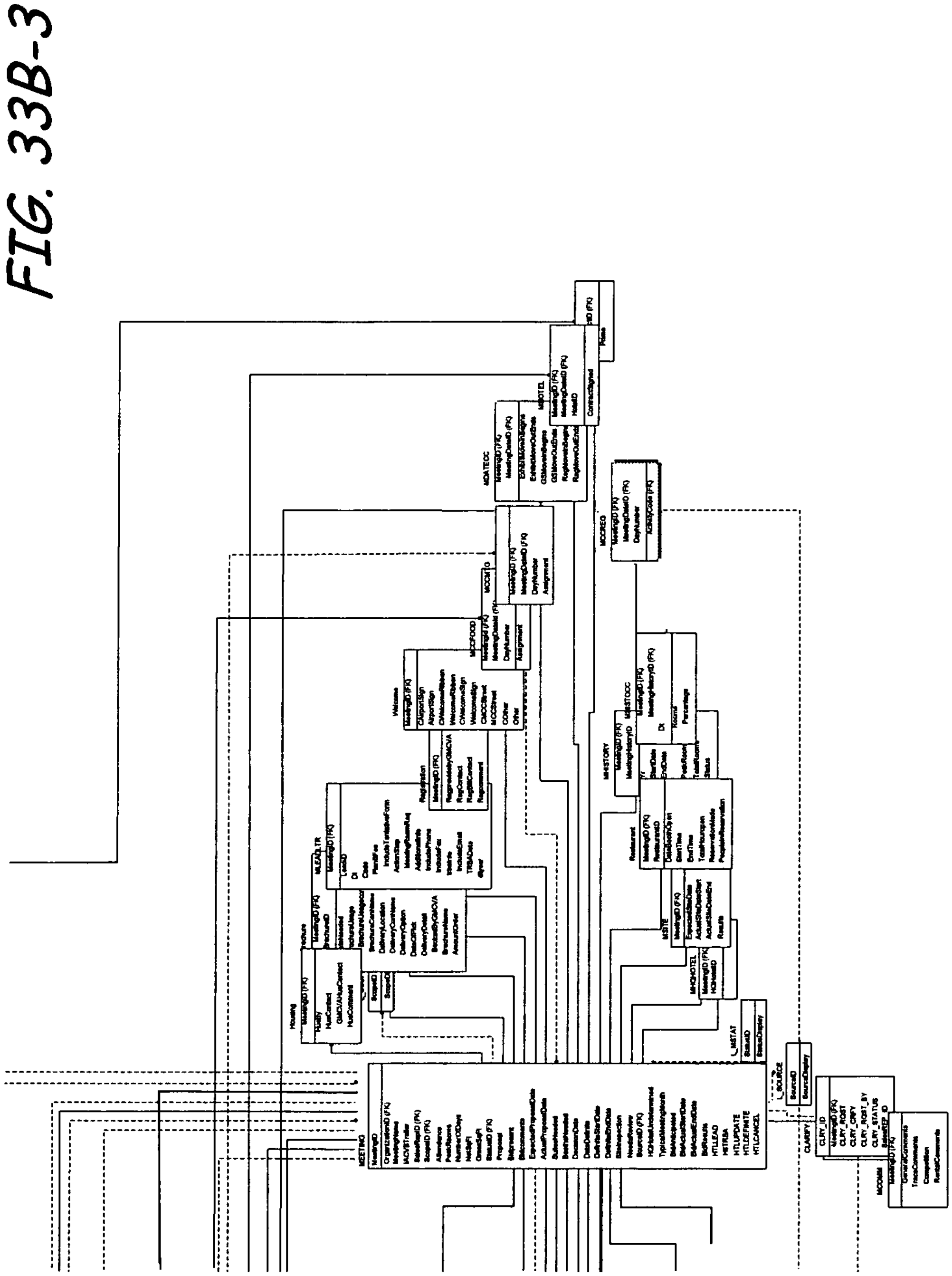
Figures 4, 33B:

A preferred embodiment of the system 100 will now be described in detail with respect to a series of screen shot captures of how the ASP hosted modules are viewed and used by the various users. The organization of the ASP modules and their relation to the SQL databases supporting those ASP modules is best understood with reference to the SQL database definitional and relational listing that are included as Appendices 1-4 which are attached and are hereby incorporated by reference and with respect to the data diagrams. FIG. 30 shows the data diagram for the MUI interface 130. FIG. 31 shows the data diagram for the membership module 122. FIGS. 32A-32C show the data diagrams for the tourism module 120. FIGS. 33A-33B show the data diagrams for the sales module 110.

Figure 3:
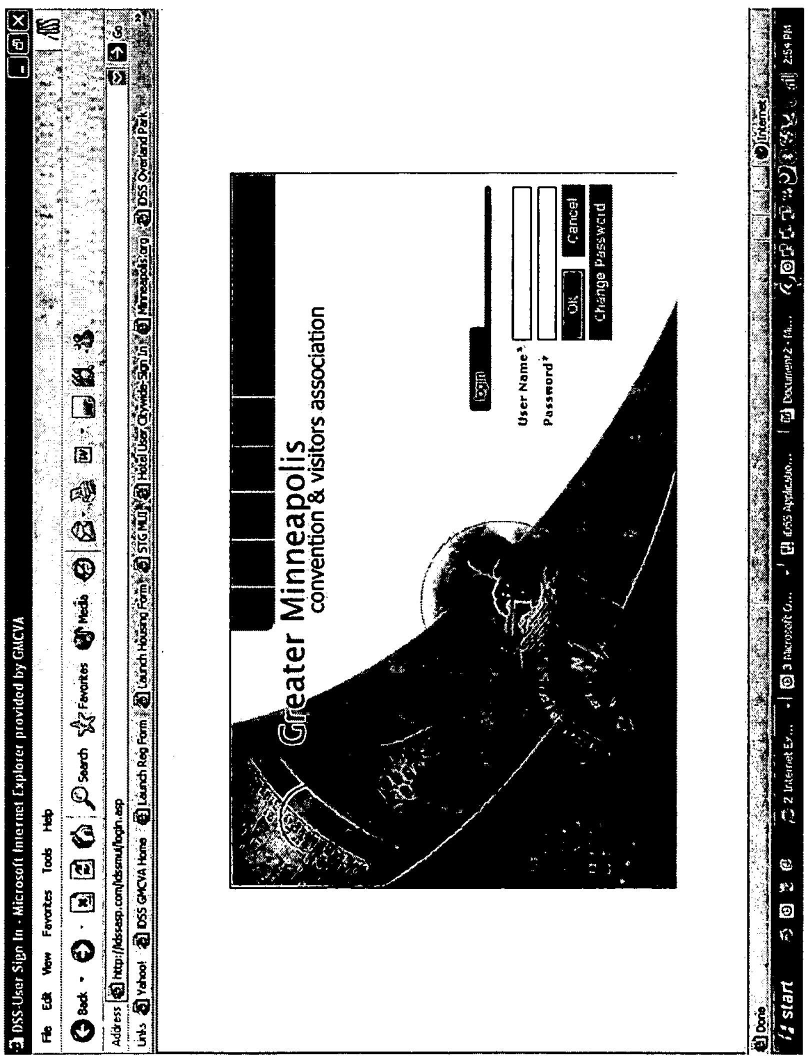
FIG. 3 is a screen shot of an initial logon screen.
Figure 4:
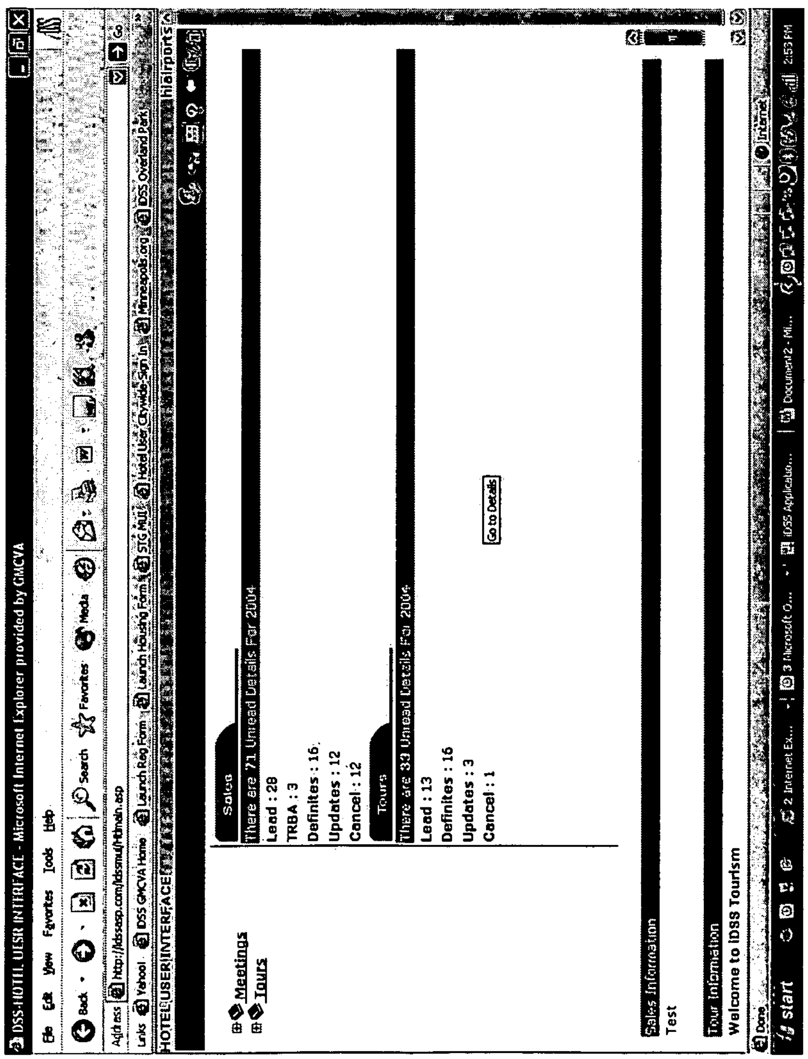
FIG. 4 is a screen shot of a first page of the MUI.
Figure 5:
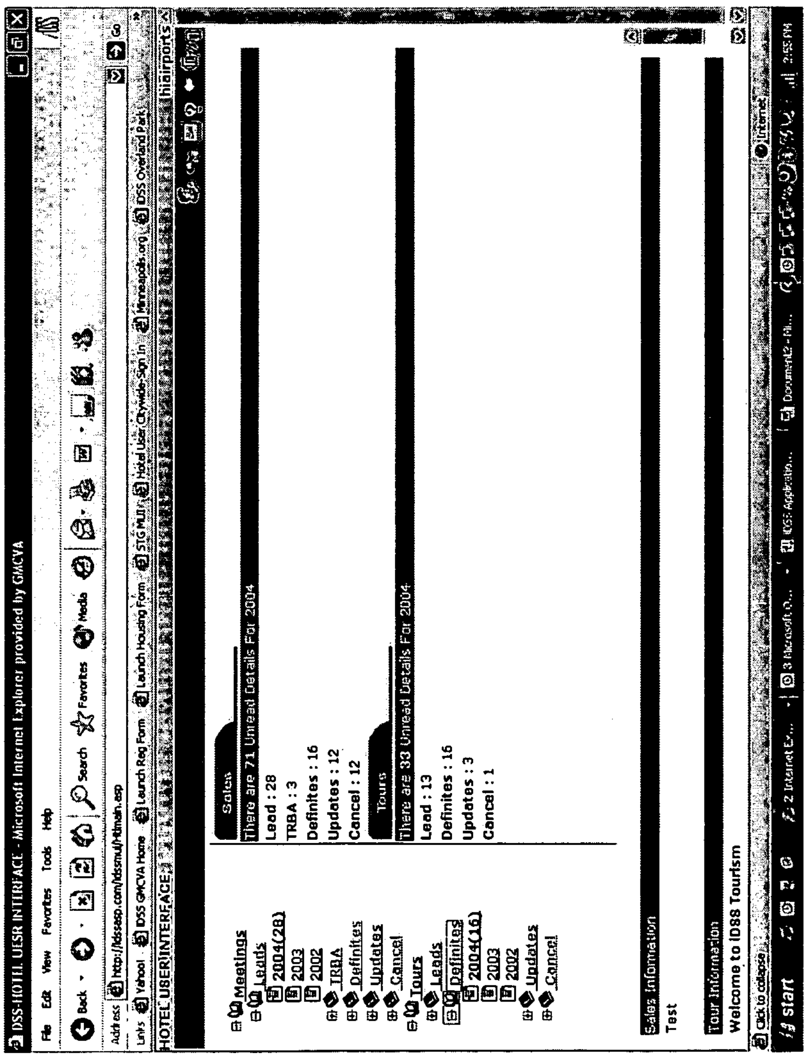
FIG. 5 is a tree-view version of FIG. 4 that permits global navigation.

FIG. 3 is a screen shot of an initial logon screen for the MUI 130. As has been previously described, the MUI 130 is a secure web page. In this embodiment, a user name and password are used for security, although other known secure access techniques can be used. FIG. 4 is a screen shot of a first page of the MUI 130 showing user buttons for Leads, Tentative Response/Resource/Room Block Agreements (TRBA), Definites, Updates and Cancels. FIG. 5 shows a tree-view version of the MUI 130 as shown in FIG. 4 that permits global navigation along the lefthand side of the window.

Figure 6A:
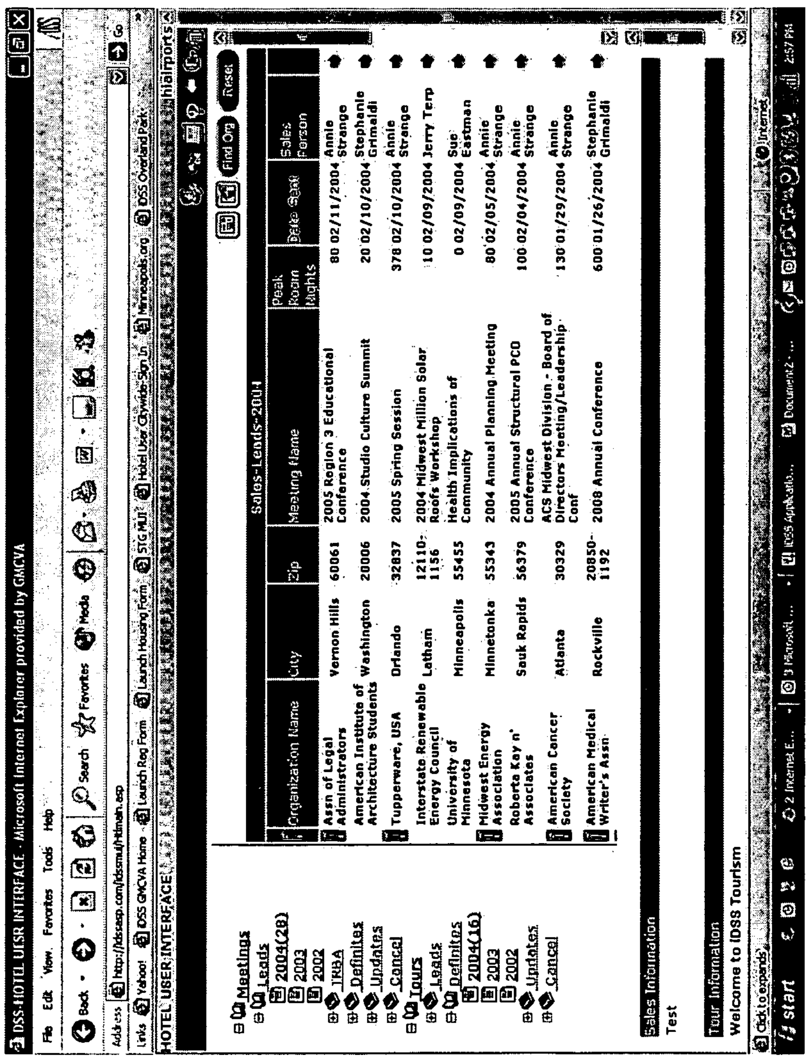
FIG. 6A is a drill-down version of the Leads option of FIG. 5.
Figure 6B:
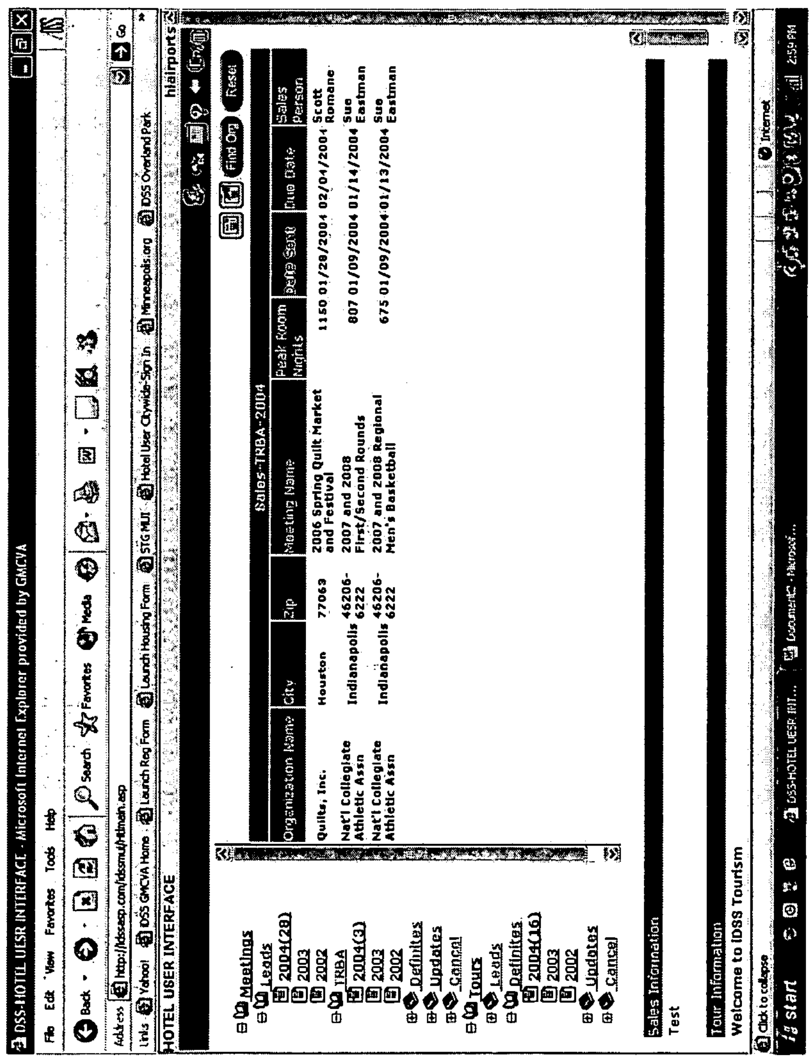
FIG. 6B is a drill-down version of the TRBA option of FIG. 5.
Figure 6C:
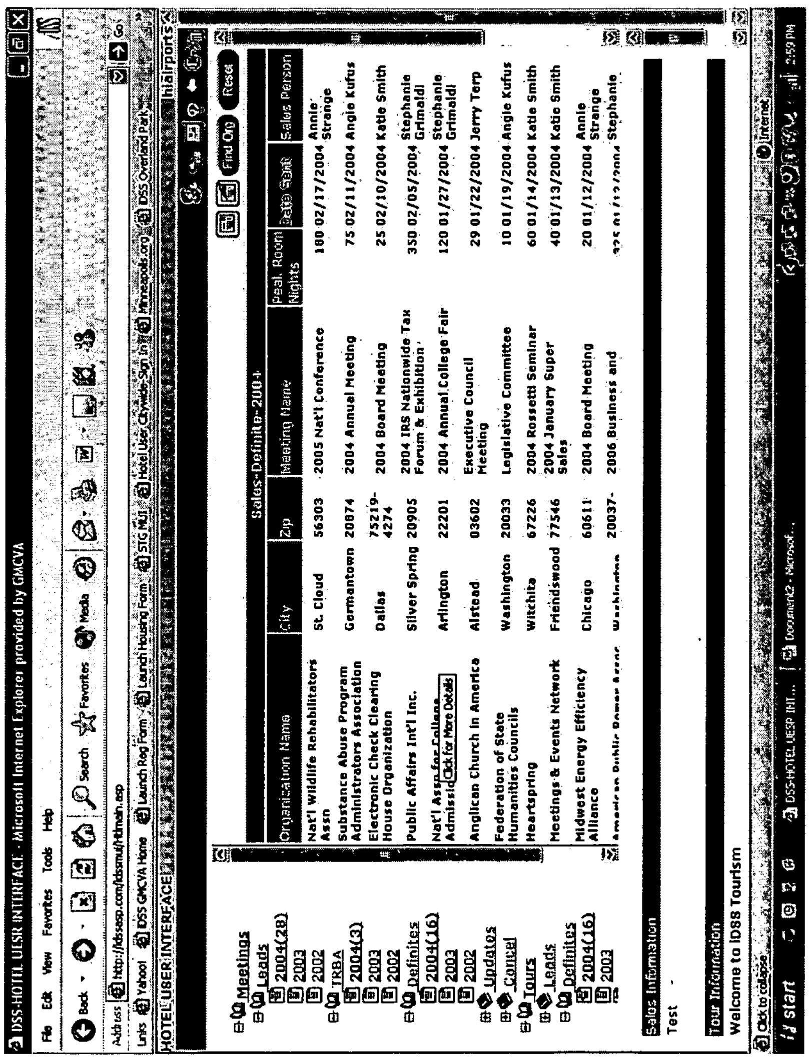
FIG. 6C is a drill-down version of the Definites option of FIG. 5.
Figure 6D:
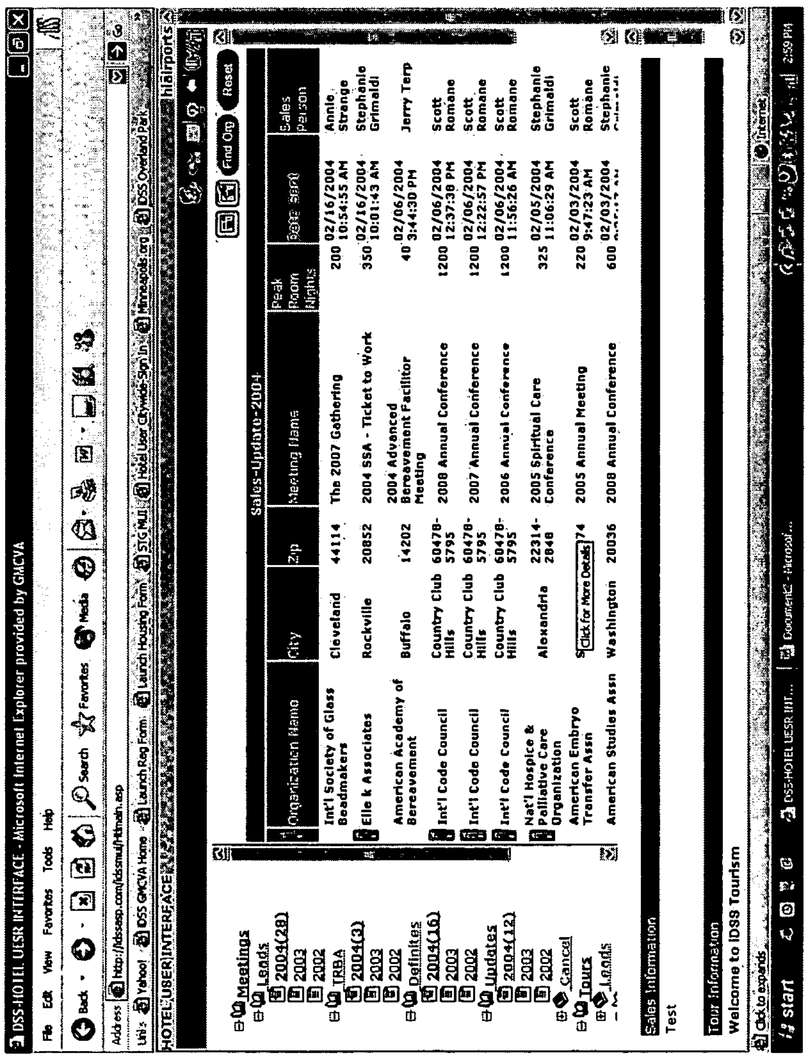
FIG. 6D is a drill-down version of the Updates option of FIG. 5.
Figure 6E:
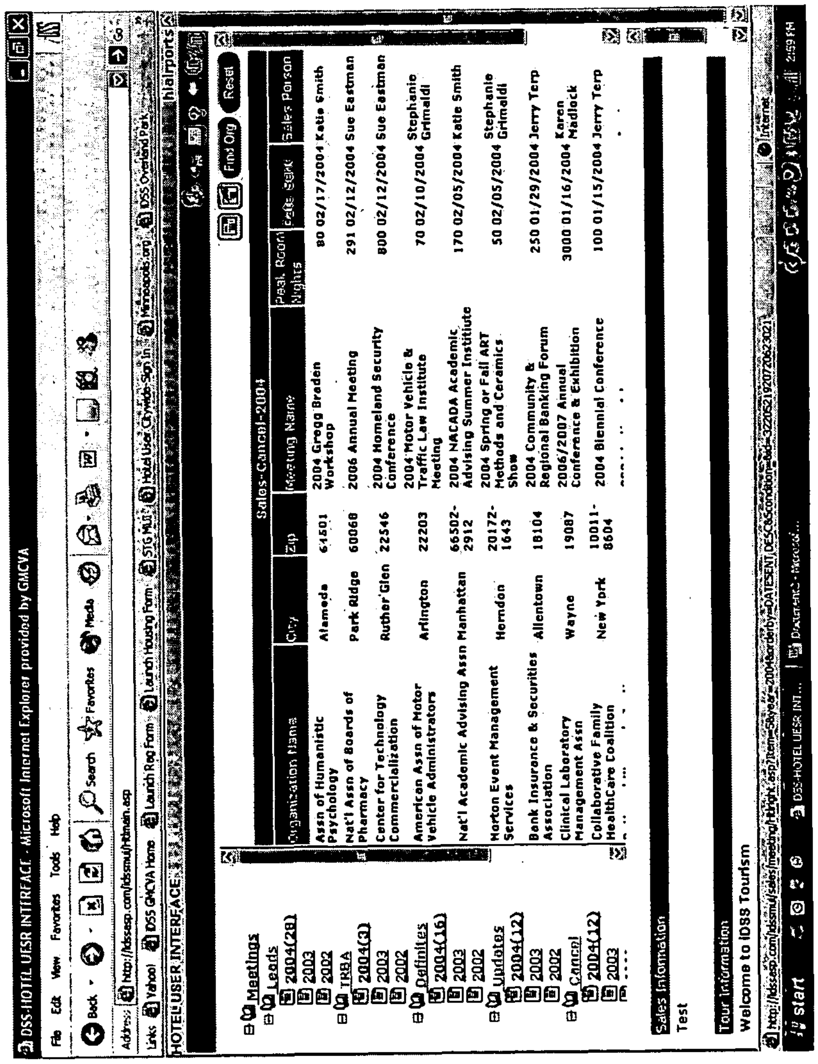
FIG. 6E is a drill-down version of the Cancel option of FIG. 5.

FIGS. 6A-6E are drill down versions showing screen shots of the screen displayed when the associated button on the navigation pages are activated. FIG. 6A shows the drill-down of the Leads option of FIG. 5 in which potential leads for destination event organizers are listed. The icon on the left of this window indicates the presence of an RFP and/or note page associated with a given lead. FIG. 6B shows the drill-down version of the TRBA option of FIG. 5. The total number of peak room nights requested for a given RFP are indicated in the listing. In addition, a due date of when a response by a hotel member, for example, is due using the TRBA as will be described. FIG. 6C shows the drill-down version of the Definites option of FIG. 5. These listings show future destination events for which there is a definite commitment and the process of individual contracts between the destination event organizer and given hotel members can occur. FIG. 6D is a drill-down version of the Updates option of FIG. 5 showing any changes to the original requirements in the RFP for a given potential destination event. FIG. 6E is a drill-down version of the Cancel option of FIG. 5 showing potential destination events that have cancelled or rejected a response to an RFP.

Figure 7A:
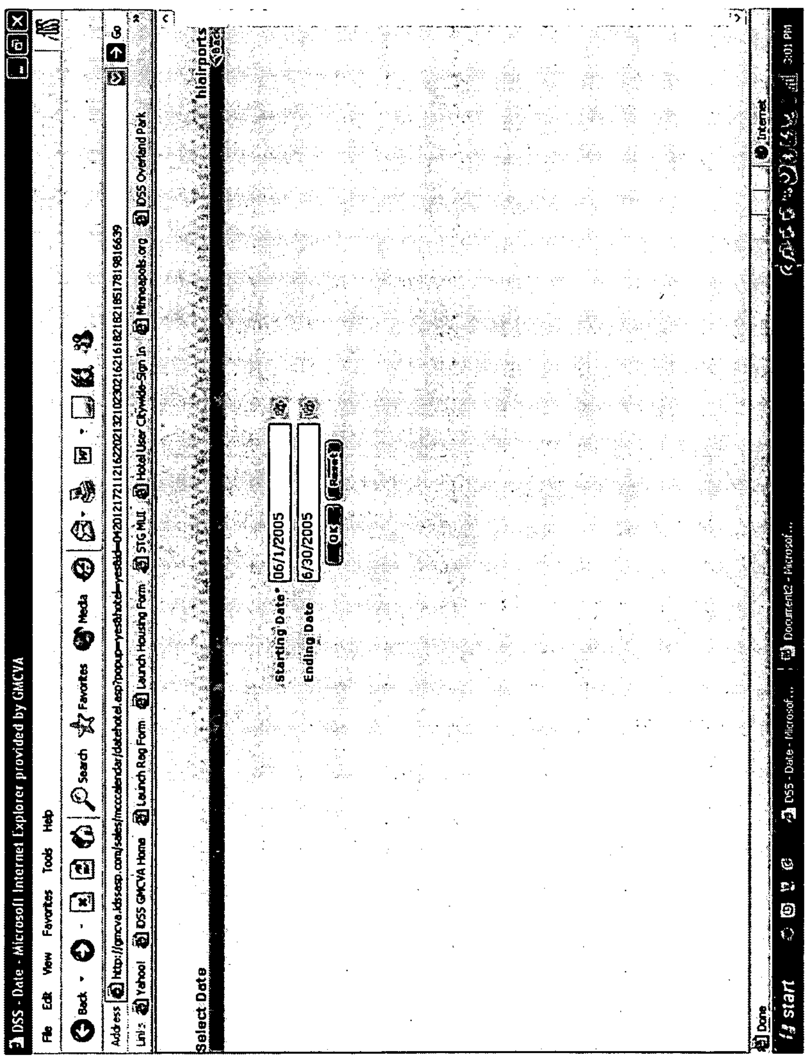
FIG. 7A is the query page for the Convention Calendar page.
Figure 7B:
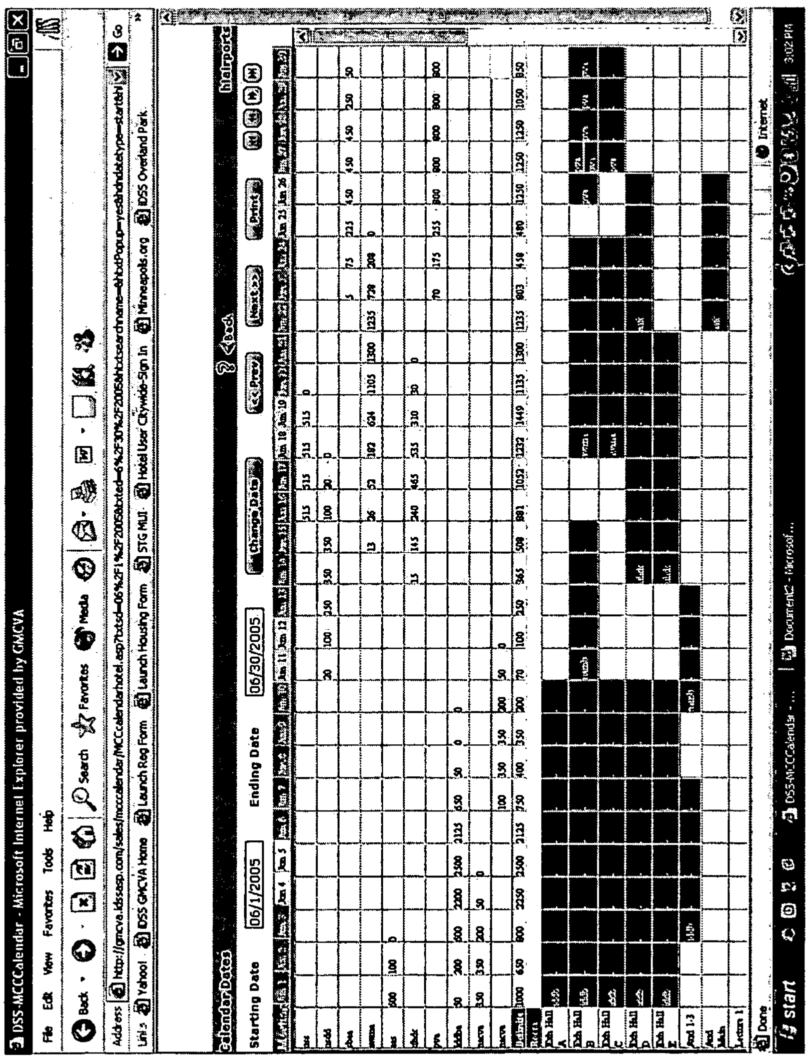
FIG. 7B is a sample display of the Convention Calendar.

FIG. 7A is the query page for the Convention Calendar page. An authorized member user or CVB staff person can enter a date range to view availability at the convention center or other major venues for that destination. FIG. 7B is a sample display of the Convention Calendar. (color coded to reflect tentative, tentative II, booked, etc). It can be seen that the different convention rooms, facility or venues are listed along the left hand column with blocks of booked or tentative reserved numbers of attendees shown for each room/venue.

Figure 8:
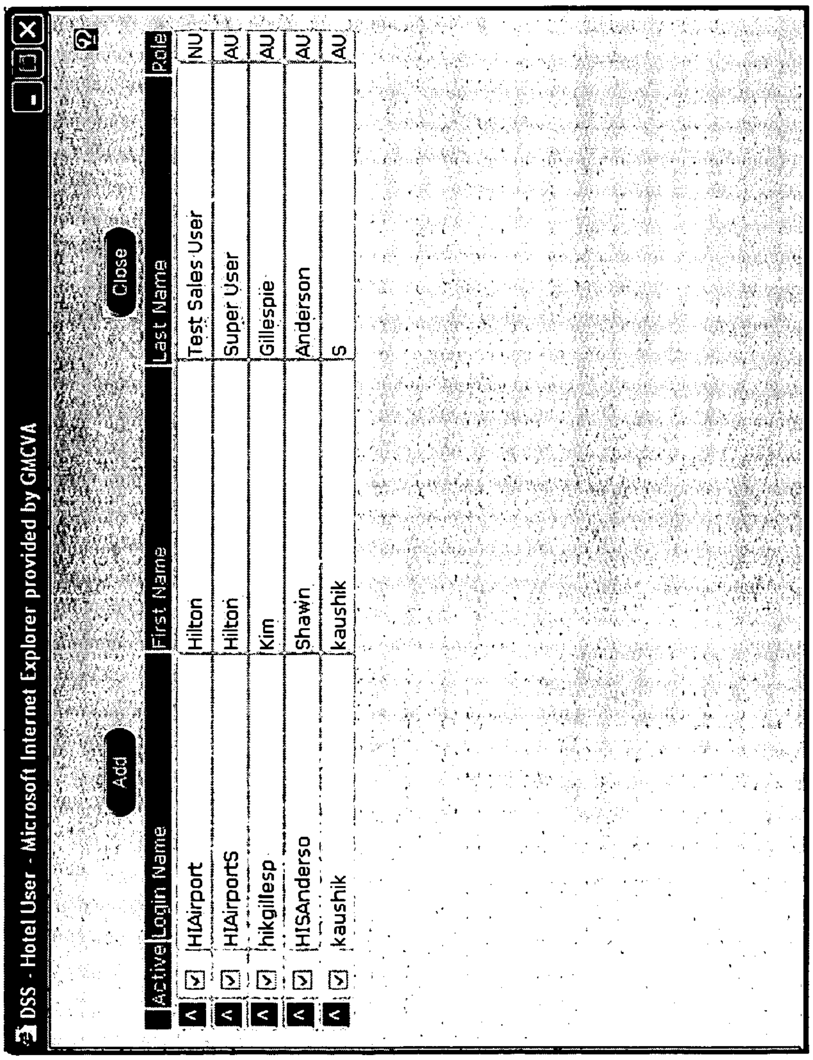
FIG. 8 is an example of a member administration page.
Figure 9:
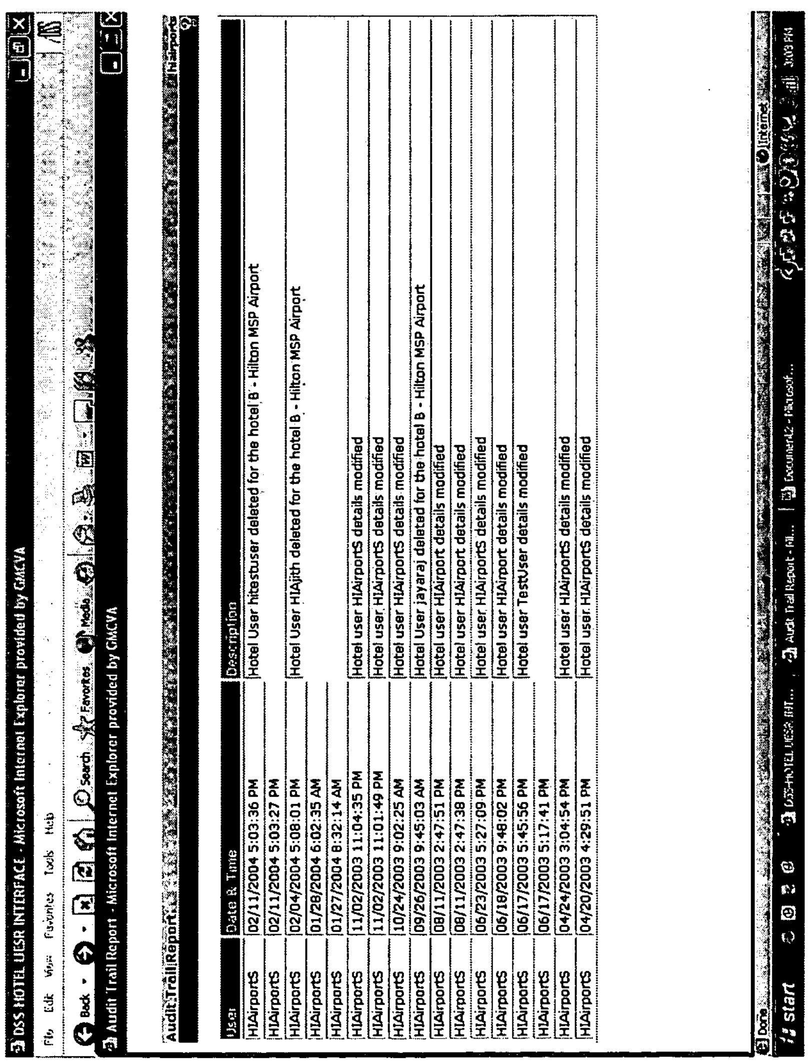
FIG. 9 is an example of an audit trail page.

FIG. 8 is an example of a member administration page. Contact and login information, as well as related information maintained by the CVB for each member can be displayed and updated on this page. FIG. 9 is an example of an audit trail page that can be used by CVB staff to document changes made both by CVB staff and by members.

Figure 10A:
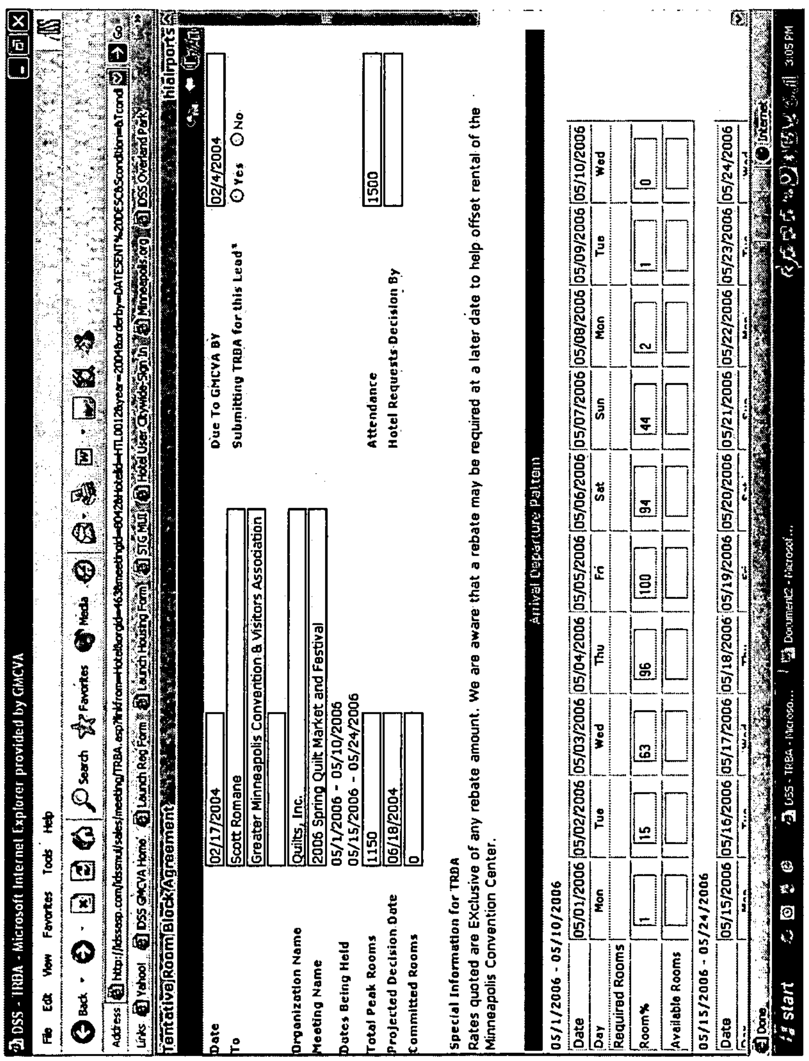
FIGS. 10A and 10B are partial screen shots of an example TRBA form from FIG. 6B.
Figure 10B:
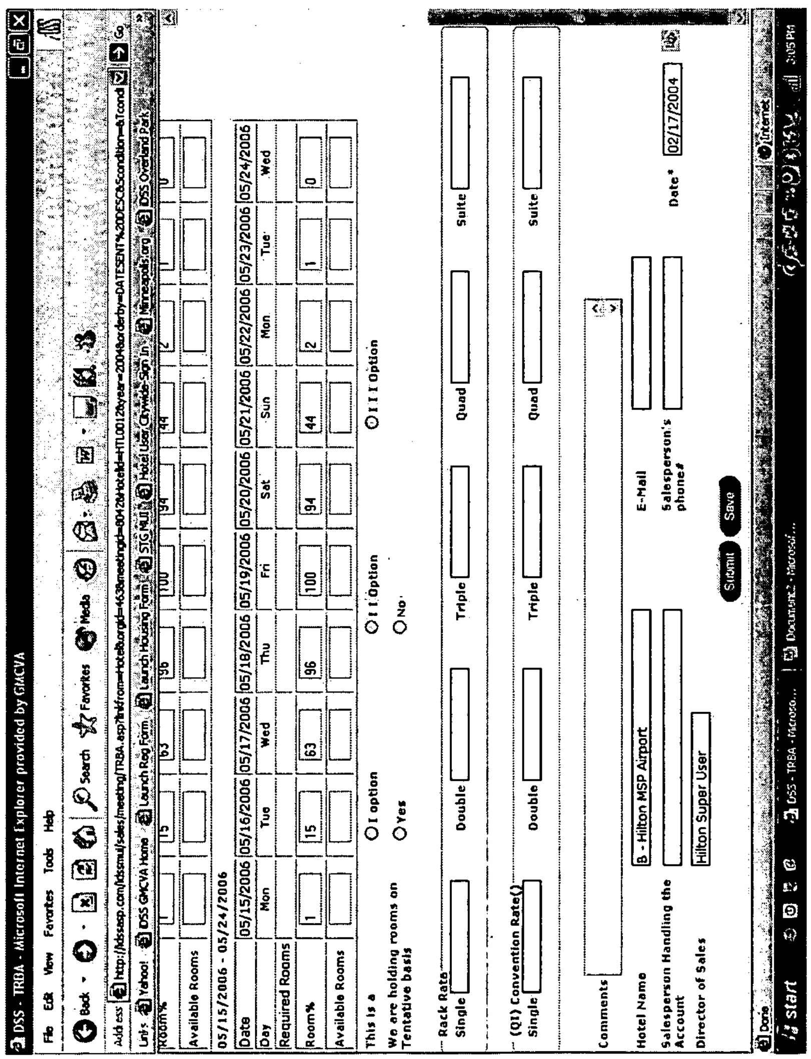

FIGS. 10A and 10B are screen shots of an example TRBA (Tentative Resource/Response/Room Blocking Agreement)

form that would be accessed from the screen in FIG. 6B. In this embodiment, the TRBA form includes auto calculation fields that can automatically fill in room numbers based on, for example, percentages of a given hotels available rooms. The TRBA form permits the quoting of different rack rates from convention rates, and also permits the member to specify whether the TRBA is resulting in a holding of the rooms and under what options or conditions the quote is being made.

Figure 11A:
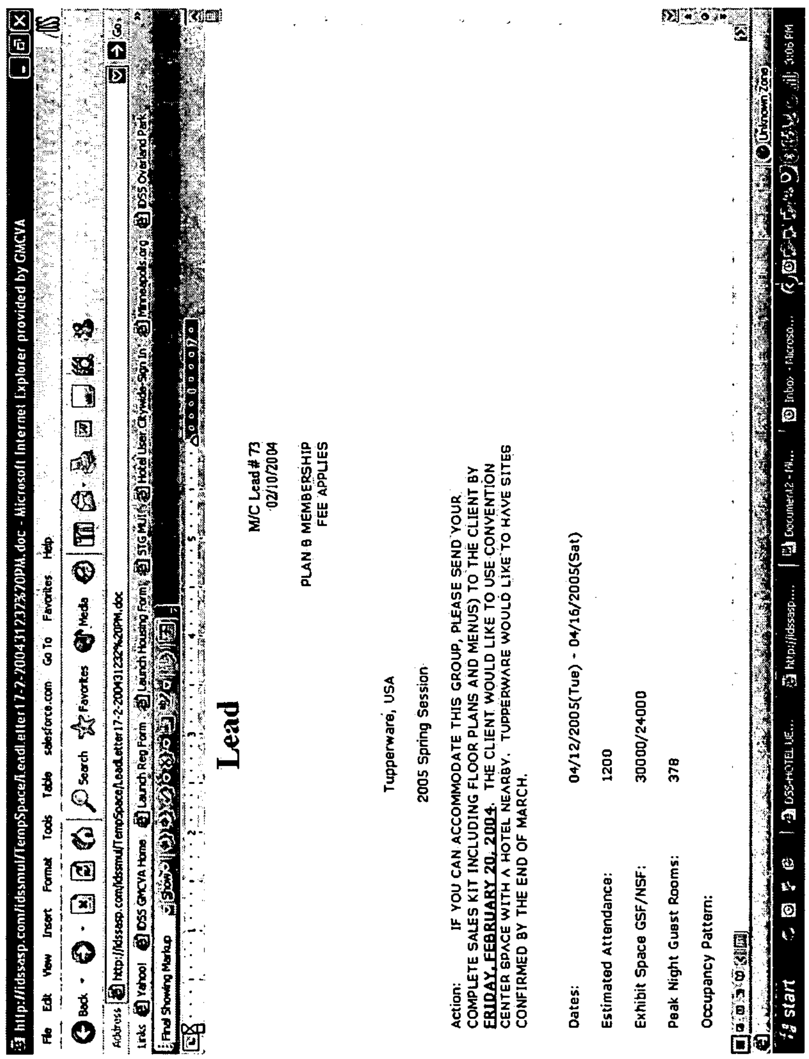
FIG. 11A is a screen shot of details of a Lead from FIG. 6A.
Figure 11B:
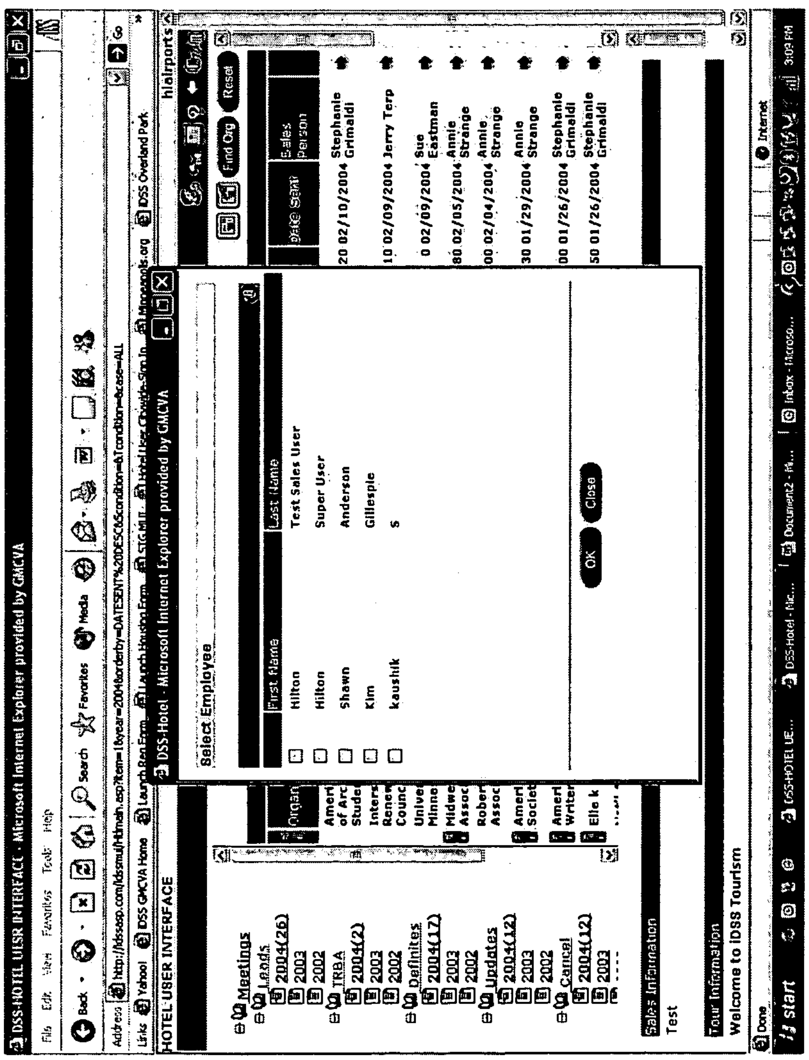
FIG. 11B is a screen shot of a Lead assignment page for assigning responsibility for a given lead within a service provider member.

FIG. 11A is a screen shot of an exploded details view of the Lead button from FIG. 6A. This page includes information that preferably may be edited as a Word Document by the CVB sales staff or a member. FIG. 11B is a screen shot of a Lead assignment page for assigning responsibility for a given lead within a service provider member.

Figure 12:
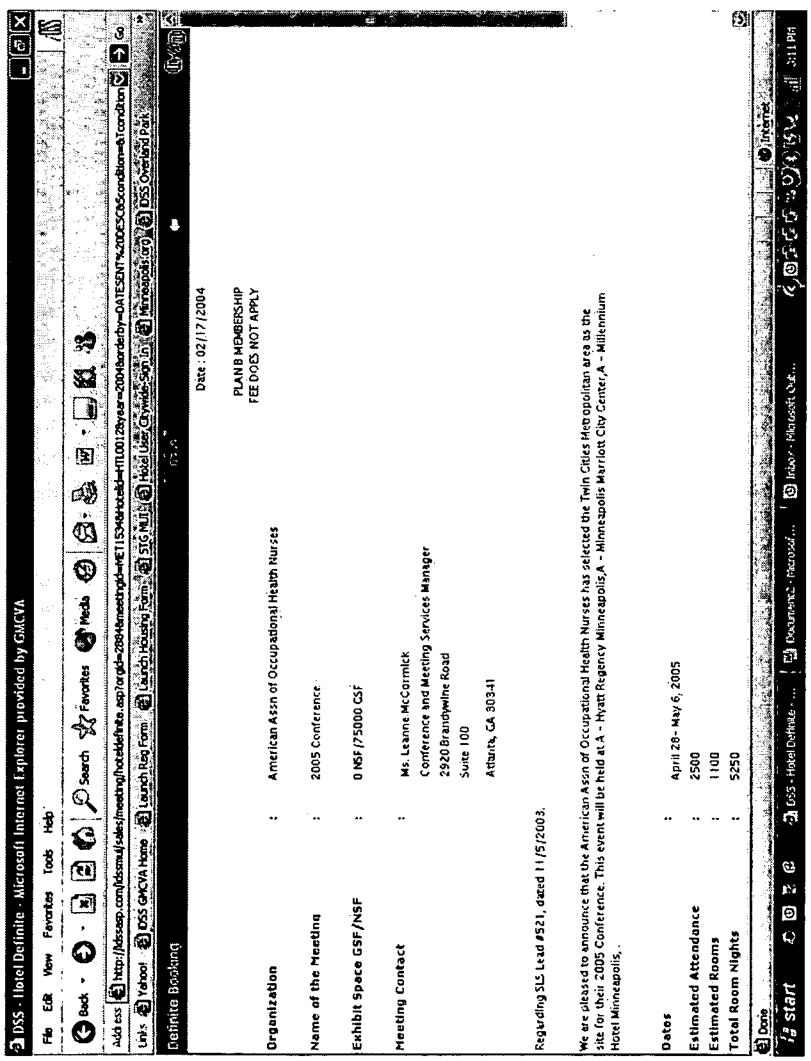
FIG. 12 is a screen shot of a Definite page from FIG. 6C.
Figure 13:
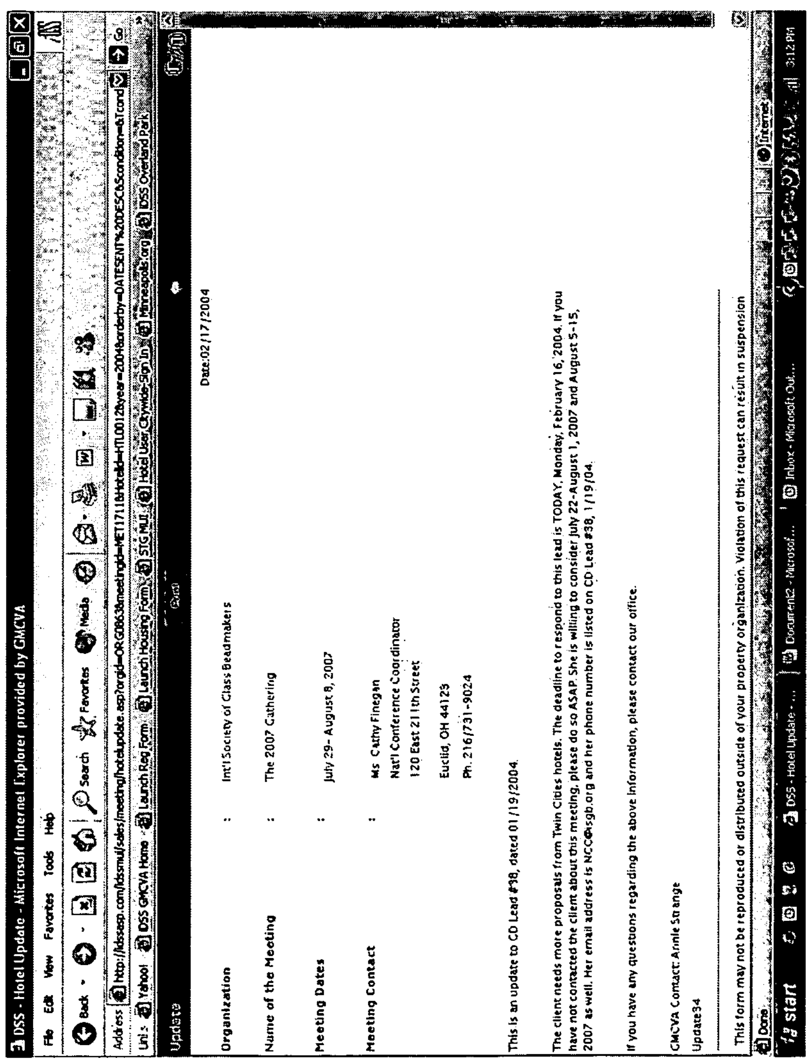
FIG. 13 is a screen shot of an Update page from FIG. 6D.
Figure 14:
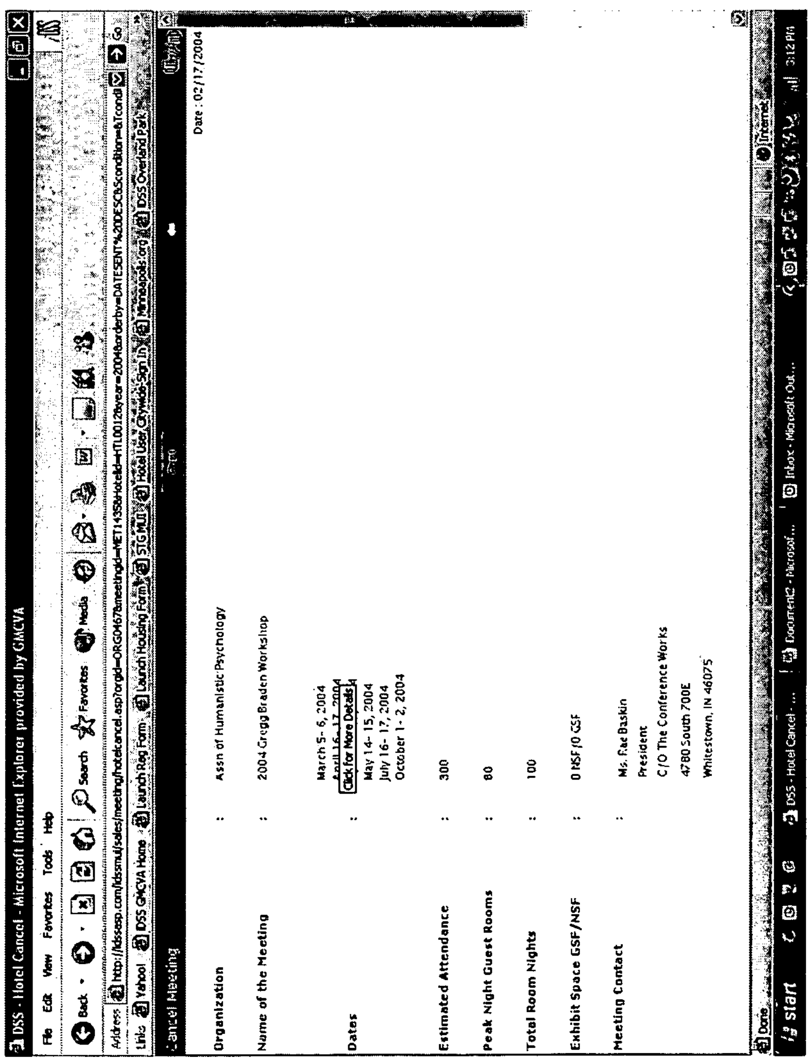
FIG. 14 is a screen shot of a Cancel page from FIG. 6E.

FIG. 12 is a screen shot of a Definite page from FIG. 6C. This information can include not only the details of the accepted response to the RFP, but also additional information as indicated by the destination event organizer about the definite booking. FIG. 13 is a screen shot of an Update page from FIG. 6D. The update may be for a Lead or for a Definite. The use of the update page avoids the need for the CVB sales staff to be continually contacting member organizations by email or phone call in the event of changes to a given potential destination event RFP. FIG. 14 is a screen shot of a Cancel page from FIG. 6E.

Figure 15:
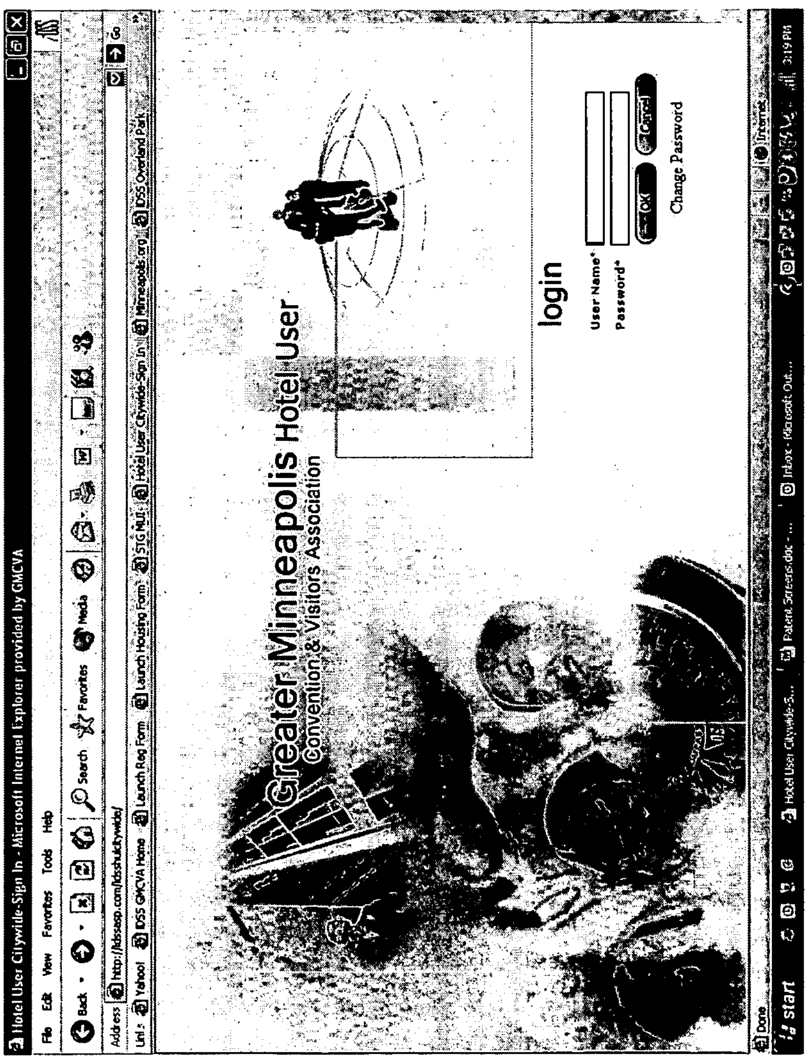
FIG. 15 is a screen shot of the Future Services Inventory Calendar login.
Figure 16A:
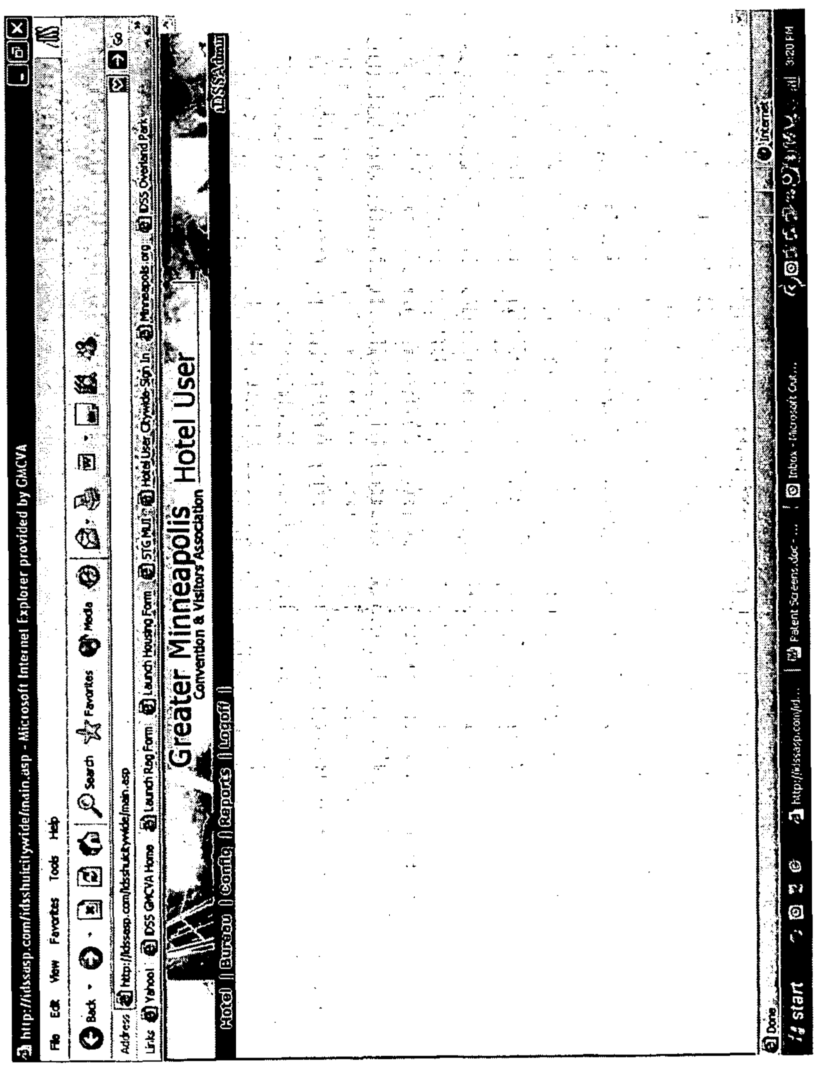
FIG. 16A is a navigation screen for Future Services Inventory Calendar.
Figure 16B:
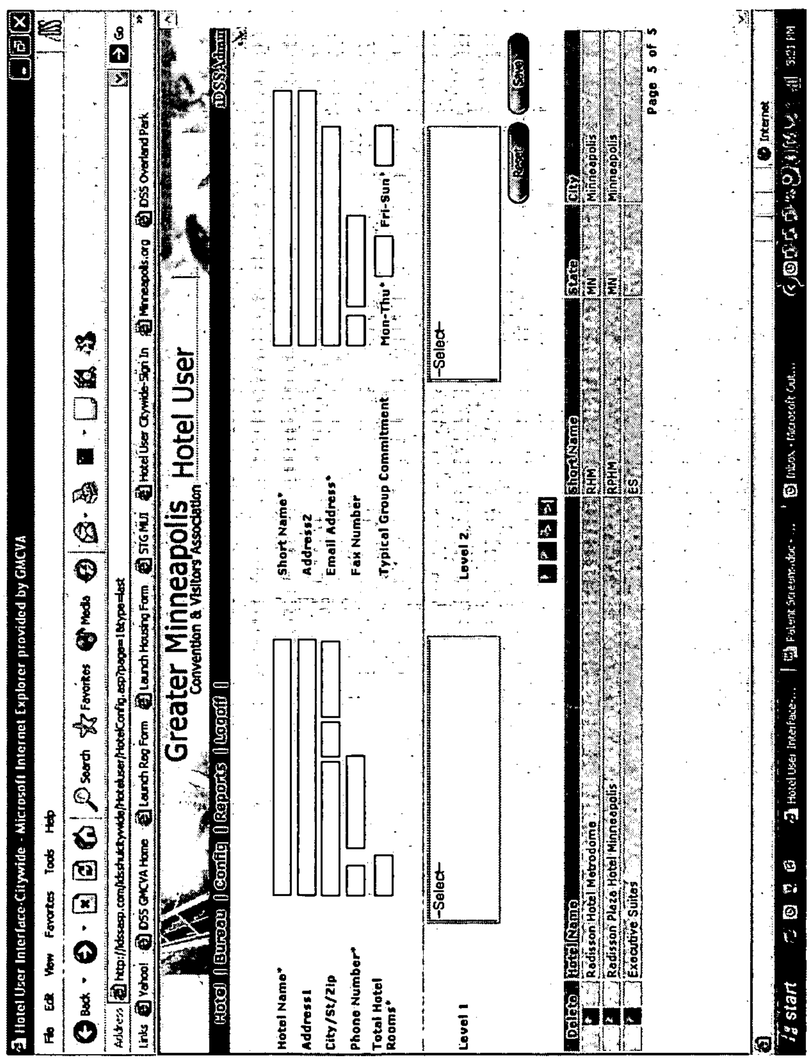
FIG. 16B is a screen shot of contact and related information for a member.
Figure 16C:
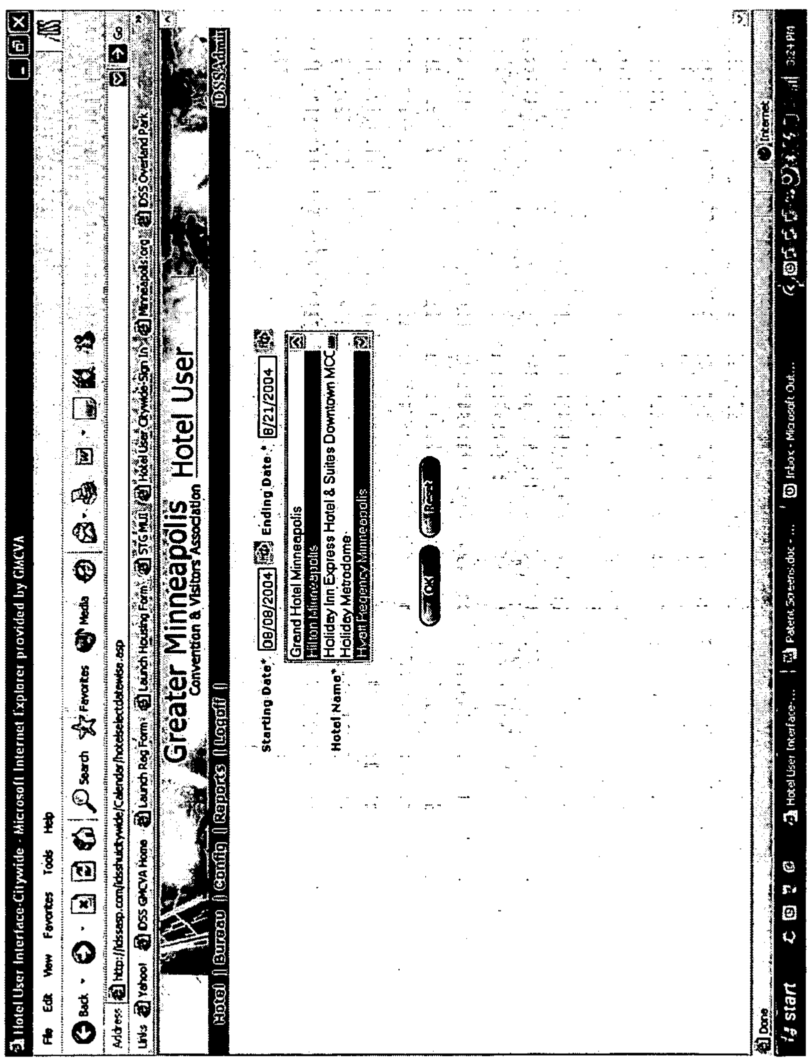
FIG. 16C is a screen shot of hotel information navigation for an administrator.
Figure 16D:
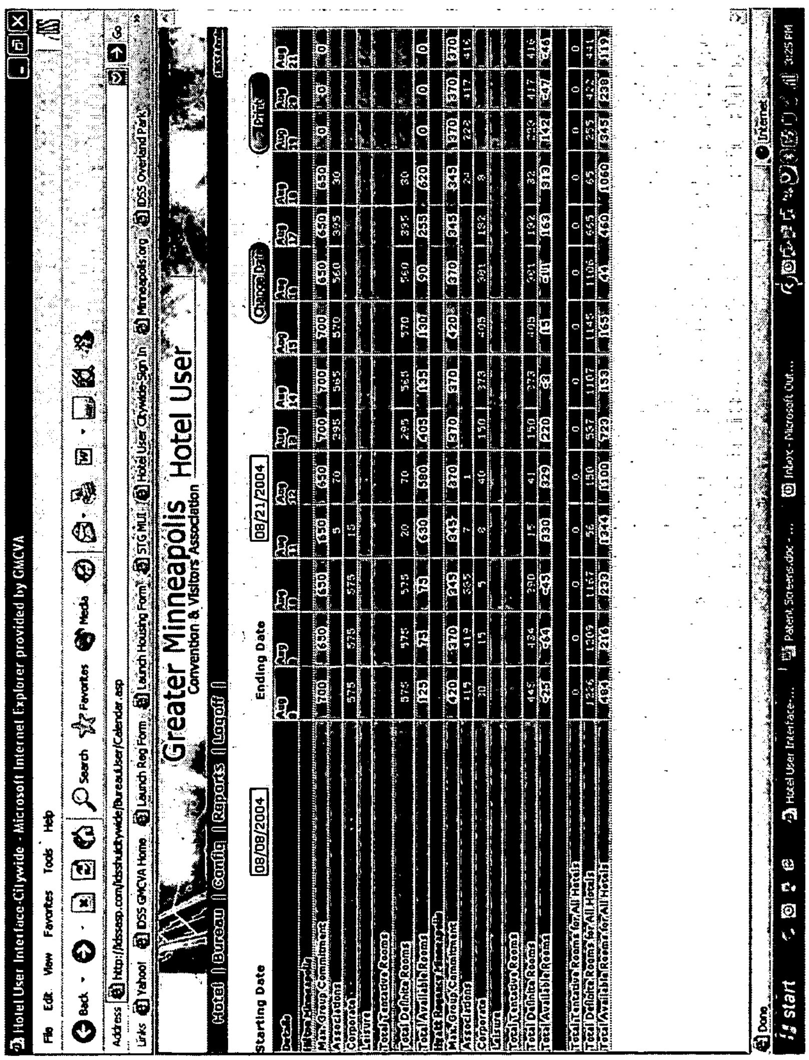
FIG. 16D is a screen shot of the calendar view of the hotel information selected by an administrator from FIG. 16C.
Figure 16E:
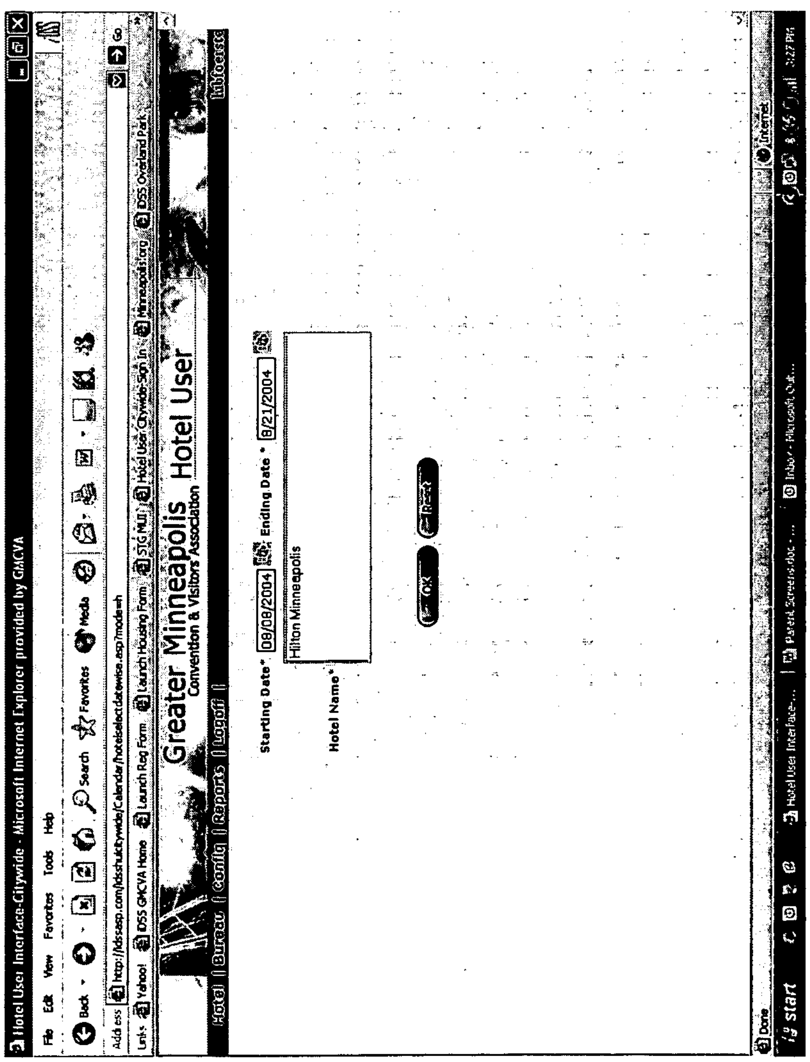
FIG. 16E is a screen shot of hotel information navigation for a hotel member.
Figure 16F:
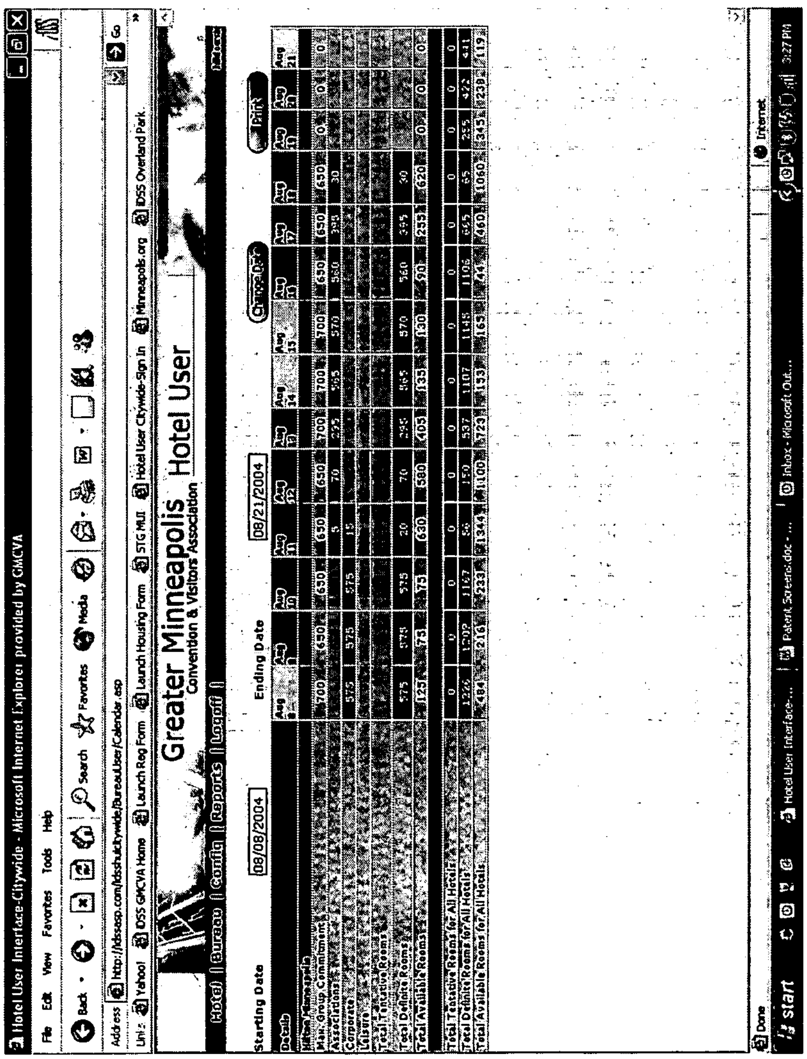
FIG. 16F is a screen shot of a calendar view of the hotel information selected by a hotel member from FIG. 16E.

FIG. 15 is a screen shot of the Future Services Inventory Calendar login. As with the MUI 130, this interface is preferably a secure login interface. FIG. 16A is a navigation screen for Future Services Inventory Calendar. The navigation buttons are shown in the navigation bar at the upper left of the screen. FIG. 16B is a screen shot of contact and related information for a member. FIG. 16C is a screen shot of hotel information navigation for use by a CVB administrator to view calendar availability for selected hotels, for example. FIG. 16D is a screen shot of the calendar view of the hotel information selected by an administrator from FIG. 16C. Both tentative and definite room availability are shown for each hotel, along with totals for both at the bottom of the window for the calendar range selected by the administrator/CVB sales staff. FIG. 16E is a screen shot of hotel information navigation for a hotel member similar to FIG. 16C. FIG. 16F is a screen shot of a calendar view of the hotel information selected by a hotel member from FIG. 16E. In this case, only a single hotel is shown as available to a given hotel member user. If a hotel member user was responsible for a plurality of commonly owned hotels in the destination, for example, then the hotel member user would be able to select one or more of those hotels. It will be seen that, unlike FIG. 16D, only information for a given hotel and total lines at bottom of screen would be available to a hotel member.

Figure 17:
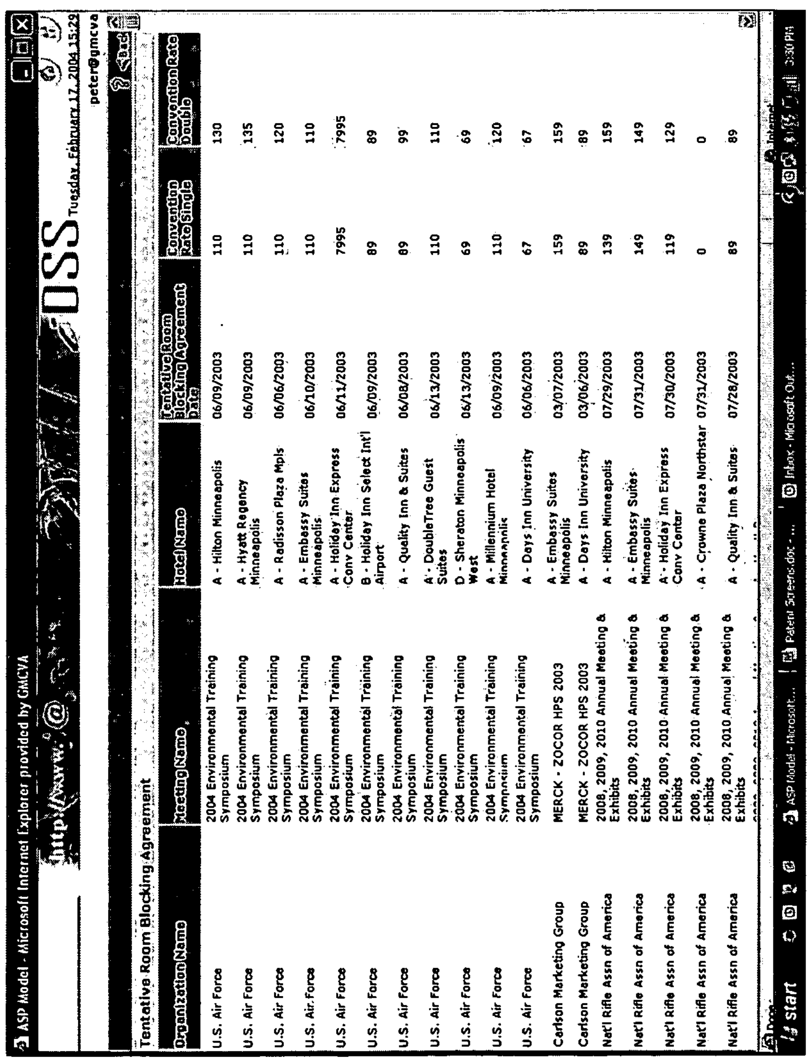
FIG. 17 is a screen shot of the combined TRBA navigation screen for CVB sales staff.

FIG. 17 is a screen shot of the combined TRBA navigation screen for CVB sales staff. This screen shows the results of the combined TRBA forms as submitted by the various hotel members, for example, for each of the tentative/definite destination events currently being tracked by the CVB sales staff.

Figure 18A:
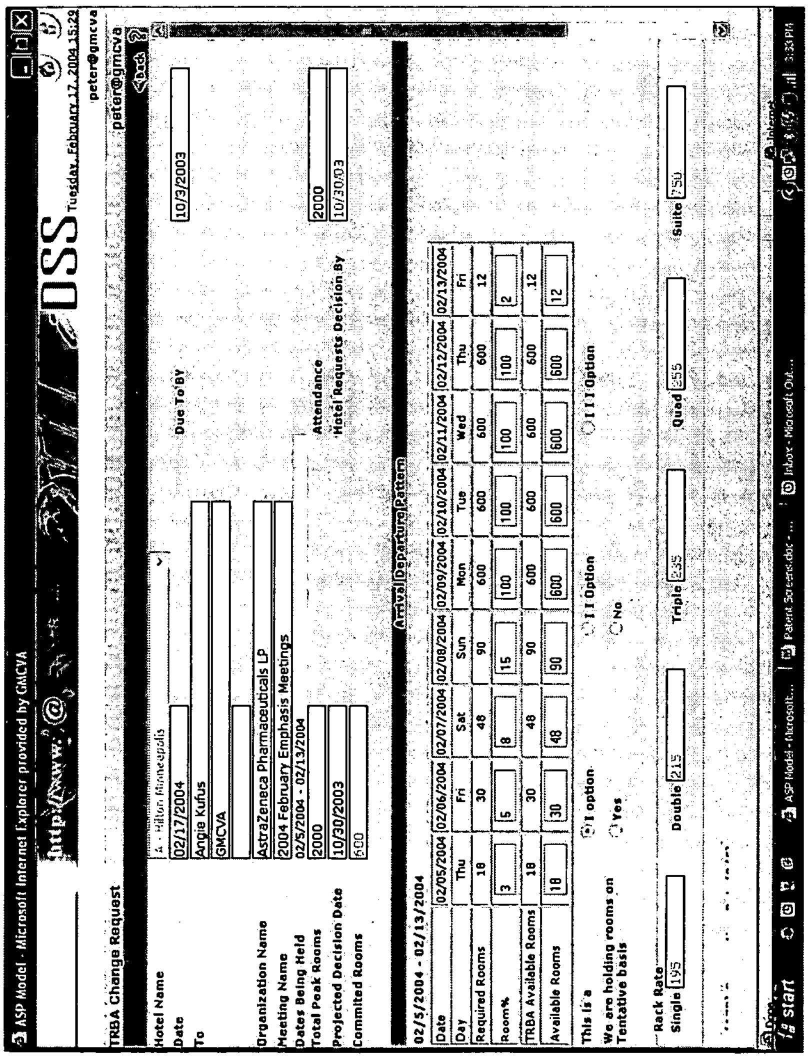
FIGS. 18A, 18B are partial screen shots of change requests for TRBAs submitted by hotel members to be reviewed by CVB sales staff.
Figure 18B:
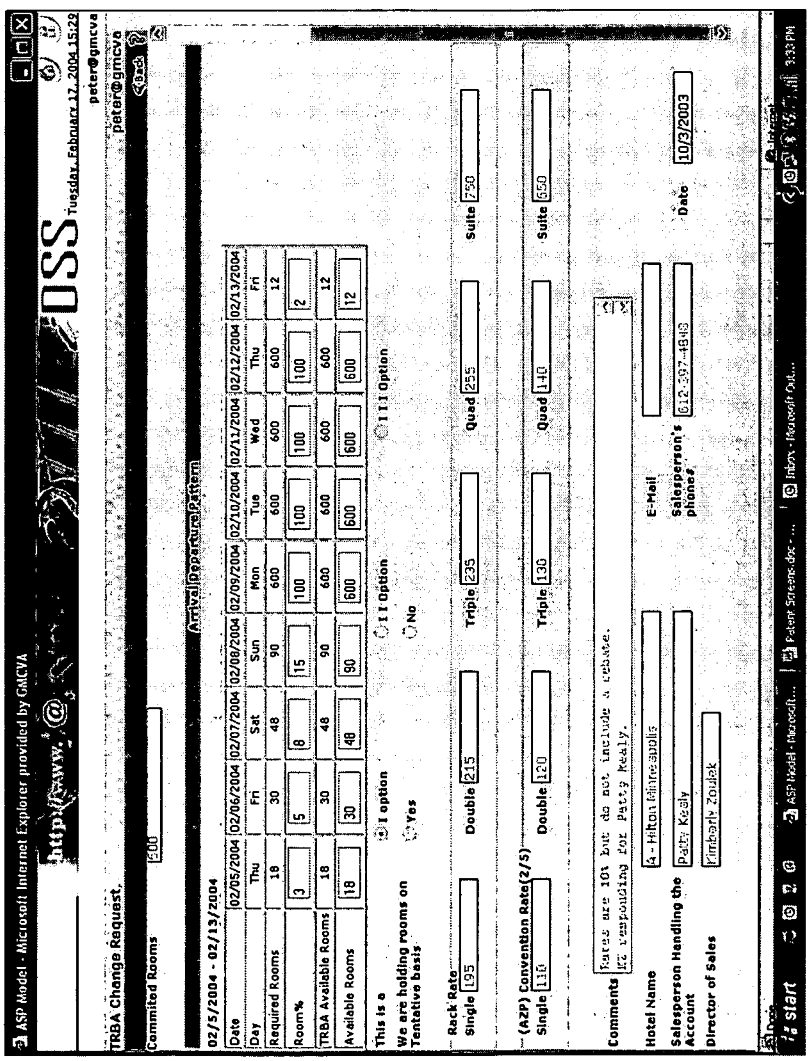
Figure 19:
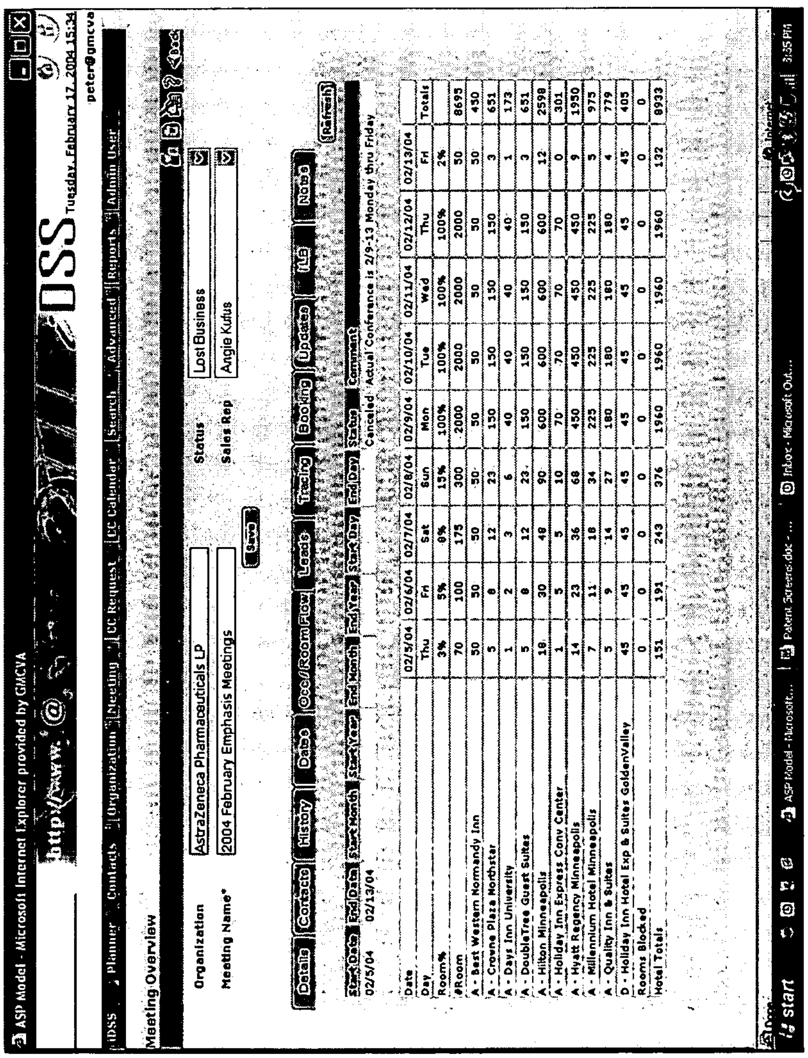
FIG. 19 is a screen shot of the occupancy room flow related to a given RFP for a destination event.
Figure 20A:
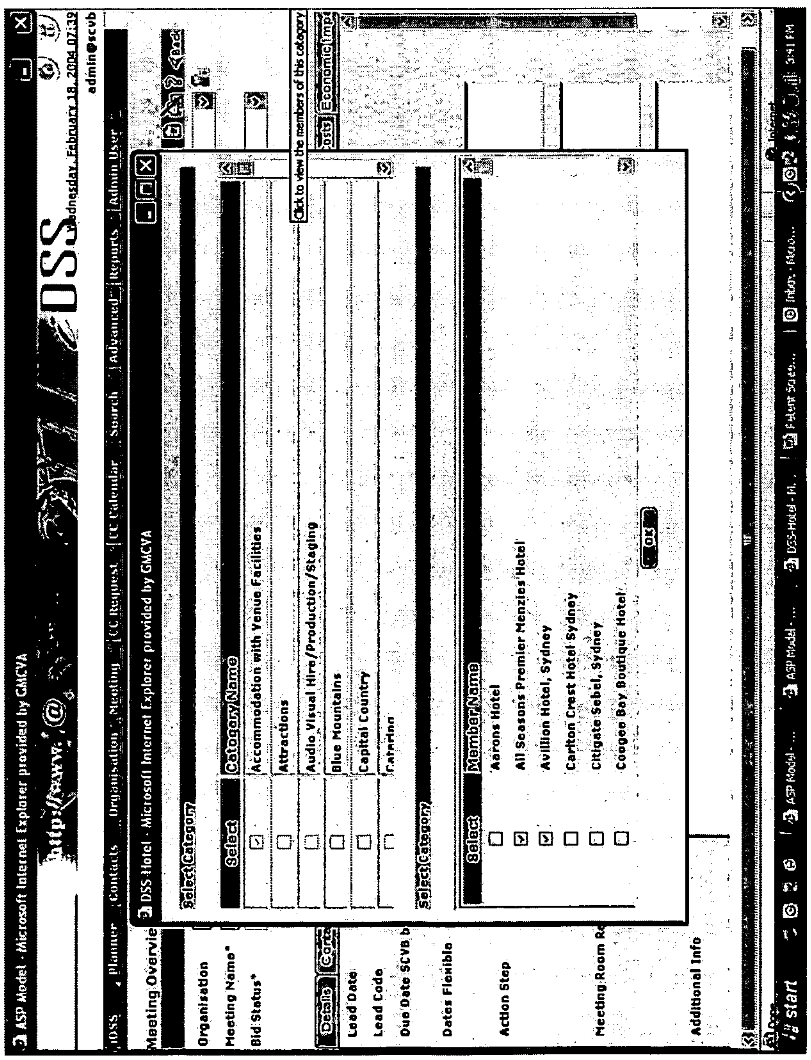
FIG. 20A is a screen shot of how Leads are built by a CVB sales staff.
Figure 20B:
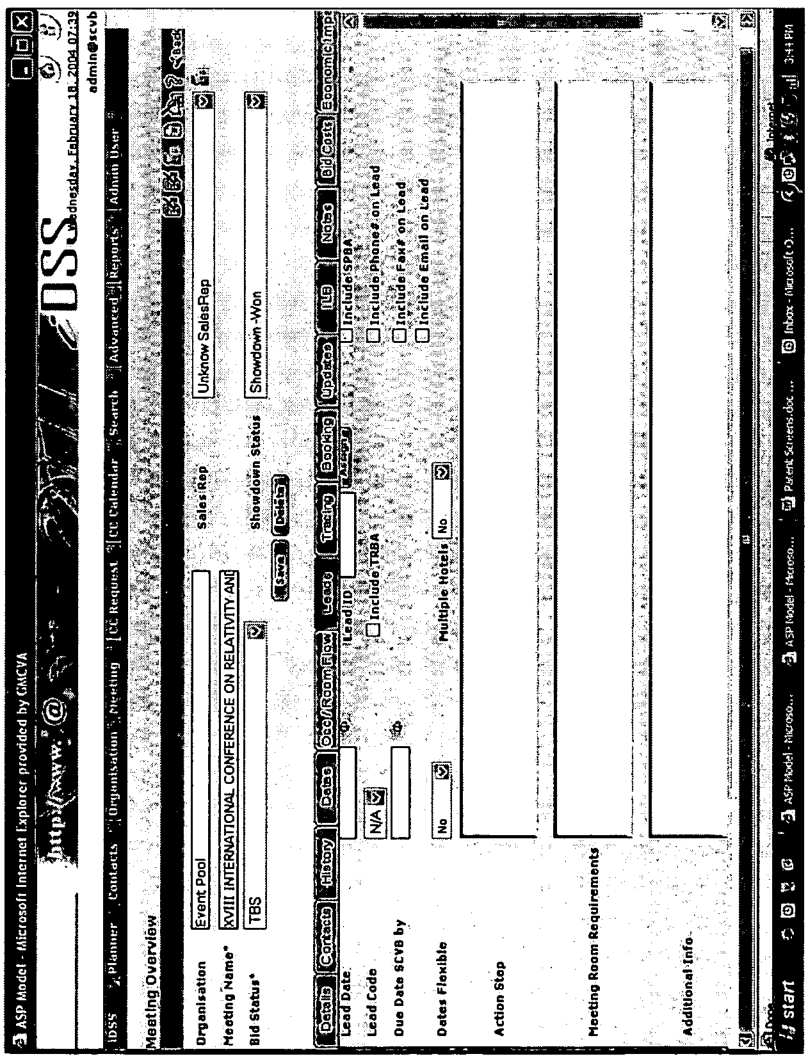
FIG. 20B is a screen shot of client-directed Leads for the CVB sales staff.

FIGS. 18A and 18B are screen shots of change requests for TRBAs submitted by hotel members to be reviewed by CVB sales staff. The change request includes information from the TRBA form plus additional information explaining the nature of the change requested. CVB sales staff will determine whether to accept the changes requested by a given member and enter them into the TRBA database. FIG. 19 is a screen shot of the occupancy room flow related to a given RFP for a destination event. This is the summary screen that the CVB sales staff utilizes in preparing a response to an RFP for a given potential destination event. In the event that more hotel members respond with quotes, the CVB sales staff can select hotel members from this screen to include in the response to the RFP or can provide a response showing more rooms available than the total number of rooms requested by the destination event organizer.

Figure 21:
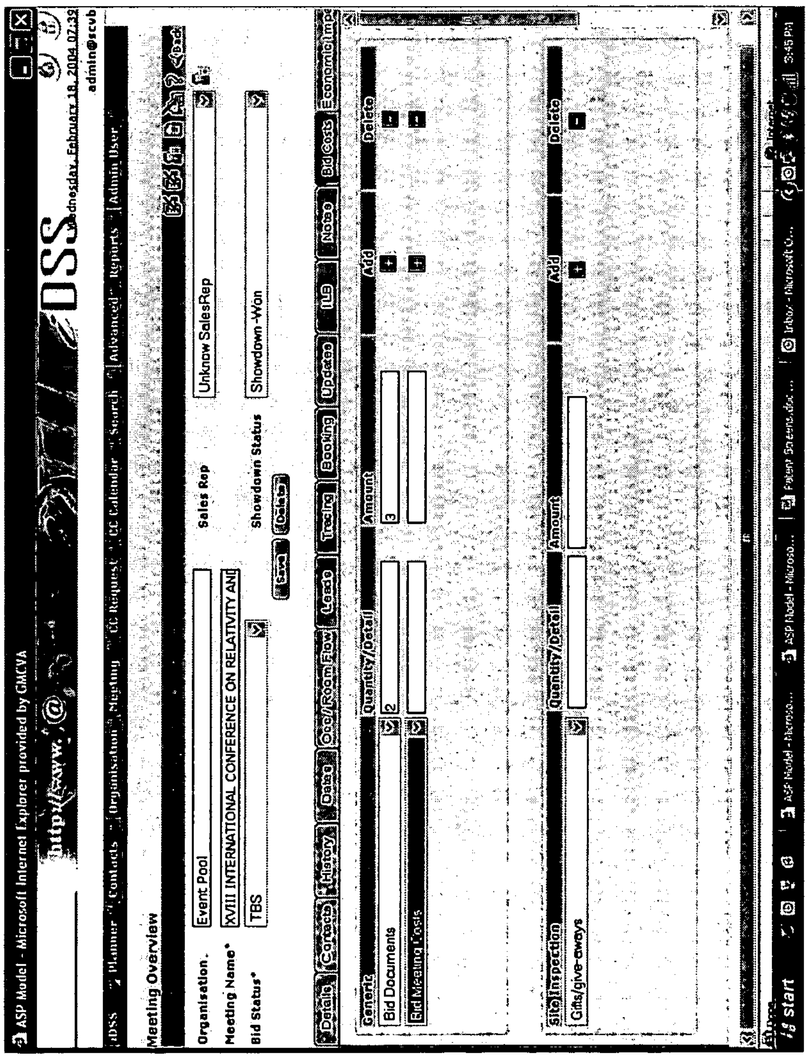
FIG. 21 is a screen shot of bid costs tab representing bid costs of CVB in preparing response to RFPs.
Figure 22:
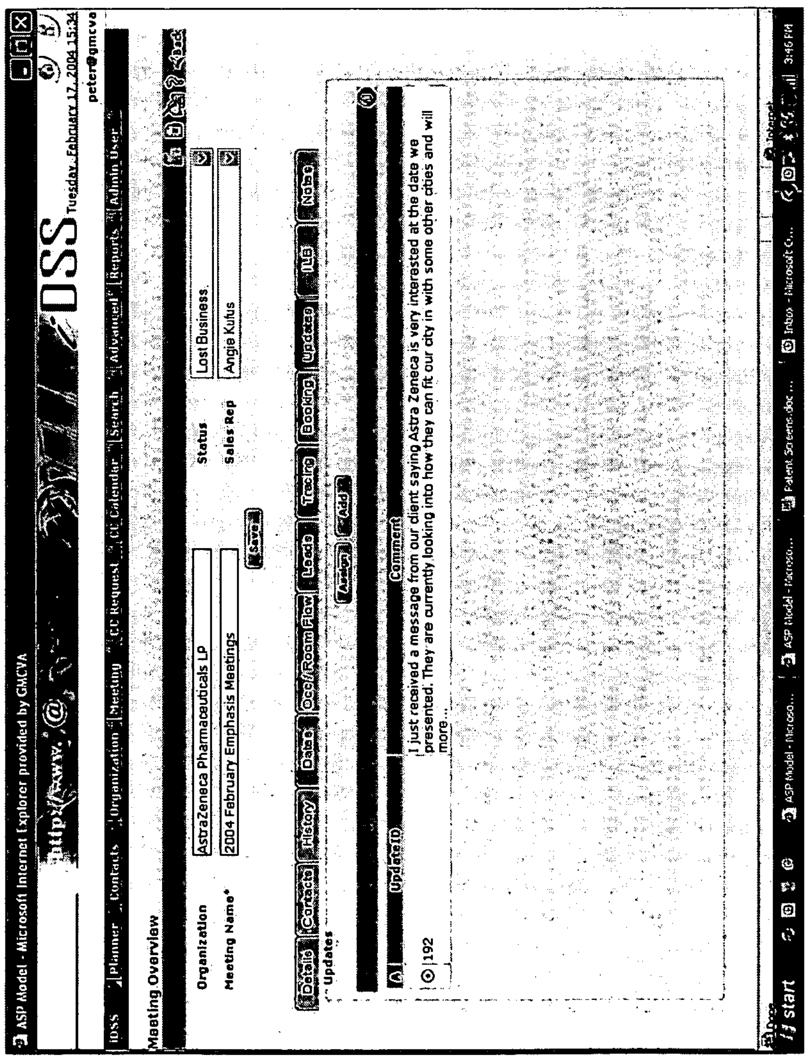
FIG. 22 is a screen shot of the updates tab for the leads page.
Figure 23:
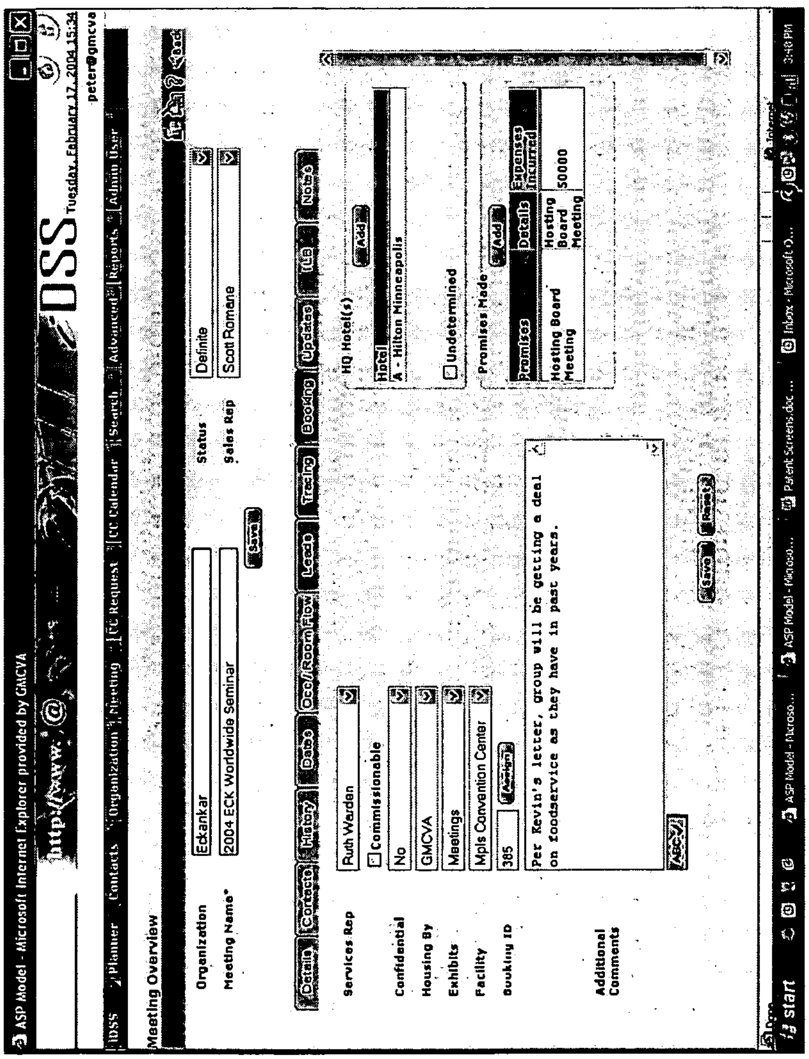
FIG. 23 is a screen shot of the bookings tab for the leads page.
Figure 24:
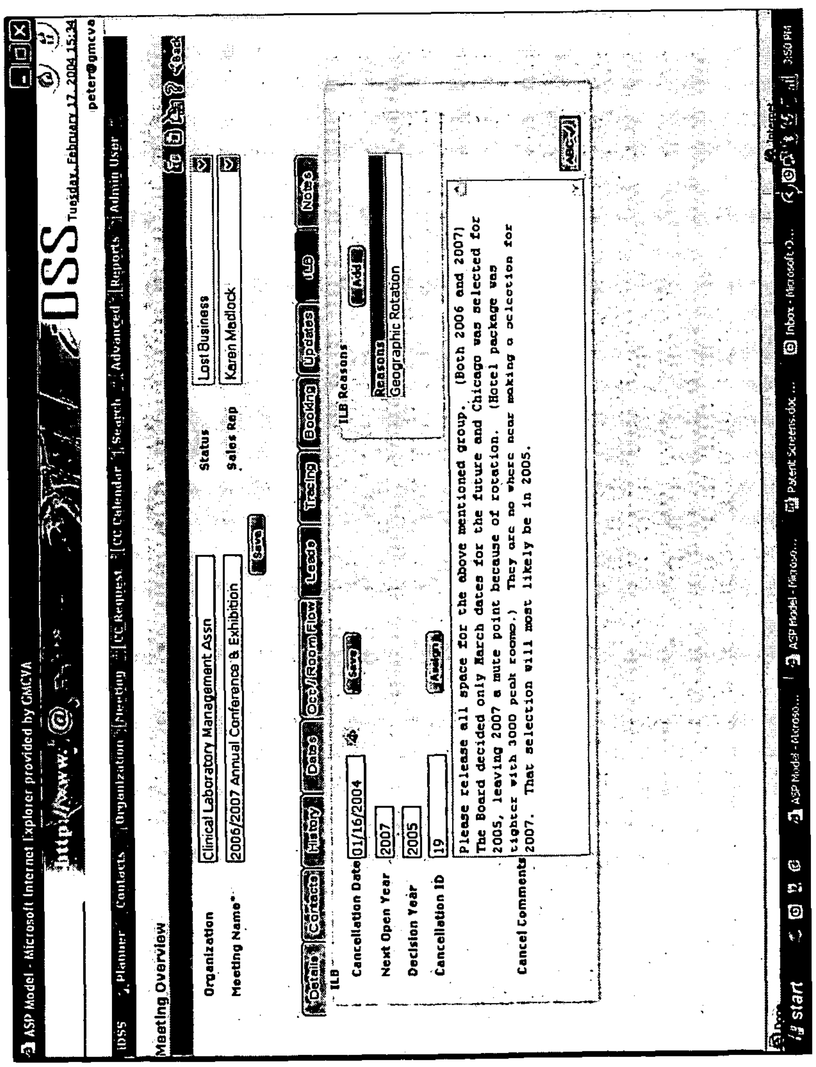
FIG. 24 is a screen shot of the lost business tab for the leads page.
Figure 25:
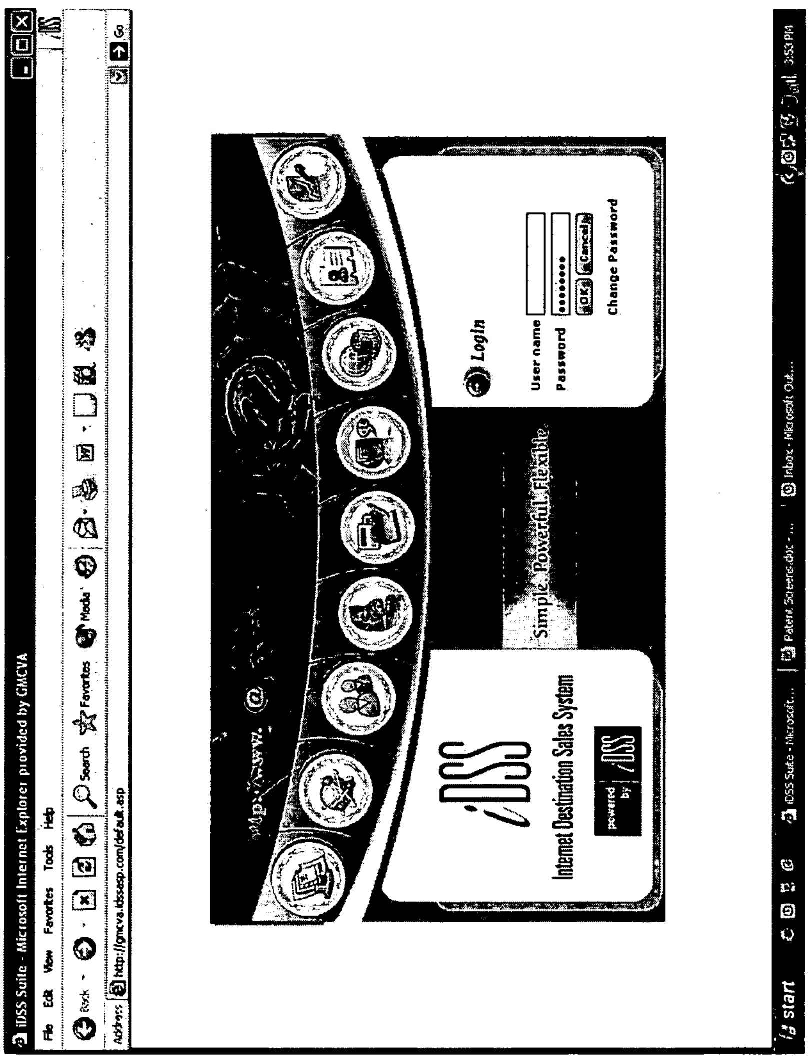
FIG. 25 is a screen shot of the main login screen for CVB staff.
Figure 26A:
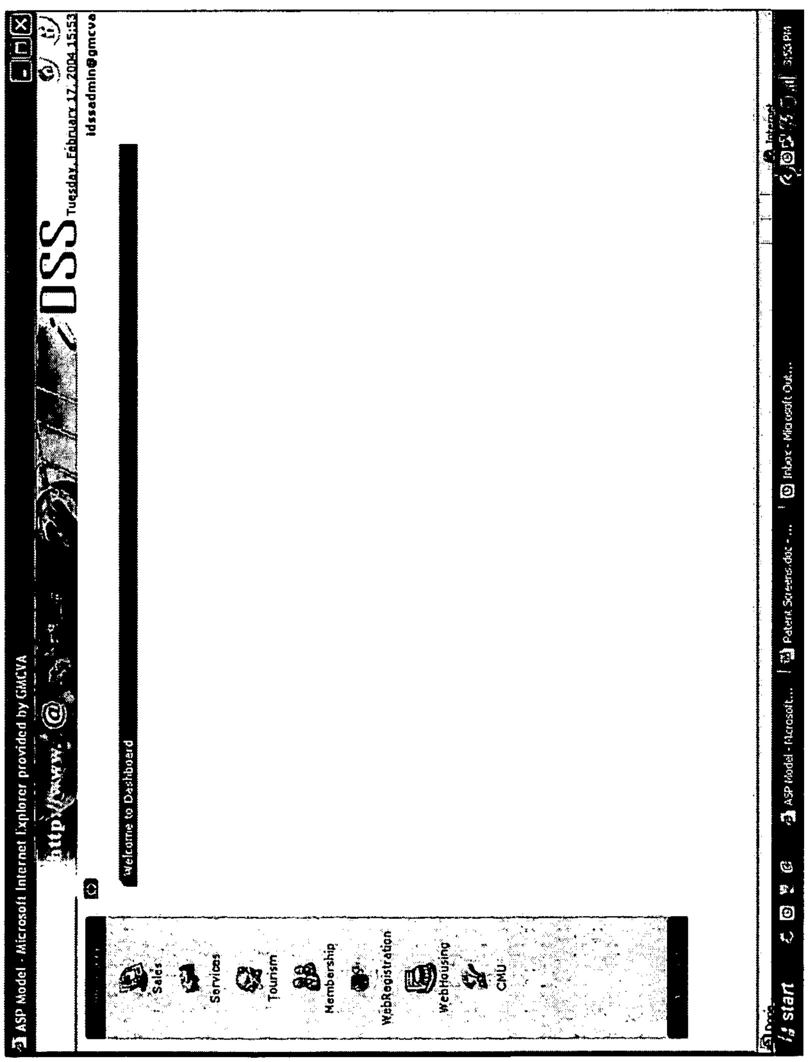
FIG. 26A is a screen shot of the navigational screen for CVB staff.
Figure 26B:
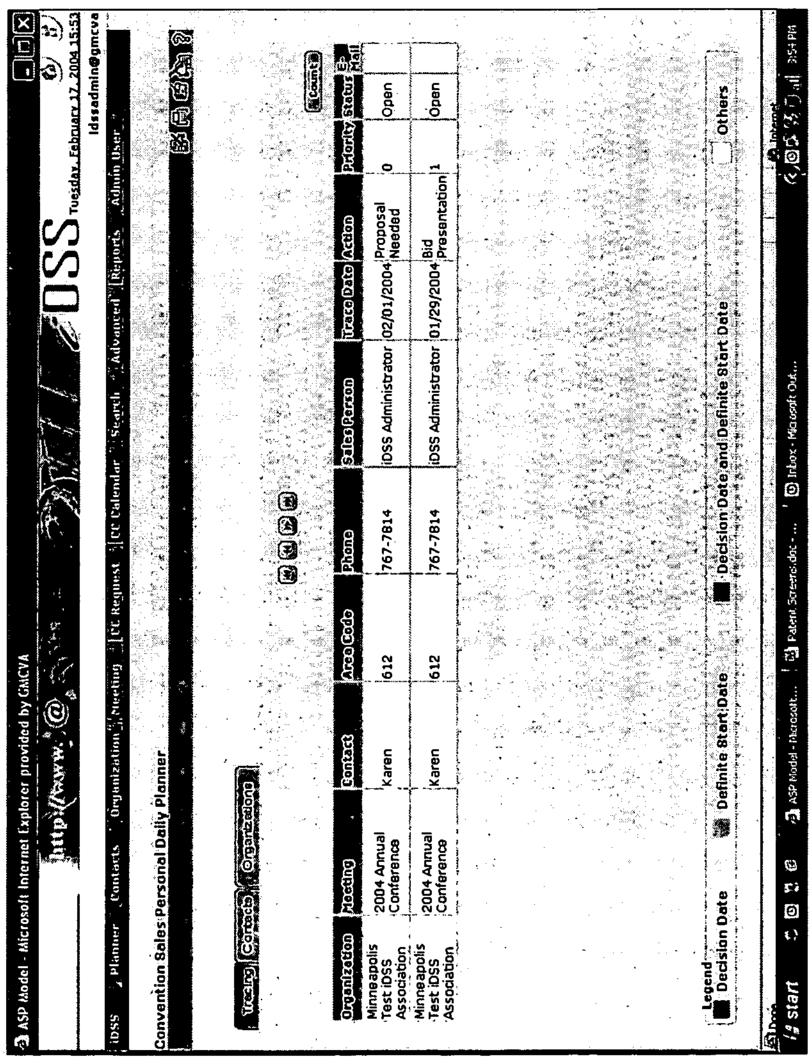
FIG. 26B is a screen shot of the main screen of the convention sales module as viewed by the CVB staff.
Figure 26C:
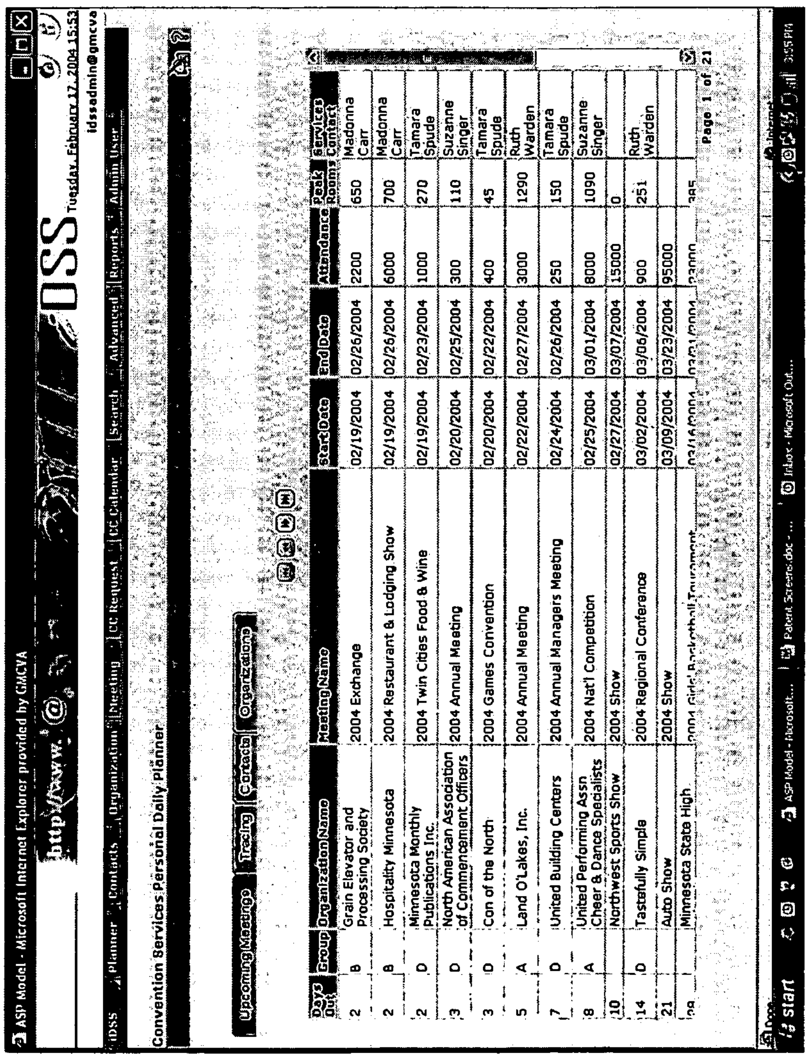
FIG. 26C is a screen shot of the main screen of the convention services module as viewed by the CVB staff.
Figure 26D:
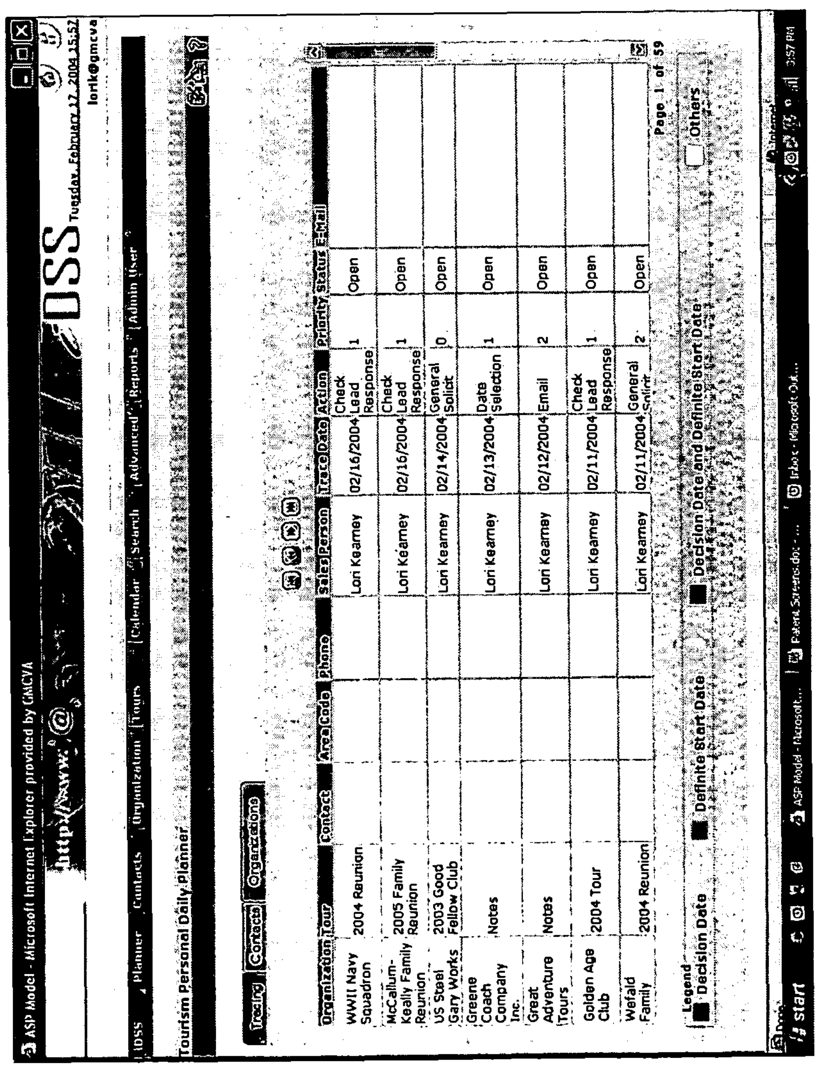
FIG. 26D is a screen shot of the main screen of the tourism module as viewed by the CVB staff.
Figure 26E:
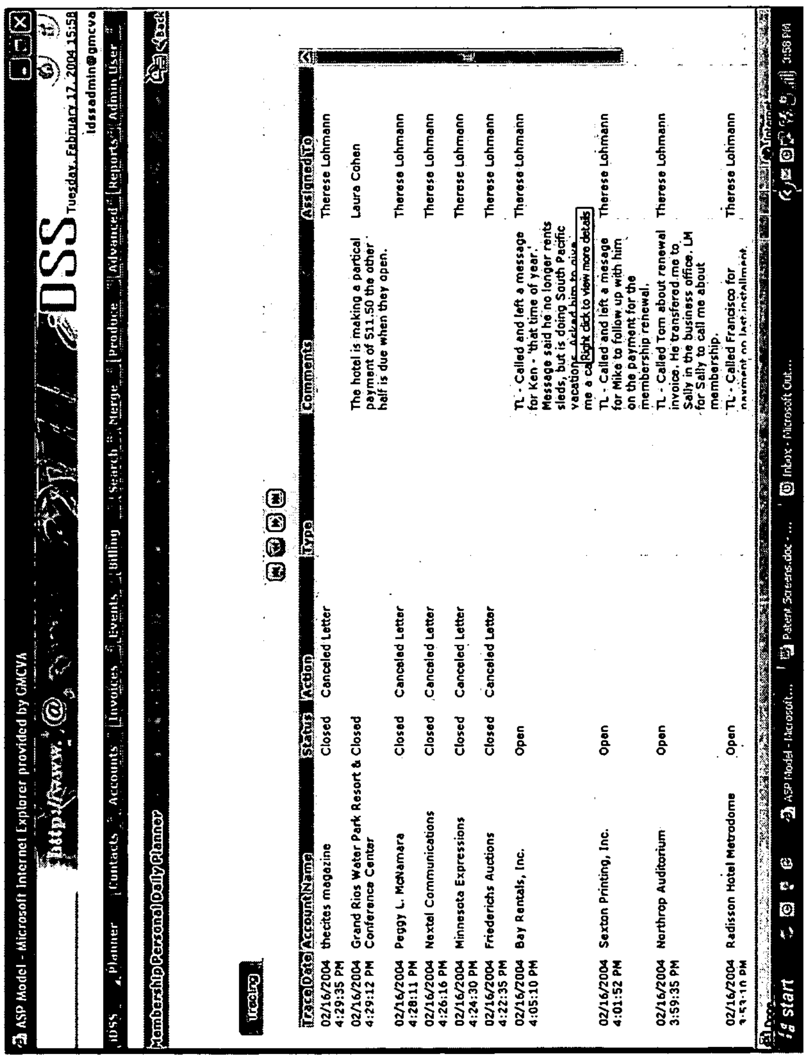
FIG. 26E is a screen shot of the main screen of the membership module as viewed by the CVB staff.
Figure 26F:
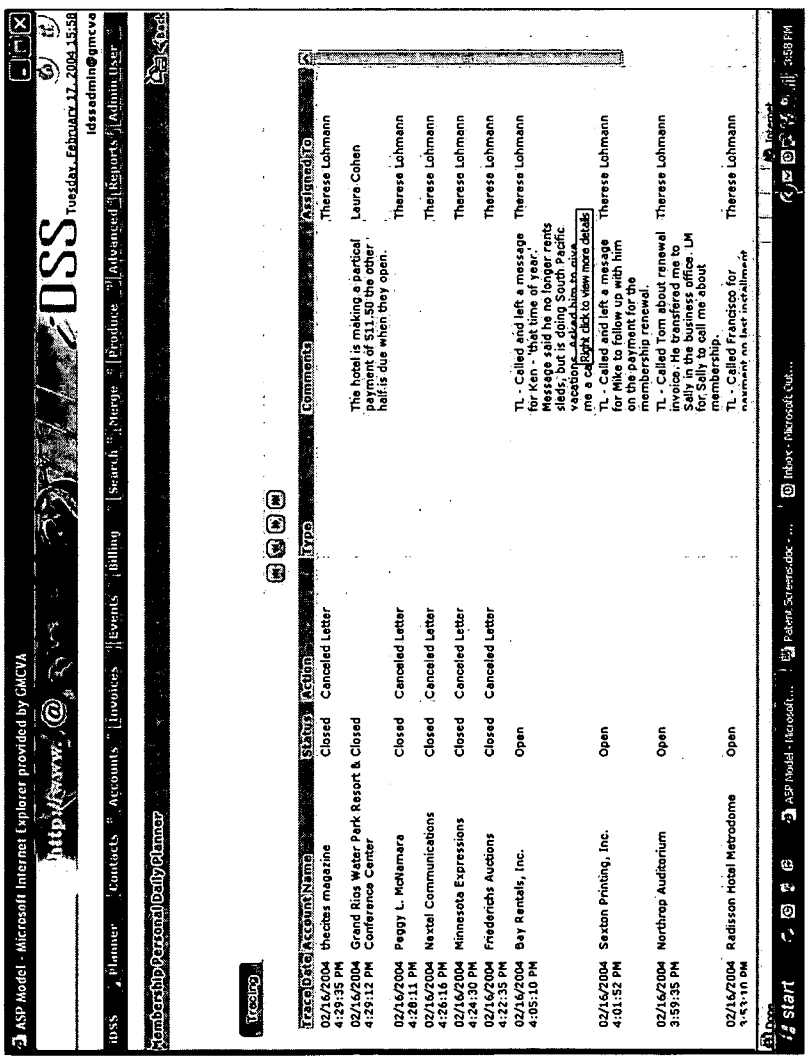
FIG. 26F is a screen shot of the main screen of the web registration module as viewed by the CVB staff.
Figure 26G:
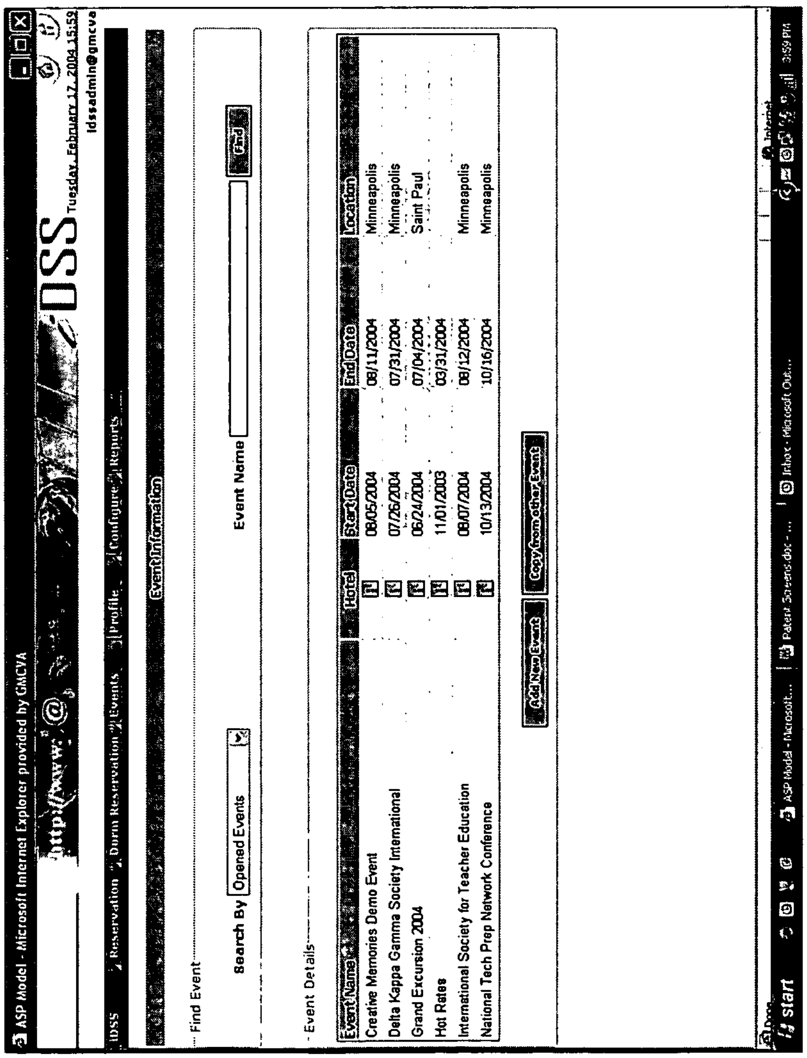
FIG. 26G is a screen shot of the main screen of the housing module as viewed by the CVB staff.
Figure 26H:
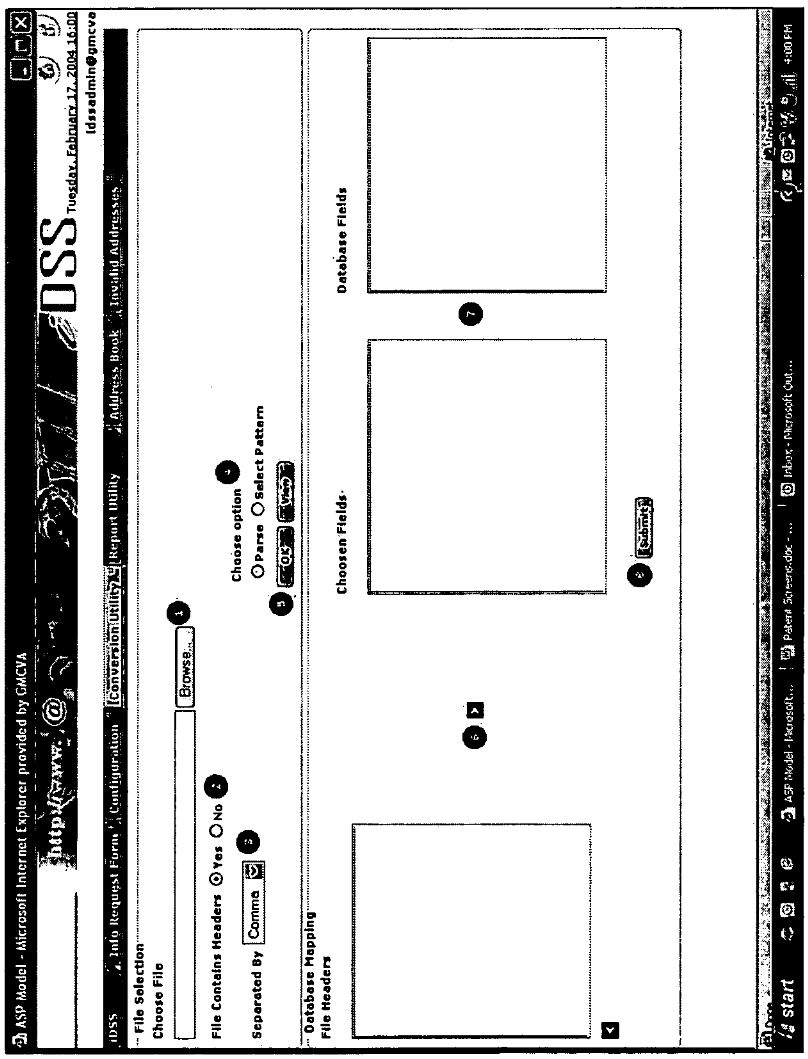
FIG. 26H is a screen shot of the main screen of the contact management module as viewed by the CVB staff.

FIGS. 20-24 show the details of various buttons on the top navigation bar of the screen for the CVB sales staff. FIG. 20A is a screen shot of how Leads are built by a CVB sales staff. FIG. 20B is a screen shot of client-directed Leads for the CVB sales staff. FIG. 21 is a screen shot of bid costs tab representing bid costs of CVB in preparing response to RFPs. This feature permits the CVB to keep track of costs, either for purposes of reporting or for purposes of billing expenses to members. FIG. 22 is a screen shot of the updates tab for the leads page. FIG. 23 is a screen shot of the bookings tab for the leads page. The information added by the CVB sales staff is then displayed as part of the pages available to the members. FIG. 24 is a screen shot of the lost business tab for the leads page FIG. 25 is a screen shot of the main login screen for CVB staff. This is also a secure login screen. FIG. 26A is a screen shot of the navigational screen for CVB staff. The various navigation buttons are shown along the left side of this window. FIG. 26B is a screen shot of the main screen of the convention sales module 110 as viewed by the CVB staff that lists the various leads by contacts or organizations. FIG. 26C is a screen shot of the main screen of the convention services module 114 as viewed by the CVB staff. FIG. 26D is a screen shot of the main screen of the tourism module 120 as viewed by the CVB staff. FIG. 26E is a screen shot of the main screen of the membership module 122 as viewed by the CVB staff. FIG. 26F is a screen shot of the main screen of the web registration module 116 as viewed by the CVB staff. FIG. 26G is a screen shot of the main screen of the housing module 118 as viewed by the CVB staff. FIG. 26H is a screen shot of the main screen of the contact management module 126 as viewed by the CVB staff that permits conversion of an existing contact management file into the contact management database 122.

Figure 27:
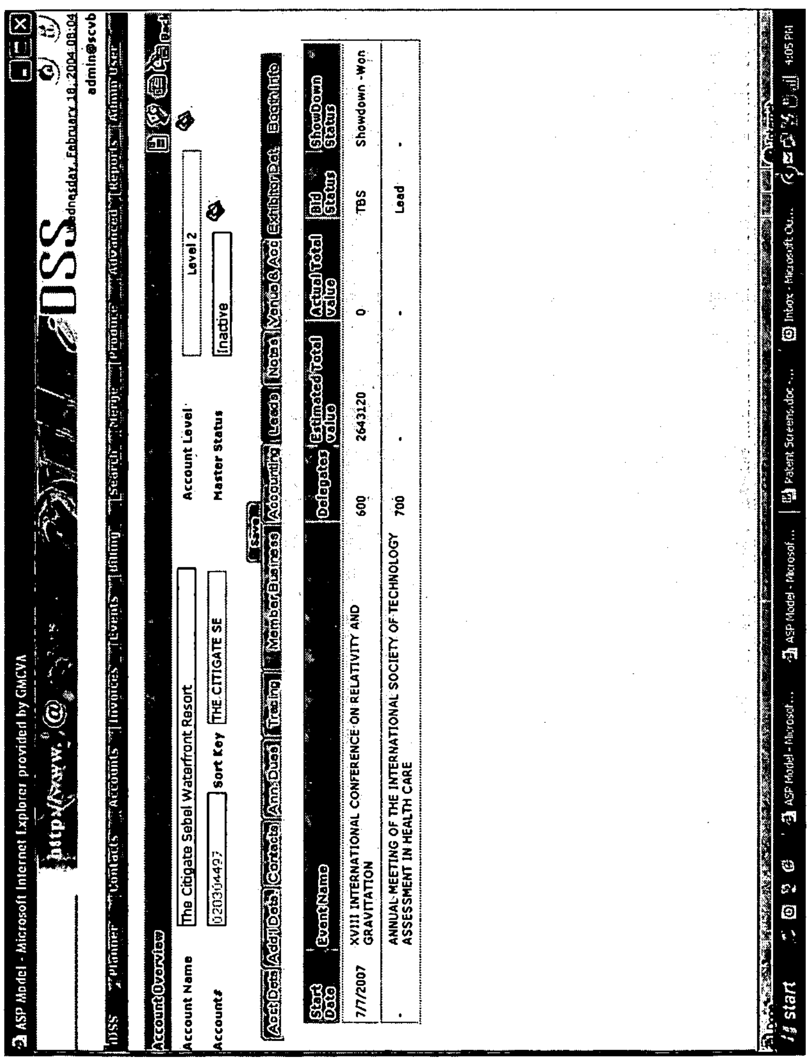
FIG. 27 is a leads tracking screen tab.

FIG. 27 is a leads tracking screen tab showing a summary of the status of a given lead, including total dollar value to the destination for that lead.

Figure 28A:
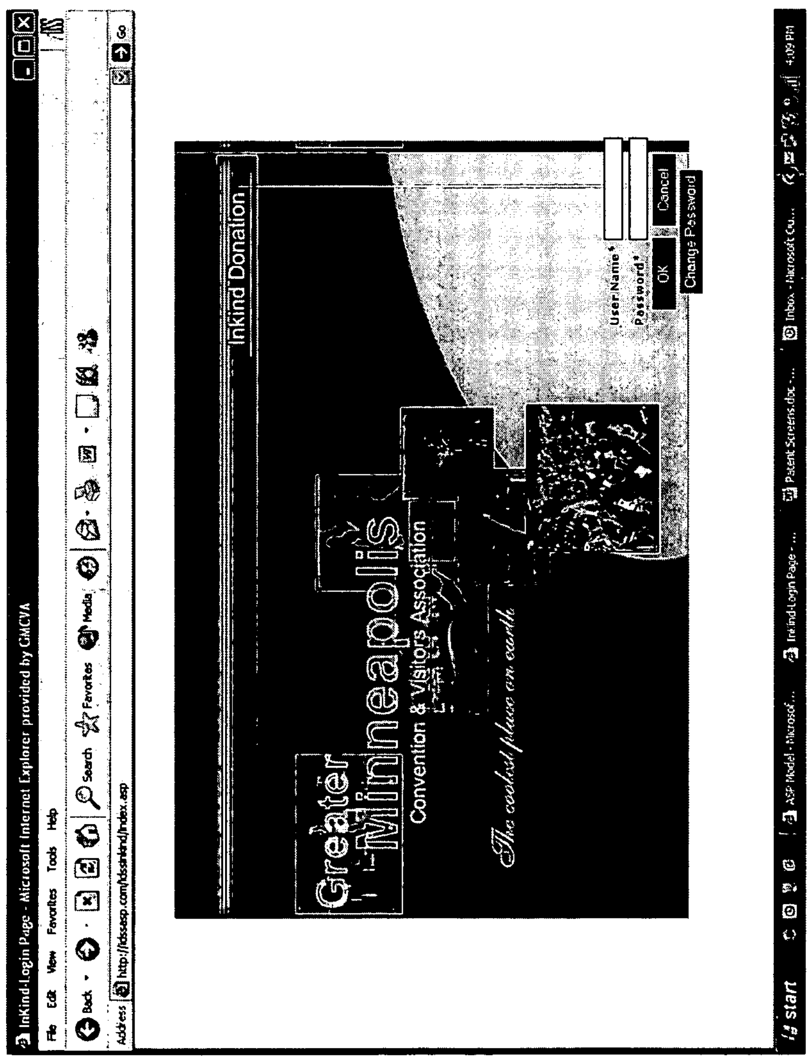
FIG. 28A is a screen shot of the login for the inkind module.
Figure 28B:
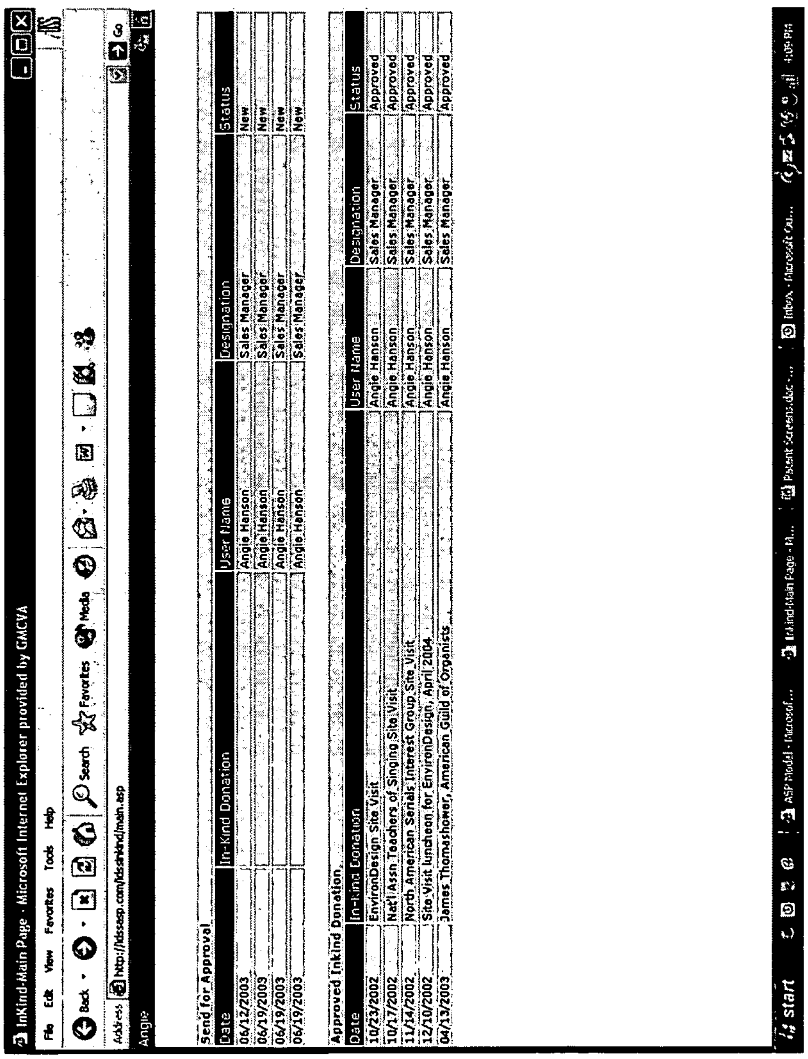
FIG. 28B is a screen shot of the navigation page for the inkind module.
Figure 28C:
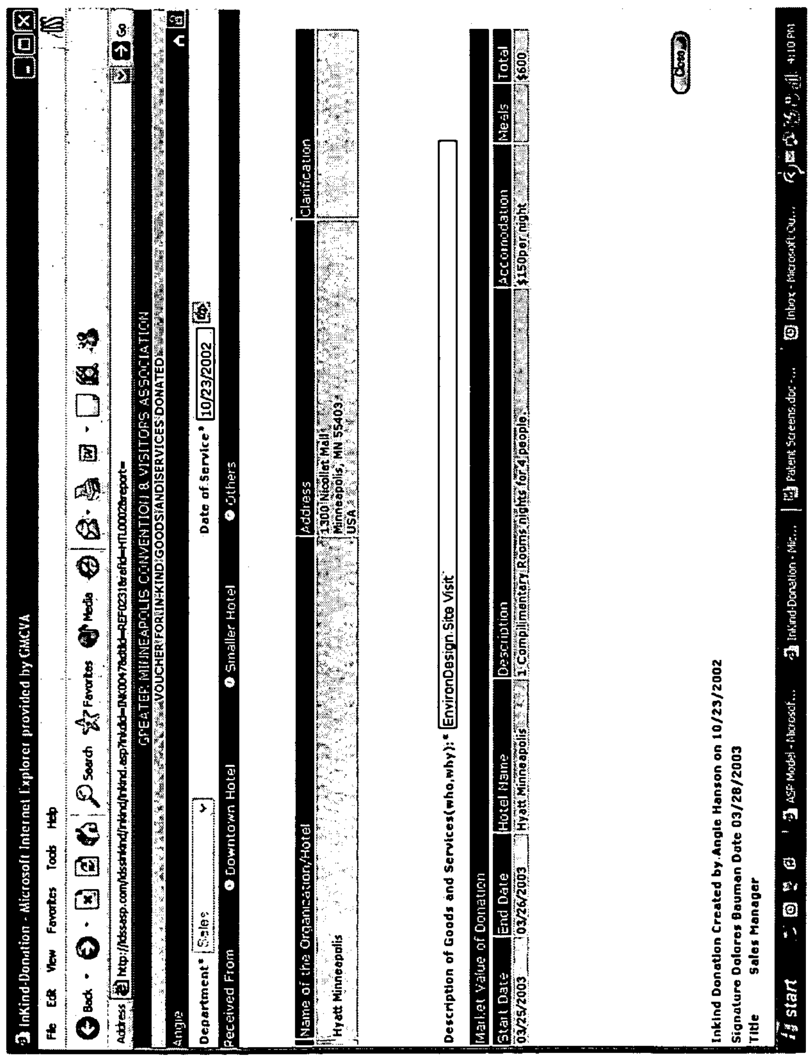
FIG. 28C is a screen shot of a drill down for inkind details in the inkind module.
Figure 29A:
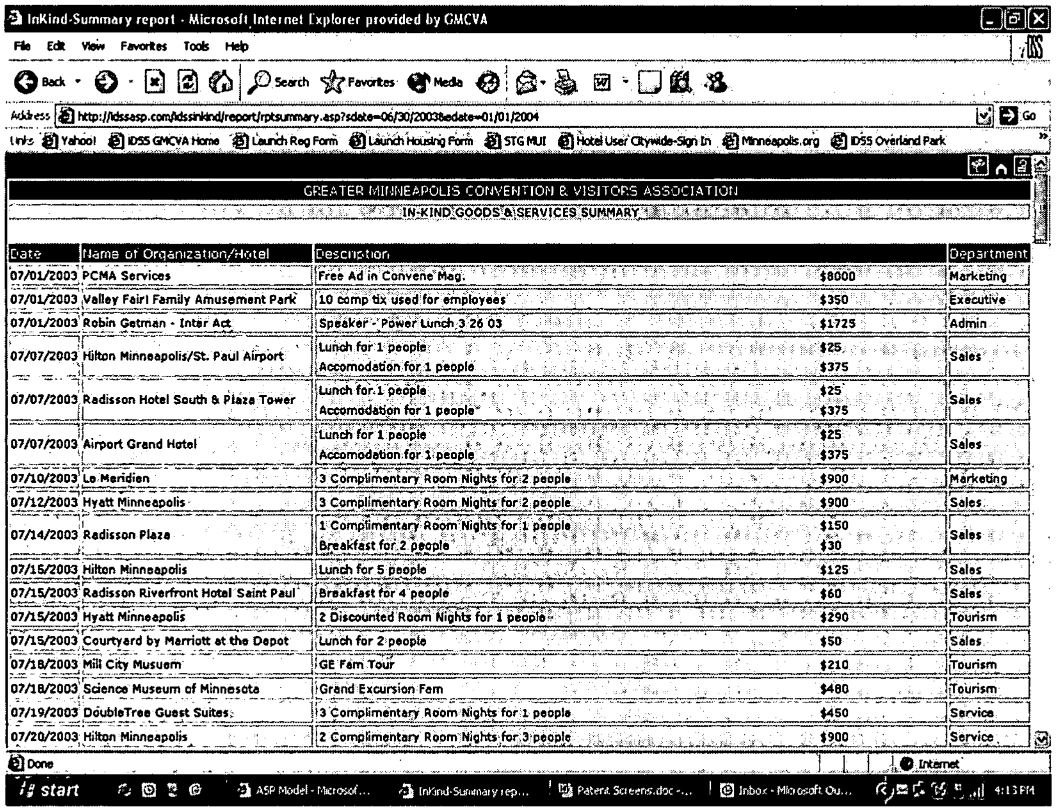

FIGS. 28A-28C are screen shots for the inkind module 124. In this embodiment, the inkind module 124 is provided as a separate module with a separate login screen as shown in FIG. 28A. Alternatively, the inkind module 124 could be incorporated into the MUI 130. FIG. 28B is a screen shot of the navigation page for the inkind module showing requested and approved inkind donations. FIG. 28C is a screen shot of a drill down for inkind details in the inkind module. FIG. 29A, 29B are partial screen shots of the accounting interface for reports from the inkind module. Totals of the value of inkind contributions for a given period are shown at the bottom. The embodiments are intended to be illustrative and not limiting. Additional embodiments are within the claims.

Although the present invention has been described with reference to particular embodiments, workers skilled in the art will recognize that changes may be made in form and detail without departing from the spirit and the scope of the invention.

The invention claimed is:

1. A computer-implemented method of providing a computerized integrated sales system for providing promotional and management support for destination events executed by or on behalf of a convention visitor bureau (CVB) organization, comprising:

receiving a request for proposal (RFP) from a potential destination event organizer requesting information from the CVB organization on hosting a given destination event in the form of an event hosted by a city or regional or metropolitan area having a total number of expected guests greater than a total availability of hotel rooms at any single service provider in the area, wherein the CVB organization is an organization including representatives employed by or contracted by the CVB organization who are tasked with promoting a given destination and working with potential destination event organizers in organizing events at the given destination event and a plurality of independent service providers that are members of the CVB organization, wherein the CVB organization is not providing services that are provided by the plurality of independent service providers that are members of the CVB organization, and the plurality of independent service providers are located within the city or regional or metropolitan area of the given destination event;

compiling related information about the RFP and electronically publishing the RFP and related information on a member user interface hosted by an application service provider and accessible to the plurality of independent service providers that are members of the CVB organization and are not the representatives of the CVB organization;

receiving from at least two of the members of the CVB organization, a periodic logging into of the member user interface hosted by a computing system maintained by an application service provider to review the RFP and related information and, in response, receiving an electronic form that is completed on the member user interface by the member for any services responsive to the RFP that the member is willing to make available, wherein data related to services contained in the completed form is confidential to the CVB organization and to the members of the CVB organization who are willing to make said services available;

automatically incorporating information from the electronic form into a projected service availability database stored in a storage system maintained by the application service provider and accessible only by the CVB, wherein the database includes data from electronic forms of at least two members of the CVB organization willing to make services available responsive to the RFP for the given destination event; reviewing the projected service availability database for the RFP for the given destination event and preparing an aggregated response to the RFP that includes information about services from at least two members of the CVB that is then communicated to the potential destination event organizer; and if the potential destination event organizer accepts the response to the RFP for the given destination event, electronically communicating with each of the at least two members of the CVB that the response to the RFP has been accepted such that each member can enter into bilateral contracts directly with the potential destination event organizer for the services identified in the electronic form for the given destination event;

wherein the members of the CVB organization include at least two hotel members and the electronic form for the hotel members includes offered availability and prices for blocks of hotel rooms in response to the RFP, and wherein the projected service availability database includes a projected occupancy room flow including total offered availability and prices of hotel rooms available and offered per night for the destination based on the blocks of hotel rooms indicated in the electronic forms for all of the at least two hotel members that the CVB organization utilizes in preparing the response to the RFP, and wherein the block of hotel rooms offered in response to the RFP by any one hotel member is less than a total number of hotel rooms requested in the RFP.

2. The method of claim 1 wherein updates to information in an RFP provided by the potential destination event organizer are automatically made available by the CVB to members via the member user interface.

3. The method of claim 1 wherein, once the electronic form is submitted by a member, any changes to the electronic form made by a member are made to the projected service availability database only when approved by the CVB.

4. The method of claim 3 wherein the application service provider automatically maintains an audit trail of all information submitted each member via the electronic form to the projected service availability database and all changes approved by the CVB.

5. The method of claim 1 wherein the RFP includes a date by which the response is due and the application service provider automatically sends email reminders to the members that have not submitted the electronic form for the RFP prior to the date by which the response is due.

6. The method of claim 1 wherein the application service provider includes a software module that automatically analyzes the projected occupancy room flow and generates a hotel availability portion of the response to the RFP.

7. The method of claim 1 wherein the application service provider hosts a software module that selectively integrates portions of the projected service availability database in order to display on the member user interface non-confidential summaries of the future availability of selected services for the destination by date.

8. The method of claim 1 wherein the application service provider also hosts a customer webpage interface and the potential destination event organizer submits the RFP for a given destination event via the customer webpage interface.

9. The method of claim 1 wherein software modules that support the member user interface and the projected services availability database are updated and maintained by the application service provider and not by the CVB organization.

10. An integrated computerized sales system for providing promotional and management support for destination events, comprising:

a member user interface hosted by a computing system maintained by an application service provider and accessible to a plurality of independent service providers that are members of a convention visitor bureau (CVB) organization, wherein the CVB organization is an organization including representatives other than the independent service providers who are tasked with promoting a given destination and working with potential destination event organizers in organizing a destination event hosted by a city or regional or metropolitan area and a plurality of independent service providers that are members of the CVB organization having a total number of expected guests at the destination event that is greater than a total availability of hotel rooms of any one independent service provider in the area, wherein the CVB organization is not providing services that are provided by the plurality of independent service providers that are members of the CVB organization, wherein the plurality of independent service providers are located within the city or regional or metropolitan area of the given destination event, wherein at least two of the members of the CVB periodically log into the member user interface to review information on a request for proposal (RFP) from a potential destination event organizer requesting information on hosting a given destination event that is published on the member user interface by the CVB, the member user interface including an electronic form to be completed by a member of the CVB for any services responsive to the RFP that the member is willing to make available, wherein data related to services contained in the completed form is confidential to the CVB organization and to the members of the CVB organization who are willing to make said services available, wherein the members of the CVB organization include at least two hotel members and the electronic form for the hotel members includes offered availability and prices for blocks of hotel rooms in response to the RFP, and wherein the projected service availability database includes a projected occupancy room flow including total offered availability and prices of hotel rooms available and offered per night for the destination based on the blocks of hotel rooms indicated in the electronic forms for all of the at least two hotel members that the CVB organization utilizes in preparing the response to the RFP, and wherein the block of hotel rooms offered in response to the RFP by any one hotel member is less than a total number of hotel rooms requested in the RFP; and a projected service availability database stored in a storage system maintained by the application service provider that automatically incorporates information from the electronic form, wherein the database includes data from electronic forms of at least two members of the CVB organization willing to make services available responsive to the RFP for the given destination event, and is accessible only by the CVB and is reviewed by the CVB for the RFP for the given destination event and in order to prepare an aggregated response to the RFP that includes information about services from at least two members of the CVB that is then communicated to the potential destination event organizer;

wherein the member user interface further includes electronic means for notifying members if the potential destination event organizer accepts the response to the RFP and that each member can enter into bilateral contracts directly with the potential destination event organizer for the services identified in the electronic form for the given destination event.

11. The system of claim 10 wherein, once the electronic form is submitted by a member, any changes to the electronic form made by a member are made to the projected service availability database only when approved by the CVB.

12. The system of claim 11 further comprising an electronic audit trail maintained by the application service provider of all information submitted each member via the electronic form to the projected service availability database and all changes approved by the CVB.

13. The system of claim 10 further comprising a software module hosted by the application service provider that automatically analyzes the projected occupancy room flow and generates a hotel availability portion of the response to the RFP.

14. The system of claim 10 further comprising a software module hosted by the application service provider that selectively integrates portions of the projected service availability database in order to display on the member user interface non-confidential summaries of the future availability of selected services for the destination by date.

15. The system of claim 10 further comprising a customer webpage interface hosted by the application service provider that the potential destination event organizer utilizes to submit the RFP for a given destination event.

16. An integrated computerized sales system for providing promotional and management support for destination events, comprising:

a means for hosting a member user interface maintained by an application service provider and accessible to a plurality of independent service providers that are members of a convention visitor bureau (CVB) organization, wherein the CVB organization is an organization including representatives other than the independent service providers tasked with promoting a given destination and working with potential destination event organizers in organizing events at the given destination event in the form of an event hosted by a city or regional or metropolitan area and a plurality of independent service providers that are members of the CVB organization, wherein the CVB organization is not providing services that are provided by the plurality of independent service providers that are members of the CVB organization having a total number of expected guests at the destination event that is greater than a total availability of hotel rooms of any one independent service provider in the area, wherein the plurality of independent service providers are located within the city or regional or metropolitan area of the given destination event, and wherein at least two of the members of the CVB periodically log into the member user interface to review information on a request for proposal (RFP) from a potential destination event organizer requesting information on hosting a given destination event that is published on the member user interface by the CVB, the member user interface including an electronic form to be completed by a member of the CVB for any services responsive to the RFP that the member is willing to make available, wherein data related to services contained in the completed form is confidential to the CVB organization and to the members of the CVB organization who are willing to make said services available, wherein the members of the CVB organization include at least two hotel members and the electronic form for the hotel members includes offered availability and prices for blocks of hotel rooms in response to the RFP, and wherein the projected service availability database includes a projected occupancy room flow including total offered availability and prices of hotel rooms available and offered per night for the destination based on the blocks of hotel rooms indicated in the electronic forms for all of the at least two hotel members that the CVB organization utilizes in preparing the response to the RFP, and wherein the block of hotel rooms offered in response to the RFP by any one hotel member is less than a total number of hotel rooms requested in the RFP; and a means for storing a projected service availability database maintained by the application service provider that automatically incorporates information from the electronic form, wherein the database includes data from electronic forms of at least two members of the CVB organization willing to make services available responsive to the RFP for the given destination event, and is accessible only by the CVB and is reviewed by the CVB for the RFP for the given destination event and in order to prepare an aggregated response to the RFP that includes information about services from at least two members of the CVB that is then communicated to the potential destination event organizer;

wherein means for hosting a member user interface further includes electronic means for notifying members if the potential destination even organizer accepts the response to the RFP and that each member can enter into bilateral contracts directly with the potential destination event organizer for the services identified in the electronic form for the given destination event.

17. The system of claim 16 wherein, once the electronic form is submitted by a member, any changes to the electronic form made by a member are made to the projected service availability database only when approved by the CVB.

18. The system of claim 17 further comprising an electronic audit trail maintained by the application service provider of all information submitted each member via the electronic form to the projected service availability database and all changes approved by the CVB.

19. The system of claim 16 wherein the members of the CVB organization include at least two hotel members and the electronic form for the hotel members includes availability and prices for blocks of hotel rooms in response to the RFP, and wherein the projected service availability database includes a projected occupancy room flow for the destination that the CVB organization utilizes in preparing the response to the RFP.

20. The system of claim 19 further comprising a software module hosted by the application service provider that automatically analyzes the projected occupancy room flow and generates a hotel availability portion of the response to the RFP.

21. The system of claim 16 further comprising a soft-ware module hosted by the application service provider that selectively integrates portions of the projected service availability database in order to display on the member user interface non-confidential summaries of the future availability of selected services for the destination by date.

22. The system of claim 16 further comprising a customer webpage interface hosted by the application service provider that the potential destination event organizer utilizes to submit the RFP for a given destination event.

23. A computer-implemented method of claim 1, wherein the RFP from the potential destination event organizer requesting information from the CVB organization specifies characteristics of the services desired, and publishing the RFP and related information on a member user interface hosted by an application service provider and accessible to the plurality of independent service providers further comprises allowing access only to independent service providers capable of providing the characteristics of the services desired.

* * * * *

UNITED STATES PATENT AND TRADEMARK OFFICE

CERTIFICATE OF CORRECTION

PATENT NO. : 8,560,355 B2
APPLICATION NO. : 10/784008
DATED : October 15, 2013
INVENTOR(S) : Adamson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1495 days.

Signed and Sealed this
Tenth Day of March, 2015

Michelle K. Lee
*Deputy Director of the United States Patent and Trademark Office*